US012574934B2

(12) United States Patent
Wu et al.

(10) Patent No.: US 12,574,934 B2
(45) Date of Patent: Mar. 10, 2026

(54) METHOD AND DEVICE IN NODES USED FOR WIRELESS COMMUNICATION

(71) Applicant: Apogee Networks, LLC, Plano, TX (US)

(72) Inventors: Lu Wu, Shanghai (CN); Xiaobo Zhang, Shanghai (CN)

(73) Assignee: Apogee Networks, LLC, Plano, TX (US)

( * ) Notice: Subject to any disclaimer, the term of this patent is extended or adjusted under 35 U.S.C. 154(b) by 421 days.

(21) Appl. No.: 17/901,857

(22) Filed: Sep. 2, 2022

(65) Prior Publication Data

US 2023/0039610 A1     Feb. 9, 2023

Related U.S. Application Data

(63) Continuation of application No. PCT/CN2021/078987, filed on Mar. 4, 2021.

(30) Foreign Application Priority Data

Mar. 6, 2020    (CN) .......................... 202010152084.6
Apr. 23, 2020   (CN) .......................... 202010325225.X

(51) Int. Cl.
*H04W 72/23*         (2023.01)
*H04W 72/121*        (2023.01)
(52) U.S. Cl.
CPC ......... *H04W 72/23* (2023.01); *H04W 72/121* (2013.01)
(58) Field of Classification Search
CPC ............................... H04L 72/23; H04L 72/121
See application file for complete search history.

(56) References Cited

U.S. PATENT DOCUMENTS

| | | | |
|---|---|---|---|
| 10,931,355 B2 * | 2/2021 | Huang | ................. H04B 7/0626 |
| 11,019,634 B2 | 5/2021 | Zhang | |
| 11,343,838 B2 | 5/2022 | Jiang et al. | |

(Continued)

FOREIGN PATENT DOCUMENTS

| | | |
|---|---|---|
| CN | 102547990 A | 7/2012 |
| CN | 108668361 A | 10/2018 |

(Continued)

OTHER PUBLICATIONS

First Search Report of Chinses patent application No. CN202010152084.6 dated Jul. 13, 2022.

(Continued)

*Primary Examiner* — Blake J Rubin
(74) *Attorney, Agent, or Firm* — Volpe Koenig

(57) ABSTRACT

The present application provides a method and device in nodes used for wireless communications. A first node receives a first information block, and then transmits a first signal in a first time unit group and transmits a second signal in a second time unit group; a start time of the first time unit group is earlier than a start time of the second time unit group; the first information block is used to determine a first index group and a second index group, the first index group comprises an index of each time unit in the first time unit group, and the second index group comprises an index of each time unit in the second time unit group; a minimum value of the second index group minus a maximum value of the first index group is equal to a target integer.

20 Claims, 9 Drawing Sheets

(56) References Cited

U.S. PATENT DOCUMENTS

| | | | | |
|---|---|---|---|---|
| 11,469,851 | B2 | 10/2022 | Zhang et al. | |
| 12,261,790 | B2 | 3/2025 | He et al. | |
| 2018/0198665 | A1 | 7/2018 | Guo | |
| 2019/0253220 | A1 | 8/2019 | Kim | |
| 2020/0045700 | A1 | 2/2020 | Sun | |
| 2020/0053757 | A1 | 2/2020 | Bagheri | |
| 2020/0092814 | A1* | 3/2020 | Zhou | H04W 52/0235 |
| 2020/0351841 | A1* | 11/2020 | Cirik | H04L 1/0025 |
| 2021/0045141 | A1* | 2/2021 | Lee | H04L 5/0053 |
| 2021/0135802 | A1* | 5/2021 | Zhou | H04B 7/0617 |
| 2021/0160879 | A1* | 5/2021 | Lin | H04W 72/0453 |
| 2021/0168779 | A1* | 6/2021 | Mondal | H04L 5/0035 |
| 2022/0022215 | A1* | 1/2022 | Gao | H04B 7/0874 |
| 2022/0038244 | A1* | 2/2022 | Zhang | H04L 1/1671 |
| 2022/0077982 | A1* | 3/2022 | Zhang | H04L 5/0014 |
| 2022/0078826 | A1* | 3/2022 | Lee | H04L 5/0053 |
| 2022/0124761 | A1* | 4/2022 | Muruganathan | H04L 5/006 |
| 2022/0158787 | A1* | 5/2022 | Lee | H04L 5/0094 |
| 2022/0216964 | A1* | 7/2022 | Mondal | H04L 5/0023 |
| 2023/0115798 | A1* | 4/2023 | Lee | H04W 52/362 |
| | | | | 370/318 |

FOREIGN PATENT DOCUMENTS

| | | | |
|---|---|---|---|
| CN | 108768599 | A | 11/2018 |
| CN | 110268778 | A | 9/2019 |
| CN | 110690948 | A | 1/2020 |
| EP | 3346776 | A1 | 7/2018 |
| WO | 2017171408 | A2 | 10/2017 |
| WO | 2018143846 | A1 | 8/2018 |
| WO | 2019215895 | A1 | 11/2019 |

OTHER PUBLICATIONS

First Search Report of Chinses patent application No. CN202010325225.X dated Mar. 22, 2022.

Notification to Grant Patent Right for Invention of Chinses patent application No. CN202010152084.6 dated Jul. 26, 2022.

Notification to Grant Patent Right for Invention of Chinses patent application No. CN202010325225.X dated Mar. 29, 2022.

ISR received in application No. PCT/CN2021/078987 dated Jun. 8, 2021.

NTT DOCOMO, Inc. Presentation of Specification/Report to TSG: TR 38.802, Version 2.0.0 3GPP TSG-RAN Meeting #75 RP-170377 Mar. 3, 2017.

Ericsson on DCI format 1_2 applicability to NR eMIMO 3GPP TSG-RAN WG2 #109bis R2-2003345 Apr. 10, 2020.

Vivo Discussion on remaining issues on M-TRP and text proposals 3GPP TSG RAN WG1 #100 R1-2000333 Feb. 14, 2020.

3rd Generation Partnership Project; Technical Specification Group Services and System Aspects; Service requirements for the 5G system; Stage 1(Release 17) TS22.261 V17.1.0 Dec. 12-Dec. 31, 2019.

Third Generation Partnership Project, "Technical Specification Group Radio Access Network; NR; Physical channels and modulation (Release 16)," 3GPP TS 38.211 V16.0.0 (Dec. 2019).

Third Generation Partnership Project, "Technical Specification Group Radio Access Network; NR; Multiplexing and channel coding (Release 16)," 3GPP TS 38.212 V16.0.0 (Dec. 2019).

Third Generation Partnership Project, "Technical Specification Group Radio Access Network; NR; Physical layer procedures for control (Release 15)," 3GPP TS 38.213 V16.0.0 (Dec. 2019).

Third Generation Partnership Project, "Technical Specification Group Radio Access Network; NR; Physical layer procedures for data (Release 16)," 3GPP TS 38.214 V16.0.0 (Dec. 2019).

Third Generation Partnership Project, "Technical Specification Group Radio Access Network; NR; Medium Access Control (MAC) protocol specification (Release 15)," 3GPP TS 38.321 V15.8.0 (Dec. 2019).

Third Generation Partnership Project, "Technical Specification Group Radio Access Network NR Radio Resource Control (RRC) protocol specification (Release 15)," 3GPP TS 38.331 V15.8.0 (Dec. 2019).

* cited by examiner

100A

100B

(a)target integer being equal to second integer (b)target integer being equal to first integer (a) first signal corresponds to first
parameter value set
Second signal corresponds to second
parameter value set (b) first signal corresponds to second
parameter value set
Second signal corresponds to first
parameter value set A number of TCI states comprised in second
TCI state group is greater than 1

1200B

1300A

1300B

METHOD AND DEVICE IN NODES USED FOR WIRELESS COMMUNICATION

CROSS REFERENCE TO RELATED APPLICATIONS

This application is a continuation of International Application No. PCT/CN2021/078987, filed Mar. 4, 2021, claims the priority benefit of Chinese Patent Application No. 202010152084.6, filed on Mar. 6, 2020, and the priority benefit of Chinese Patent Application No. 202010325225.X, filed on Apr. 23, 2020, the full disclosure of which is incorporated herein by reference.

BACKGROUND

Technical Field

The present application relates to transmission methods and devices in wireless communication systems, and in particular to a method and device of radio signal transmission in a wireless communication system supporting cellular networks.

Related Art

NR Rd-16 standard can already support downlink transmissions of multiple Transmit-Receive Points (TRPs) and/or multiple antenna panels, and support one DCI to schedule downlink transmissions of multiple TRPs and/or multiple antenna panels as well as support multiple DCIs to respectively schedule downlink transmissions of multiple TRPs or multiple antenna panels. A work item (WI) of Multiple Input and Multiple Output (MIMO) enhancement of NR Release 17 was approved at 3GPP RAN #86 plenary, where employing multiple transmission antenna panels to enhance the reliability and robustness of uplink transmissions is a focus of work.

In 3rd Generation Partner Project (3GPP) New Radio (NR) Rel-16 standard, a variety of PDSCH transmission schemes are supported, including, in addition to Rel-5 PDSCH transmission scheme, new PDSCH transmission scheme under multiple TRPs/multiple antenna panels added in Rel-16, such as Non-Coherent Joint Transmission (NCJT) and Repetitions. In NR Rel-16 standard, the Rel-15 PDSCH transmission scheme and the Rel-16 new added transmission scheme are dynamically distinguished according to a number of Transmission Configuration Indicator (TCI) state(s) comprised in Downlink Control Information (DCI). A work item (WI) of MIMO enhancement of NR Release 17 was approved at 3GPP RAN #86 plenary, where improving reliability and robustness of a channel other than the PSDCH (such as PDCCH, PUSCH and PUCCH) is a research priority.

SUMMARY

Inventors have found through researches that how to employ multiple transmission antenna panels to enhance the reliability and robustness of transmission is a key issue to be studied.

Inventors have found through researches that repetition is a key technology to improve the reliability and robustness of a control channel. In this case, how to dynamically schedule multiple transmission schemes is a key problem to be studied.

To address the above problem, the present application provides a solution. In description of the above problem, uplink (or downlink) is illustrated as an example; the present application is also applicable to transmission scenarios of downlink (or uplink) and sidelink to achieve technical effects similar in sidelink. Additionally, the adoption of a unified solution for various scenarios (including but not limited to uplink, downlink and sidelink) contributes to the reduction of hardcore complexity and costs. It should be noted that the embodiments in a User Equipment (UE) in the present application and characteristics of the embodiments may be applied to a base station if no conflict is incurred, and vice versa. And the embodiments in the present application and the characteristics in the embodiments can be arbitrarily combined if there is no conflict.

In one embodiment, for interpretations of the terminology in the present application, refer to definitions given in the 3GPP TS36 series.

In one embodiment, for interpretations of the terminology in the present application, refer to definitions given in the 3GPP TS38 series.

In one embodiment, for interpretations of the terminology in the present application, refer to definitions given in the 3GPP TS37 series.

In one embodiment, for interpretations of the terminology in the present application, refer to definitions given in Institute of Electrical and Electronics Engineers (IEEE) protocol specifications.

The present application provides a method in a first node for wireless communications, comprising:

receiving a first information block;

transmitting a first signal in a first time unit group; and transmitting a second signal in a second time unit group;

herein, a start time of the first time unit group is earlier than a start time of the second time unit group; the first information block is used to determine a first index group and a second index group, the first index group comprises an index of each time unit in the first time unit group, and the second index group comprises an index of each time unit in the second time unit group; a minimum value of the second index group minus a maximum value of the first index group is equal to a target integer; the target integer is a first integer or a second integer, a parameter value set corresponding to the first signal and a parameter value set corresponding to the second signal are used to determine the target integer out of the first integer and the second integer; when the first signal corresponds to a first parameter value set and the second signal corresponds to a second parameter value set, the target integer is equal to the second integer; when the first signal corresponds to the second parameter value set and the second signal corresponds to the first parameter value set, the target integer is equal to the first integer; the first time unit group comprises at least one time unit, the second time unit group comprises at least one time unit, any index in the first index group is a non-negative integer, any index in the second index group is a non-negative integer, the first parameter value set comprises at least one parameter value, and the second parameter value set comprises at least one parameter value.

In one embodiment, a problem to be solved in the present application is: how to employ multiple transmission antenna panels to enhance the reliability and robustness of the transmission.

In one embodiment, a problem to be solved in the present application is: when two transmissions are respectively transmitted on different antenna panels, a time interval needs to be reserved between the two transmissions to perform an antenna-panel switching, how to determine the time interval is a key problem to be solved.

In one embodiment, the above method is essential in that a first signal and a second signal are two transmissions, which are respectively transmitted on two antenna panels (#1 and #2). TAs (TAs) of two antenna panels may be different. A first time unit group and a second time unit group are time-domain resources actually occupied by the two transmissions under their respective TAs, and a target integer represents an interval between indexes of two time unit groups, the target integer is related to whether to switch from antenna panel #1 to antenna panel #2 or from antenna panel #2 to antenna panel #1. When switching from antenna panel #1 to antenna panel #2, the target integer is equal to the second integer, and when switching from antenna panel #2 to antenna panel #1, the target integer is equal to the first integer. The advantage of adopting the above method is that the interval between the two transmissions is related to whether to switch from antenna panel #1 to antenna panel #2 or from antenna panel #2 to antenna panel #1. The interval required in different cases may be different, ensuring that there is no waste of resources and a sufficient interval can be reserved for antenna-panel switching in different cases.

According to one aspect of the present application, the above method is characterized in that the first node does not transmit a radio signal at any time between an end time of the first time unit group and a start time of the second time unit group.

According to one aspect of the present application, the above method is characterized in that a first timing value is a TA value for transmitting the first signal, and a second timing value is a TA value for transmitting the second signal; the first timing value and the first index group are used together to determine the first time unit group, and the second timing value and the second index group are used together to determine the second time unit group.

According to one aspect of the present application, the above method is characterized in comprising:

receiving a second information block;

herein, the second information block is used to determine the first timing value and the second timing value.

According to one aspect of the present application, the above method is characterized in that the first parameter value corresponds to a greater one of the first timing value and the second timing value, and the second parameter value set corresponds to a smaller one of the first timing value and the second timing value; the meaning of the phrase of the first signal corresponding to the first parameter value set and the second signal corresponding to the second parameter value set comprises: the first timing value not being less than the second timing value; the meaning of the phrase of the first signal corresponding to the second parameter value set and the second signal corresponding to the first parameter value set comprises: the first timing value not being greater than the second timing value.

In one embodiment, the above method is essential in that a TA of antenna panel #1 is not less than a TA of antenna panel #2.

According to one aspect of the present application, the above method is characterized in that the first parameter value set is used to determine a first signal group set, the second parameter value set is used to determine a second signal group set, the first signal group set comprises at least one reference signal group, and the second signal group set comprises at least one reference signal group; the first signal and a first reference signal are spatially correlated, and the second signal and the second parameter signal are spatially correlated; the meaning of the phrase of the first signal corresponding to the first parameter value set and the second signal corresponding to the second parameter value set comprises: the first reference signal belonging to the first signal group set, and the second reference signal belonging to the second signal group set; the meaning of the phrase of the first signal corresponding to the second parameter value set and the second signal corresponding to the first parameter value set comprises: the first reference signal belonging to the second signal group set, and the second reference signal belonging to the first signal group set.

In one embodiment, the above method is essential in that a first signal group set comprises a signal transmitted or received on antenna panel #1, and a second signal group set comprises a signal transmitted or received on antenna panel #2.

According to one aspect of the present application, the above method is characterized in comprising:

receiving a third information block;

herein, the third information block is used to determine the first integer and the second integer.

The present application provides a method in a second node for wireless communications, comprising:

transmitting a first information block;

receiving a first signal in a first time unit group; and receiving a second signal in a second time unit group;

herein, a start time of the first time unit group is earlier than a start time of the second time unit group; the first information block is used to determine a first index group and a second index group, the first index group comprises an index of each time unit in the first time unit group, and the second index group comprises an index of each time unit in the second time unit group; a minimum value of the second index group minus a maximum value of the first index group is equal to a target integer; the target integer is a first integer or a second integer, a parameter value set corresponding to the first signal and a parameter value set corresponding to the second signal are used to determine the target integer out of the first integer and the second integer; when the first signal corresponds to a first parameter value set and the second signal corresponds to a second parameter value set, the target integer is equal to the second integer; when the first signal corresponds to the second parameter value set and the second signal corresponds to the first parameter value set, the target integer is equal to the first integer; the first time unit group comprises at least one time unit, the second time unit group comprises at least one time unit, any index in the first index group is a non-negative integer, any index in the second index group is a non-negative integer, the first parameter value set comprises at least one parameter value, and the second parameter value set comprises at least one parameter value.

According to one aspect of the present application, the above method is characterized in that a transmitter of the first signal does not transmit a radio signal at any time between an end time of the first time unit group and a start time of the second time unit group.

According to one aspect of the present application, the above method is characterized in that a first timing value is a TA value for transmitting the first signal, and a second timing value is a TA value for transmitting the second signal; the first timing value and the first index group are used together to determine the first time unit group, and the second timing value and the second index group are used together to determine the second time unit group.

According to one aspect of the present application, the above method is characterized in comprising:

transmitting a second information block;

herein, the second information block is used to determine the first timing value and the second timing value.

According to one aspect of the present application, the above method is characterized in that the first parameter value corresponds to a greater one of the first timing value and the second timing value, and the second parameter value set corresponds to a smaller one of the first timing value and the second timing value; the meaning of the phrase of the first signal corresponding to the first parameter value set and the second signal corresponding to the second parameter value set comprises: the first timing value not being less than the second timing value; the meaning of the phrase of the first signal corresponding to the second parameter value set and the second signal corresponding to the first parameter value set comprises: the first timing value not being greater than the second timing value.

According to one aspect of the present application, the above method is characterized in that the first parameter value set is used to determine a first signal group set, the second parameter value set is used to determine a second signal group set, the first signal group set comprises at least one reference signal group, and the second signal group set comprises at least one reference signal group; the first signal and a first reference signal are spatially correlated, and the second signal and the second parameter signal are spatially correlated; the meaning of the phrase of the first signal corresponding to the first parameter value set and the second signal corresponding to the second parameter value set comprises: the first reference signal belonging to the first signal group set, and the second reference signal belonging to the second signal group set; the meaning of the phrase of the first signal corresponding to the second parameter value set and the second signal corresponding to the first parameter value set comprises: the first reference signal belonging to the second signal group set, and the second reference signal belonging to the first signal group set.

According to one aspect of the present application, the above method is characterized in comprising:

transmitting a third information block;

herein, the third information block is used to determine the first integer and the second integer.

The present application provides a first node for wireless communications, comprising:

a first receiver, receiving a first information block; and the first transmitter, transmitting a first signal in a first time unit group; and transmitting a second signal in a second time unit group;

herein, a start time of the first time unit group is earlier than a start time of the second time unit group; the first information block is used to determine a first index group and a second index group, the first index group comprises an index of each time unit in the first time unit group, and the second index group comprises an index of each time unit in the second time unit group; a minimum value of the second index group minus a maximum value of the first index group is equal to a target integer; the target integer is a first integer or a second integer, a parameter value set corresponding to the first signal and a parameter value set corresponding to the second signal are used to determine the target integer out of the first integer and the second integer; when the first signal corresponds to a first parameter value set and the second signal corresponds to a second parameter value set, the target integer is equal to the second integer; when the first signal corresponds to the second parameter value set and the second signal corresponds to the first parameter value set, the target integer is equal to the first integer; the first time unit group comprises at least one time unit, the second time unit group comprises at least one time unit, any index in the first index group is a non-negative integer, any index in the second index group is a non-negative integer, the first parameter value set comprises at least one parameter value, and the second parameter value set comprises at least one parameter value.

The present application provides a second node for wireless communications, comprising:

a second transmitter, transmitting a first information block; and a second receiver, receiving a first signal in a first time unit group; and receiving a second signal in a second time unit group;

herein, a start time of the first time unit group is earlier than a start time of the second time unit group; the first information block is used to determine a first index group and a second index group, the first index group comprises an index of each time unit in the first time unit group, and the second index group comprises an index of each time unit in the second time unit group; a minimum value of the second index group minus a maximum value of the first index group is equal to a target integer; the target integer is a first integer or a second integer, a parameter value set corresponding to the first signal and a parameter value set corresponding to the second signal are used to determine the target integer out of the first integer and the second integer; when the first signal corresponds to a first parameter value set and the second signal corresponds to a second parameter value set, the target integer is equal to the second integer; when the first signal corresponds to the second parameter value set and the second signal corresponds to the first parameter value set, the target integer is equal to the first integer; the first time unit group comprises at least one time unit, the second time unit group comprises at least one time unit, any index in the first index group is a non-negative integer, any index in the second index group is a non-negative integer, the first parameter value set comprises at least one parameter value, and the second parameter value set comprises at least one parameter value.

The present application provides a method in a first node for wireless communications, comprising:

receiving a first signaling group; and receiving a first signal group;

herein, the first signaling group is used to indicate scheduling information of the first signal group; a first number is used to determine a transmission scheme of the first signal group, a signaling format of the first signaling group is used to determine the first number, the first number being a positive integer; when the signaling format of the first signaling group belongs to a first format set, the first signaling group is used to indicate a first TCI state group out of N TCI state groups, N being a positive integer greater than 1, and the first number is equal to a number of TCI state(s) comprised in the first TCI state group; when the signaling format of the first signaling group belongs to a second format set, a number of TCI state(s) comprised in a second TCI state group is used to determine the first number, and the second TCI state group is used to receive the first signaling group; the signaling format of the first signaling group only belongs to the first format set or the second format set, the first format set is different from the second format set.

The present application provides a method in a first node for wireless communications, comprising:

receiving a first signaling group; and transmitting a first signal group;

herein, the first signaling group is used to indicate scheduling information of the first signal group; a first number is used to determine a transmission scheme of the first signal group, a signaling format of the first signaling group is used to determine the first number, the first number being a positive integer; when the signaling format of the first signaling group belongs to a first format set, the first signaling group is used to indicate a first TCI state group out of N TCI state groups, N being a positive integer greater than 1, and the first number is equal to a number of TCI state(s) comprised in the first TCI state group; when the signaling format of the first signaling group belongs to a second format set, a number of TCI state(s) comprised in a second TCI state group is used to determine the first number, and the second TCI state group is used to receive the first signaling group; the signaling format of the first signaling group only belongs to the first format set or the second format set, the first format set is different from the second format set.

In one embodiment, a problem to be solved in the present application is: how to dynamically schedule multiple transmission schemes with support for repetitions of a control channel.

In one embodiment, a first signaling group comprises one or multiple repetitions of control information, a first signal group comprises one or multiple repetitions of data, and transmission schemes corresponding to signaling formats in different format sets are determined in different ways; when a signaling format belongs to a first format set, a number of TCI state(s) comprised in control information is used to determine a scheduled transmission scheme; when a signaling format belongs to a second format set, a number of TCI state(s) used to receive control information is used to determine a scheduled transmission scheme. Advantage of adopting the above method is that different signaling formats can be dynamically scheduled for multiple transmission schemes, which is more flexible to meet different transmission requirements.

In one embodiment, a first signaling group comprises one PDCCH transmission or PDCCH repetitions, and a first signal group comprises one PDSCH transmission or PDSCH repetitions; when a DCI format belongs to a first format set, a DCI comprises a TCI state group, and a number of TCI state(s) comprised in DCI is used to determine a scheduled PDSCH transmission scheme; when a DCI format belongs to a second format set, a DCI does not comprise a TCI state group, and a number of TCI state(s) corresponding to a PDCCH is used to determine a scheduled PDSCH transmission scheme. The advantage of adopting the above method is that it overcomes the problem that only a DCI (such as DCI format 1_1, 1_2) comprising a TCI state group in NR Rel-16 standard can dynamically schedule multiple PDSCH transmission schemes (comprising Rel-15 scheme and Rel-16 scheme), and that it supports dynamic scheduling for multiple PDSCH transmission schemes for other DCI formats, which can more flexibly meet different transmission requirements.

According to one aspect of the present application, the above method is characterized in that when the first number is equal to 1, the transmission scheme of the first signal group belongs to a first transmission scheme set; when the first number is greater than 1, the transmission scheme of the first signal group belongs to a second transmission scheme set; the second transmission scheme set is different from the first transmission scheme set.

According to one aspect of the present application, the above method is characterized in that when the signaling format of the first signaling group belongs to the first format set, the first signaling group comprises a first field, and the first field comprised in the first signaling group is used to indicate the first TCI state group out of the N TCI state groups; when the signaling format of the first signaling group belongs to the second format set, the first signaling group does not comprise the first field.

According to one aspect of the present application, the above method is characterized in that when the signaling format of the first signaling group belongs to the second format set, the first number is equal to a number of TCI state(s) comprised in the second TCI state group.

According to one aspect of the present application, the above method is characterized in that when the signaling format of the first signaling group belongs to the second format set and the number of TCI states comprised in the second TCI state group is greater than 1, whether there exists a number of TCI states comprised in one of the N TCI state groups being greater than 1 is used to determine the first number.

According to one aspect of the present application, the above method is characterized in that when there exists a number of TCI states comprised in one of the N TCI state groups being greater than 1, the first number is greater than 1; when a number of TCI state(s) comprised in any of the N TCI state groups is equal to 1, the first number is equal to 1.

According to one aspect of the present application, the above method is characterized in comprising:

receiving a first information block; and receiving a second information block;

herein, the first information block is used to indicate the N TCI state groups, and the second information block is used to indicate the second TCI state group.

The present application provides a method in a second node for wireless communications, comprising:

transmitting a first signaling group; and transmitting a first signal group;

herein, the first signaling group is used to indicate scheduling information of the first signal group; a first number is used to determine a transmission scheme of the first signal group, a signaling format of the first signaling group is used to determine the first number, the first number being a positive integer; when the signaling format of the first signaling group belongs to a first format set, the first signaling group is used to indicate a first TCI state group out of N TCI state groups, N being a positive integer greater than 1, and the first number is equal to a number of TCI state(s) comprised in the first TCI state group; when the signaling format of the first signaling group belongs to a second format set, a number of TCI state(s) comprised in a second TCI state group is used to determine the first number, and the second TCI state group is used to receive the first signaling group; the signaling format of the first signaling group only belongs to the first format set or the second format set, the first format set is different from the second format set.

The present application provides a method in a second node for wireless communications, comprising:

transmitting a first signaling group; and receiving a first signal group;

herein, the first signaling group is used to indicate scheduling information of the first signal group; a first number is used to determine a transmission scheme of the first signal group, a signaling format of the first signaling group is used to determine the first number, the first number being a positive integer; when the signaling format of the first signaling group belongs to a first format set, the first signaling group is used to indicate a first TCI state group out of N TCI state groups, N being a positive integer greater than 1, and the first number is equal to a number of TCI state(s) comprised in the first TCI state group; when the signaling format of the first signaling group belongs to a second format set, a number of TCI state(s) comprised in a second TCI state group is used to determine the first number, and the second TCI state group is used to receive the first signaling group; the signaling format of the first signaling group only belongs to the first format set or the second format set, the first format set is different from the second format set.

According to one aspect of the present application, the above method is characterized in that when the first number is equal to 1, the transmission scheme of the first signal group belongs to a first transmission scheme set; when the first number is greater than 1, the transmission scheme of the first signal group belongs to a second transmission scheme set; the second transmission scheme set is different from the first transmission scheme set.

According to one aspect of the present application, the above method is characterized in that when the signaling format of the first signaling group belongs to the first format set, the first signaling group comprises a first field, and the first field comprised in the first signaling group is used to indicate the first TCI state group out of the N TCI state groups; when the signaling format of the first signaling group belongs to the second format set, the first signaling group does not comprise the first field.

According to one aspect of the present application, the above method is characterized in that when the signaling format of the first signaling group belongs to the second format set, the first number is equal to a number of TCI state(s) comprised in the second TCI state group.

According to one aspect of the present application, the above method is characterized in that when the signaling format of the first signaling group belongs to the second format set and the number of TCI states comprised in the second TCI state group is greater than 1, whether there exists a number of TCI states comprised in one of the N TCI state groups being greater than 1 is used to determine the first number.

According to one aspect of the present application, the above method is characterized in that when there exists a number of TCI states comprised in one of the N TCI state groups being greater than 1, the first number is greater than 1; when a number of TCI state(s) comprised in any of the N TCI state groups is equal to 1, the first number is equal to 1.

According to one aspect of the present application, the above method is characterized in comprising:

transmitting a first information block; and transmitting a second information block;

herein, the first information block is used to indicate the N TCI state groups, and the second information block is used to indicate the second TCI state group.

The present application provides a first node for wireless communications, comprising:

a first receiver, receiving a first signaling group; and a first transceiver, receiving a first signal group;

herein, the first signaling group is used to indicate scheduling information of the first signal group; a first number is used to determine a transmission scheme of the first signal group, a signaling format of the first signaling group is used to determine the first number, the first number being a positive integer; when the signaling format of the first signaling group belongs to a first format set, the first signaling group is used to indicate a first TCI state group out of N TCI state groups, N being a positive integer greater than 1, and the first number is equal to a number of TCI state(s) comprised in the first TCI state group; when the signaling format of the first signaling group belongs to a second format set, a number of TCI state(s) comprised in a second TCI state group is used to determine the first number, and the second TCI state group is used to receive the first signaling group; the signaling format of the first signaling group only belongs to the first format set or the second format set, the first format set is different from the second format set.

The present application provides a first node for wireless communications, comprising:

a first receiver, receiving a first signaling group; and a first transceiver, transmitting a first signal group;

herein, the first signaling group is used to indicate scheduling information of the first signal group; a first number is used to determine a transmission scheme of the first signal group, a signaling format of the first signaling group is used to determine the first number, the first number being a positive integer; when the signaling format of the first signaling group belongs to a first format set, the first signaling group is used to indicate a first TCI state group out of N TCI state groups, N being a positive integer greater than 1, and the first number is equal to a number of TCI state(s) comprised in the first TCI state group; when the signaling format of the first signaling group belongs to a second format set, a number of TCI state(s) comprised in a second TCI state group is used to determine the first number, and the second TCI state group is used to receive the first signaling group; the signaling format of the first signaling group only belongs to the first format set or the second format set, the first format set is different from the second format set.

The present application provides a second node for wireless communications, comprising:

a second transmitter, transmitting a first signaling group; and a second transceiver, transmitting a first signal group;

herein, the first signaling group is used to indicate scheduling information of the first signal group; a first number is used to determine a transmission scheme of the first signal group, a signaling format of the first signaling group is used to determine the first number, the first number being a positive integer; when the signaling format of the first signaling group belongs to a first format set, the first signaling group is used to indicate a first TCI state group out of N TCI state groups, N being a positive integer greater than 1, and the first number is equal to a number of TCI state(s) comprised in the first TCI state group; when the signaling format of the first signaling group belongs to a second format set, a number of TCI state(s) comprised in a second TCI state group is used to determine the first number, and the second TCI state group is used to receive the first signaling group; the signaling format of the first signaling group only belongs to the first format set or the second format set, the first format set is different from the second format set.

The present application provides a second node for wireless communications, comprising:

a second transmitter, transmitting a first signaling group; and a second transceiver, receiving a first signal group;

herein, the first signaling group is used to indicate scheduling information of the first signal group; a first number is used to determine a transmission scheme of the first signal group, a signaling format of the first signaling group is used to determine the first number, the first number being a positive integer; when the signaling format of the first signaling group belongs to a first format set, the first signaling group is used to indicate a first TCI state group out of N TCI state groups, N being a positive integer greater than 1, and the first number is equal to a number of TCI state(s) comprised in the first TCI state group; when the signaling format of the first signaling group belongs to a second format set, a number of TCI state(s) comprised in a second TCI state group is used to determine the first number, and the second TCI state group is used to receive the first signaling group; the signaling format of the first signaling group only belongs to the first format set or the second format set, the first format set is different from the second format set.

In one embodiment, the method in the present application is advantageous in the following aspects:

the present application proposes a scheme to employ multiple transmission antenna panels to enhance the reliability and robustness of the transmission.

the present application proposes a scheme of how to determine a time interval between transmissions transmitted on different antenna panels;

in the method proposed in the present application, TAs of two antenna panels may be different, and an interval between the two transmissions transmitted by two antenna panels is related to whether to switch from antenna panel #1 to antenna panel #2 or from antenna panel #2 to antenna panel #1, which ensures that there is no waste of resources and a sufficient interval can be reserved for antenna-panel switching in different cases.

In one embodiment, the method in the present application is advantageous in the following aspects:

through the method proposed in the present application, dynamic scheduling for multiple transmission schemes in different signaling formats is achieved;

the method proposed in the present application overcomes the problem that only DCI (such as DCI format 1_1, 1_2) comprising a TCI state group in NR Rd-16 standard can dynamically schedule multiple PDSCH transmission schemes (comprising Rel-15 scheme and Rel-16 scheme), the proposed method can also support dynamic scheduling for multiple PDSCH transmission schemes for other DCI formats;

the method proposed in the present application can more flexibly meet different transmission requirements.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1A

Figure 1A:
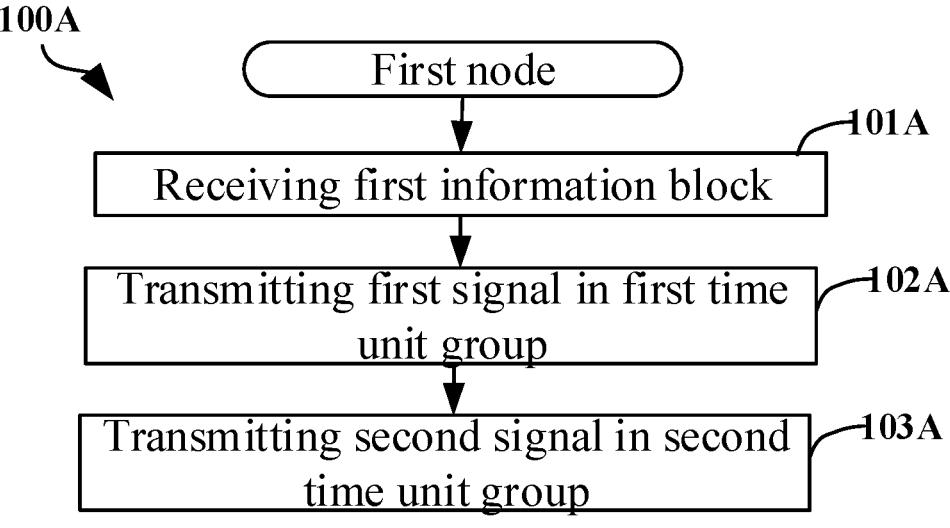
FIG. 1A illustrates a flowchart of a first information block, a first signal and a second signal according to one embodiment of the present application.

Embodiment 1A illustrates a flowchart of a first information block set, a first signaling, a first signal and a first bit block according to one embodiment of the present application, as shown in FIG. 1A. In FIG. 1A, each box represents a step. Particularly, the sequential order of steps in these boxes does not necessarily mean that the steps are chronologically arranged.

In Embodiment 1A, the first node in the present application receives a first information block in step 101A; transmits a first signal in a first time unit group in step 102A; transmits a second signal in a second time unit in step 103A; herein, a start time of the first time unit group is earlier than a start time of the second time unit group; the first information block is used to determine a first index group and a second index group, the first index group comprises an index of each time unit in the first time unit group, and the second index group comprises an index of each time unit in the second time unit group; a minimum value of the second index group minus a maximum value of the first index group is equal to a target integer; the target integer is a first integer or a second integer, a parameter value set corresponding to the first signal and a parameter value set corresponding to the second signal are used to determine the target integer out of the first integer and the second integer; when the first signal corresponds to a first parameter value set and the second signal corresponds to a second parameter value set, the target integer is equal to the second integer; when the first signal corresponds to the second parameter value set and the second signal corresponds to the first parameter value set, the target integer is equal to the first integer; the first time unit group comprises at least one time unit, the second time unit group comprises at least one time unit, any index in the first index group is a non-negative integer, any index in the second index group is a non-negative integer, the first parameter value set comprises at least one parameter value, and the second parameter value set comprises at least one parameter value.

In one embodiment, the first information block is semi-statically configured.

In one embodiment, the first information block is carried by a higher-layer signaling.

In one embodiment, the first information block is carried by an RRC signaling.

In one embodiment, the first information block comprises one Information Element (IE) in an RRC signaling.

In one embodiment, the first information block comprises multiple IEs in an RRC signaling.

In one embodiment, the first information block is carried by a MAC CE signaling.

In one embodiment, the first information block is carried by a physical-layer signaling.

In one embodiment, the first information block is carried by Downlink Control Information (DCI).

In one embodiment, the first information block comprises at least one field in a DCI signaling.

In one embodiment, the first time unit group comprises a time unit.

In one embodiment, the first time unit group comprises multiple mutually-orthogonal time units.

In one embodiment, the second time unit group comprises a time unit.

In one embodiment, the second time unit group comprises multiple mutually-orthogonal time units.

In one embodiment, one time unit comprises one multi-carrier symbol.

In one embodiment, one time unit comprises one single-carrier symbol.

In one embodiment, durations of any two time units in the first time unit group and the second time unit group are the same.

In one embodiment, numbers of multicarrier symbol(s) comprised in any two time units in the first time unit group and the second time unit group are the same.

In one embodiment, numbers of single-carrier symbol(s) comprised in any two time units in the first time unit group and the second time unit group are the same.

In one embodiment, an end time of the first time unit group is earlier than an end time of the second time unit group.

In one embodiment, an end time of the first time unit group is earlier than a start time of the second time unit group.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, a number of index(es) comprised in the first index group is equal to a number of time unit(s) comprised in the first time unit group, and a number of index(es) comprised in the second index is equal to a number of time unit(s) comprised in the second time unit group.

In one embodiment, the first index group comprises multiple indexes, and multiple indexes comprised in the first index group is a group of consecutive integers.

In one embodiment, the second index group comprises multiple indexes, and multiple indexes comprised in the second index group is a group of consecutive integers.

In one embodiment, any index in the first index group is a positive integer, and any index in the second index group is a positive integer.

In one embodiment, a first slot is a slot comprising the first time unit group, a second slot is a slot comprising the second time unit group, both the first slot and the second slot comprise M mutually-orthogonal time units, M being a positive integer greater than 1, and an index of the first slot is the same as an index of the second slot; a first given time unit is any time unit in the first time unit group, an index of the first given time unit comprised in the first index group is an index of the first given time unit in the first slot; a second given time unit is any time unit in the second time unit group, and an index of the second given time unit comprised in the second index group is an index of the second given time unit in the second slot.

In one subembodiment of the above embodiment, the first given time unit is an m1+1th time unit arranged in an ascending chronological order in the first slot, m1 is a non-negative integer less than M, and the index of the first given time unit in the first slot is equal to the m1; the second given time unit is an m2+1th time unit arranged in an ascending chronological order in the second slot, m2 is a non-negative integer less than M, and the index of the second given time unit in the second slot is equal to the m2.

In one subembodiment of the above embodiment, the first given time unit is an m1-th time unit arranged in an ascending chronological order in the first slot, m1 is a positive integer not greater than M, and the index of the first given time unit in the first slot is equal to the m1; the second given time unit is an m2-th time unit arranged in an ascending chronological order in the second slot, m2 is a positive integer not greater than M, and the index of the second given time unit in the second slot is equal to the m2.

In one subembodiment of the above embodiment, any index in the first index group and the second index group is a positive integer not greater than M.

In one subembodiment of the above embodiment, any index in the first index group and the second index group is a non-negative integer not greater than M−1.

In one subembodiment of the above embodiment, M is equal to 14.

In one subembodiment of the above embodiment, M is equal to 7.

In one embodiment, a first slot is a slot comprising the first time unit group, a second slot is a slot comprising the second time unit group, both the first slot and the second slot comprise M mutually-orthogonal time units, M being a positive integer greater than 1, and a difference value of an index of the second slot and an index of the first slot is equal to 1; a first given time unit is any time unit in the first time unit group, an index of the first given time unit comprised in the first index group is an index of the first given time unit in the first slot; a second given time unit is any time unit in the second time unit group, and an index of the second given time unit comprised in the second index group is a sum of an index of the second given time unit in the second slot and the M.

In one subembodiment of the above embodiment, the first given time unit is an m1+1th time unit arranged in an ascending chronological order in the first slot, m1 is a non-negative integer less than the M, and the index of the first given time unit in the first slot is equal to the m1; the second given time unit is an m2+1th time unit arranged in an ascending chronological order in the second slot, m2 is a non-negative integer less than the M, and the index of the second given time unit in the second slot is equal to the m2.

In one subembodiment of the above embodiment, the first given time unit is an m1-th time unit arranged in an ascending chronological order in the first slot, m1 is a positive integer not greater than the M, and the index of the first given time unit in the first slot is equal to the m1; the second given time unit is an m2-th time unit arranged in an ascending chronological order in the second slot, m2 is a positive integer not greater than the M, and the index of the second given time unit in the second slot is equal to the m2.

In one subembodiment of the above embodiment, any index in the first index group is a positive integer not greater than the M, and any index in the second index group is a positive integer greater than the M and not greater than 2M.

In one subembodiment of the above embodiment, any index in the first index group is a non-negative integer not greater than M−1, and any index in the second index group is a positive integer greater than M−1 and not greater than 2M−1.

In one subembodiment of the above embodiment, M is equal to 14.

In one subembodiment of the above embodiment, M is equal to 7.

In one embodiment, the first information block is used to indicate a first index group and a second index group.

In one embodiment, the first information block explicitly indicates a first index group and a second index group.

In one embodiment, the first information block implicitly indicates a first index group and a second index group.

In one embodiment, the first information block is used to indicate a first index group, and the first index group and the target integer are used to determine the second index group.

In one subembodiment of the above embodiment, the first information block explicitly indicates a first index group.

In one subembodiment of the above embodiment, the first information block implicitly indicates a first index group.

In one subembodiment of the above embodiment, the first information block indicates a first index sub-group, the first index sub-group comprises partial index(es) in the first index group, and the first index sub-group is used to determine the first index group.

In one embodiment, an index comprised in the second index group is a group of consecutive integers, and a minimum value of the second index group is a sum of a maximum value of the first index group and the target integer.

In one embodiment, a number of time unit(s) comprised in the second time unit group is equal to a number of time unit(s) comprised in the first time unit group, and a number of index(es) comprised in the second index group is equal to a number of index(es) comprised in the first index group.

In one embodiment, a number of time unit(s) comprised in the second time unit group is not greater than a number of time unit(s) comprised in the first time unit group, and a number of index(es) comprised in the second index group is not greater than a number of index(es) comprised in the first index group.

In one embodiment, N is a positive integer greater than 2; the first information block is used to determine N index groups, the N index groups respectively comprise an index of each time unit in the N time unit groups, and the first index group and the second index group are respectively two index groups in the N index groups.

In one subembodiment of the above embodiment, the first information block is used to indicate N index groups.

In one subembodiment of the above embodiment, the first information block explicitly indicates N index groups.

In one subembodiment of the above embodiment, the first information block implicitly indicates N index groups.

In one subembodiment of the above embodiment, the first information block is used to indicate an earliest index group in N index groups.

In one subembodiment of the above embodiment, both the first signal and the second signal carry a first bit block, and the N time unit groups are respectively reserved for N repetitions of the first bit block.

In one subembodiment of the above embodiment, the first signal carries a first bit block, the second signal carries a second bit block, the N time unit groups are respectively reserved for transmissions of N bit blocks, the first bit block is one of the N bit blocks, and the second bit block is one of the N bit blocks.

In one subembodiment of the above embodiment, the first time unit group and the second time unit group are respectively two adjacent time unit groups in time in the N time unit groups.

In one subembodiment of the above embodiment, the first time unit group and the second time unit group are respectively any two adjacent time unit groups in time in the N time unit groups.

In one embodiment, the first signal and the second signal belong to a same carrier in frequency domain.

In one embodiment, the first signal and the second signal belong to a same BWP in frequency domain.

In one embodiment, both the first signal and the second signal carry a first bit block.

In one embodiment, the first signal comprises at least one sub-signal, and the second signal comprises at least one sub-signal; any two sub-signals in the first signal and the second signal carry a first bit block.

In one embodiment, the first signal carries a first bit block, and the second signal carries a second bit block; the first bit block comprises at least one bit, and the second bit block comprises at least one bit.

In one subembodiment of the above embodiment, the first bit block and the second bit block respectively comprise different TBs.

In one subembodiment of the above embodiment, the first bit block comprises at least one TB, and the second bit block comprises at least one TB.

In one subembodiment of the above embodiment, the first bit block comprises one TB, and the second bit block comprises one TB.

In one embodiment, the first bit block comprises at least one bit.

In one embodiment, the first bit block comprises at least one TB.

In one embodiment, the first bit block comprises one TB.

In one embodiment, the first bit block comprises Uplink Control Information (UCI).

In one embodiment, the first bit block comprises Hybrid Automatic Repeat reQuest ACKnowledgement (HARQ-ACK).

In one embodiment, the first information block also indicates frequency-domain resources occupied by the first signal.

In one embodiment, the first information block also indicates frequency-domain resources occupied by the second signal.

In one embodiment, frequency-domain resources occupied by the first signal are used to determine frequency-domain resources occupied by the second signal.

In one subembodiment of the above embodiment, frequency-domain resources occupied by the first signal are the same as frequency-domain resources occupied by the second signal.

In one subembodiment of the above embodiment, frequency-domain resources occupied by the second signal are an offset of frequency-domain resources occupied by the second signal in frequency domain.

In one embodiment, the first information block also indicates a TCI state of the first signal and a TCI state of the second signal.

In one embodiment, the first information block indicates scheduling information of the first signal and scheduling information of the second signal.

In one embodiment, the scheduling information of the first signal comprises at least one of occupied time-domain resources, occupied frequency-domain resources, a Modulation and Coding Scheme (MCS), configuration information of DeModulation Reference Signals (DMRS), a Hybrid Automatic Repeat request (HARQ) process number, a Redundancy Version (RV), a New Data Indicator (NDI), a transmission antenna port, or a corresponding Transmission Configuration Indicator (TCI) state.

In one subembodiment of the above embodiment, configuration information of the DMRS comprises at least one of a Reference Signal (RS) sequence, a mapping mode, a DMRS type, occupied time-domain resources, occupied frequency-domain resources, occupied code-domain resources, a cyclic shift, or an Orthogonal Cover Code (OCC).

In one embodiment, the scheduling information of the second signal comprises at least one of occupied time-domain resources, occupied frequency-domain resources, a Modulation and Coding Scheme (MCS), configuration information of DeModulation Reference Signals (DMRS), a Hybrid Automatic Repeat request (HARQ) process number, a Redundancy Version (RV), a New Data Indicator (NDI), a transmission antenna port, or a corresponding Transmission Configuration Indicator (TCI) state.

In one subembodiment of the above embodiment, configuration information of the DMRS comprises at least one of a Reference Signal (RS) sequence, a mapping mode, a DMRS type, occupied time-domain resources, occupied frequency-domain resources, occupied code-domain resources, a cyclic shift, or an Orthogonal Cover Code (OCC).

In one embodiment, the target integer is a non-negative integer, the first integer is a non-negative integer, and the second integer is a non-negative integer.

In one embodiment, the target integer is a positive integer, the first integer is a positive integer, and the second integer is a positive integer.

In one embodiment, the target integer is a non-negative, and the first integer or the second integer is a negative integer.

In one embodiment, the first integer and the second integer are the same.

In one embodiment, the first integer and the second integer are different.

In one embodiment, the second integer is not greater than the first integer.

In one embodiment, the second integer is less than the first integer.

Embodiment 1B

Figure 1B:
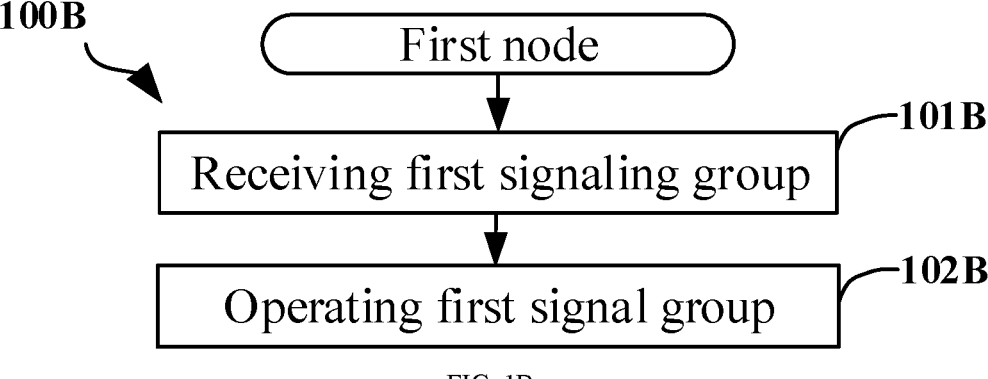
FIG. 1B illustrates a flowchart of a first signaling and a first signal group according to one embodiment of the present application.

Embodiment 1B illustrates a flowchart of a first signaling group and a first signal group according to one embodiment of the present application, as shown in FIG. 1B. In FIG. 1B, each box represents a step. Particularly, the sequential order of steps in these boxes does not necessarily mean that the steps are chronologically arranged.

In Embodiment 1B, the first node in the present application receives a first signaling group in step 101B; operates a first signal group in step 102B; herein, the first signaling group is used to indicate scheduling information of the first signal group; a first number is used to determine a transmission scheme of the first signal group, a signaling format of the first signaling group is used to determine the first number, the first number being a positive integer; when the signaling format of the first signaling group belongs to a first format set, the first signaling group is used to indicate a first TCI state group out of N TCI state groups, N being a positive integer greater than 1, and the first number is equal to a number of TCI state(s) comprised in the first TCI state group; when the signaling format of the first signaling group belongs to a second format set, a number of TCI state(s) comprised in a second TCI state group is used to determine the first number, and the second TCI state group is used to receive the first signaling group; the signaling format of the first signaling group only belongs to the first format set or the second format set, the first format set is different from the second format set; the operating action is transmitting, or the operating action is receiving.

In one embodiment, the first signaling group comprises at least one signaling.

In one embodiment, the first signaling group comprises a third information block, and a number of signaling(s) comprised in the first signaling group is equal to a number of repetition(s) of the third information block; when the first signaling group only comprises one signaling, a number of repetition(s) of the third information block is equal to 1; when the first signaling group comprises S1 signalings, and a number of repetition(s) of the third information block is equal to S1, S1 being a positive integer greater than 1.

In one embodiment, the third information block comprises a DCI.

In one embodiment, the third information block comprises partial fields in a DCI.

In one embodiment, the first signaling group only comprises a signaling, and the first signaling group carries a third information block.

In one embodiment, the first signaling group comprises S1 signalings, S1 being a positive integer greater than 1.

In one subembodiment of the above embodiment, any of the S1 signalings comprises a third information block.

In one subembodiment of the above embodiment, the S1 signalings are respectively S1 repetitions of a third information block.

In one subembodiment of the above embodiment, the S1 signalings are respectively S1 repetitions of PDCCH.

In one subembodiment of the above embodiment, the S1 signalings are used to schedule a same TB.

In one subembodiment of the above embodiment, the S1 signalings are used to schedule a same CBG.

In one subembodiment of the above embodiment, any of the S1 signalings is used to schedule a signal in the first signal group.

In one subembodiment of the above embodiment, any of the S1 signalings is used to schedule at least one signal in the first signal group.

In one subembodiment of the above embodiment, any of the S1 signalings is used to schedule the first signal group.

In one subembodiment of the above embodiment, any signal in the first signal group is scheduled by one of the S1 signalings.

In one subembodiment of the above embodiment, any signal in the first signal group is scheduled by at least one of the S1 signalings.

In one embodiment, any signaling in the first signaling group is a physical layer signaling.

In one embodiment, any signaling in the first signaling group is dynamically configured.

In one embodiment, any signaling in the first signaling group is a DCI signaling.

In one embodiment, any signaling in the first signaling group is transmitted on a downlink physical layer control channel (i.e., a downlink channel only capable of carrying a physical layer signaling).

In one embodiment, any signaling in the first signaling group is used to schedule a downlink physical-layer data channel.

In one embodiment, the downlink physical-layer control channel is a Physical Downlink Control CHannel (PDCCH).

In one embodiment, the downlink physical-layer control channel is a short PDCCH (sPDCCH).

In one embodiment, the downlink physical layer control channel is a Narrow Band PDCCH (NB-PDCCH).

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a Narrow Band PDSCH (NB-PDSCH).

In one embodiment, the first signal group is transmitted on a downlink physical layer data channel (i.e., a downlink channel capable of carrying physical layer data).

In one embodiment, the first signal group comprises at least one signal.

In one embodiment, the first signal group carries a first bit block, and a number of signal(s) comprised in the first signal group is equal to a number of repetition(s) of the first bit block; when the first signal group only comprises one signal, a number of repetition(s) of the first bit block is equal to 1; when the first signal group comprises S2 signals, a number of repetitions of the first bit block is equal to S2, S2 being a positive integer greater than 1.

In one embodiment, the first signal group only comprises one signal, the first signal group carries a first bit block, and the first bit block set comprises at least one bit.

In one embodiment, the first signal group comprises S2 signals, S2 being a positive integer greater than 1.

In one subembodiment of the above embodiment, S2 is equal to S1.

In one subembodiment of the above embodiment, S2 is not equal to S1.

In one subembodiment of the above embodiment, any of the S2 signals carries a first bit block, and the first bit block comprises at least one bit.

In one subembodiment of the above embodiment, the S2 signals are respectively S2 repetitions of a first bit block.

In one embodiment, the first bit block comprises at least one TB.

In one embodiment, the first bit block comprises one TB.

In one embodiment, the first bit block comprises at least one Code Block Group (CBG).

In one embodiment, any signal in the first signal group is obtained after the first bit block is sequentially subjected to CRC Insertion, Channel Coding, Rate Matching, Scrambling, Modulation, Layer Mapping, Precoding, Mapping to Resource Element, OFDM Baseband Signal Generation, and Modulation and Upconversion.

In one embodiment, any signal in the first signal group is obtained after the first bit block is sequentially subjected to CRC Insertion, Channel Coding, Rate Matching, Scrambling, Modulation, Layer Mapping, Precoding, Mapping to Virtual Resource Blocks, Mapping from Virtual to Physical Resource Blocks, OFDM Baseband Signal Generation and Modulation or Upconversion.

In one embodiment, any signal in the first signal group is obtained after the first bit block is sequentially subjected to CRC Insertion, Segmentation, CRC Insertion, Channel Coding, Rate Matching, Concatenation, Scrambling, Modulation, Layer Mapping, Precoding, Mapping to Resource Element, OFDM Baseband Signal Generation, and Modulation and Upconversion.

In one embodiment, a first signal and a second signal are respectively any two of the S2 signals, a second bit block is obtained after the first bit block is subjected to channel coding, a target bit block and a second target bit block respectively generate the first signal and the second signal, a value of an RV of the first signal is used to determine the first target bit block out of the second bit block, and an RV value of the second signal is used to determine the second target bit block out of the second bit block; the first target bit block belongs to the second bit block, and the second target bit block belongs to the second bit block.

In one subembodiment of the above embodiment, the second bit block is an input of rate matching, the first target bit block is an output of rate matching, and an RV value of the first signal determines a first bit of the first target bit block.

In one subembodiment of the above embodiment, the second bit block is an input of rate matching, the second target bit block is an output of rate matching, and an RV value of the second signal determines a first bit of the second target bit block.

In one subembodiment of the above embodiment, the second bit block is $d_0, d_1, \ldots, d_{N-1}$, the first target bit block is $f_0, f_1, \ldots, f_{E-1}$, for the specific meanings of the $d_0, d_1, \ldots, d_{N-1}$ and the $f_0, f_1, \ldots, f_{E-1}$, refer to section 5.4 in 3GPP TS38. 212.

In one subembodiment of the above embodiment, the second bit block is $d_0, d_1, \ldots, d_{N-1}$, the second target bit block is $f_0, f_1, \ldots, f_{E-1}$, for the specific meanings of the $d_0, d_1, \ldots, d_{N-1}$ and the $f_0, f_1, \ldots, f_{E-1}$ refer to section 5.4 in 3GPP TS38. 212.

In one embodiment, the operating action is receiving.

In one embodiment, the operating action is transmitting.

In one embodiment, the scheduling information of the first signal group comprises at least one of occupied time-domain resources, occupied frequency-domain resources, a Modulation and Coding Scheme (MCS), configuration information of DeModulation Reference Signals (DMRS), a Hybrid Automatic Repeat request (HARQ) process number, a Redundancy Version (RV), a New Data Indicator (NDI), a DMRS antenna port, or a corresponding Transmission Configuration Indicator (TCI) state group.

In one subembodiment of the above embodiment, configuration information of the DMRS comprises at least one of a Reference Signal (RS) sequence, a mapping mode, a DMRS type, occupied time-domain resources, occupied frequency-domain resources, occupied code-domain resources, a cyclic shift, or an Orthogonal Cover Code (OCC).

In one embodiment, the first number is equal to 1 or 2.

In one embodiment, the first number is equal to 1 or greater than 1.

In one embodiment, the first number is equal to a number of TCI state(s) comprised in a TCI state group corresponding to the first signal group.

In one embodiment, a TCI state group corresponding to the first signal group comprises more than one TCI state, and any two TCI states in a TCI state group corresponding to the first signal group are different.

In one embodiment, a TCI state group corresponding to the first signal group comprises two TCI states, and two TCI states in a TCI state group corresponding to the first signal group are different.

In one embodiment, a TCI state group corresponding to the first signaling group comprises more than one TCI state, and any two TCI states in a TCI state group corresponding to the first signaling group are different.

In one embodiment, a TCI state group corresponding to the first signaling group comprises two TCI states, and two TCI states in a TCI state group corresponding to the first signaling group are different.

In one embodiment, the transmission scheme of the first signal group comprises: a number of TCI state(s) corresponding to the first signal group.

In one embodiment, the transmission scheme of the first signal group comprises a number of DeModulation Reference Signals (DMRS) CDM group(s) corresponding to the first signal group.

In one embodiment, the transmission scheme of the first signal group comprises a magnitude relation between a number of DMRS CDM group(s) corresponding to the first signal group and a number of TCI state(s) corresponding to the first signal group.

In one embodiment, the transmission scheme of the first signal group comprises whether a number of DMRS CDM group(s) corresponding to the first signal group is the same as a number of TCI state(s) corresponding to the first signal group.

In one embodiment, the transmission scheme of the first signal group comprises whether the first signal group comprises a repetition.

In one embodiment, the transmission scheme of the first signal group comprises a number of repetition(s) corresponding to the first signal group.

In one embodiment, the transmission scheme of the first signal group comprises whether a number of repetition(s) corresponding to the first signal group is configurable or pre-defined.

In one embodiment, the transmission scheme of the first signal group comprises whether a number of repetition(s) corresponding to the first signal group is explicitly indicated or implicitly determined.

In one embodiment, the transmission scheme of the first signal group comprises whether it is a slot-level repetition or a mini-slot-level repetition.

In one embodiment, the transmission scheme of the first signal group comprises whether it is an inter-slot repetition or an intra-slot repetition.

In one embodiment, the transmission scheme of the first signal group comprises whether it is NR Rel-15 transmission scheme or NR Rel-16 transmission scheme.

In one embodiment, the transmission scheme of the first signal group comprises whether it is single-point transmission or multi-point transmission.

In one embodiment, the transmission scheme of the first signal group comprises which of space-division multiplexing, time-division multiplexing repetition and frequency-domain diversity repetition.

In one embodiment, the transmission scheme of the first signal group comprises which of single-point transmission, multi-point Space Division Multiplexing (SDM), multi-point Time Division Multiplexing (TDM) repetition, multi-point Frequency Division Multiplexing (FDM) repetition.

In one embodiment, the transmission scheme of the first signal group comprises which of NR Rel-15 transmission scheme, NCJT, FDMSchemeA, FDMSchemeB and TDMSchemeA.

In one embodiment, the multi-point TDM repetition is 'TDMSchemeA', and for the specific meaning of the 'TDMSchemeA', refer to section 5.1 in 3GPP TS38. 214.

In one embodiment, the multi-point FDM repetition is 'FDMSchemeA', and for the specific meaning of the 'FDMSchemeA', refer to section 5.1 in 3GPP TS38. 214.

In one embodiment, the multi-point FDM repetition is 'FDMSchemeB', and for the specific meaning of the 'FDMSchemeB', refer to section 5.1 in 3GPP TS38. 214.

In one embodiment, for a reception of the multi-point space division multiplexing by a UE, refer to section 5.1.6.2 in 3GPP TS38. 214.

In one embodiment, when the signaling format of the first signaling group belongs to a first format set, the first signaling group is used to indicate a first TCI state group out of N TCI state groups, N being a positive integer greater than 1, and the first number is equal to a number of TCI state(s) comprised in the first TCI state group; when the signaling format of the first signaling group belongs to a second format set, a number of TCI state(s) comprised in a second TCI state group is used to determine the first number, and the second TCI state group is used to receive the first signaling group.

In one embodiment, the signaling format is a DCI format.

In one embodiment, the first format set comprises at least one signaling format, and the second format set comprises at least one signaling format; the signaling format of the first signaling group is a signaling format in the first format set, or the signaling format of the first signaling group is a signaling format in the first format set.

In one embodiment, the signaling format of the first signaling group is not a signaling format other than the first format set and the second format set.

In one embodiment, any signaling format in the first format set does not belong to the second format set.

In one embodiment, there exists a signaling format in the first format set not belonging to the second format set.

In one embodiment, at least one signaling format in the first format set does not belong to the second format set.

In one embodiment, the first format set comprises DCI format 1_1.

In one embodiment, the first format set comprises DCI format 1_2.

In one embodiment, the first format set comprises DCI format 1_1 and DCI format 1_2.

In one embodiment, the first format set comprises DCI format 0_1.

In one embodiment, the first format set comprises DCI format 0_2.

In one embodiment, the first format set comprises DCI format 0_1 and DCI format 0_2.

In one embodiment, the first format set comprises DCI format 1_1 and DCI format 0_1.

In one embodiment, the first format set comprises DCI format 1_2 and DCI format 0_2.

In one embodiment, the first format set comprises DCI format 1_1, DCI format 0_1, DCI format 1_2 and DCI format 0_2.

In one embodiment, the second format set comprises DCI format 1_0.

In one embodiment, the second format set comprises DCI format 0_0.

In one embodiment, the second format set comprises DCI format 1_0 and DCI format 0_0.

In one embodiment, any of the N TCI state groups comprises at least one TCI state.

In one embodiment, any TCI state in the N TCI state groups comprises TypeD QCL parameter.

In one embodiment, any TCI state in the N TCI state groups comprises a spatial Rx parameter.

In one embodiment, any TCI state in the N TCI state groups comprises a spatial-domain filter.

In one embodiment, a number of TCI state(s) comprised in any of the N TCI state groups is equal to 1.

In one embodiment, there exists a number of TCI states comprised in at least one of the N TCI state groups being greater than 1.

In one embodiment, there exists a number of TCI states comprised in at least one of the N TCI state groups being equal to 2.

In one embodiment, the first TCI state group is one of the N TCI state groups.

In one embodiment, N is equal to 8.

In one embodiment, N is less than 8.

In one embodiment, when the signaling format of the first signaling group belongs to a first format set, the first TCI state group is a TCI state group corresponding to the first signal group.

In one embodiment, when the signaling format of the first signaling group belongs to a first format set, the first TCI state group is used to receive the first signal group.

In one embodiment, when the signaling format of the first signaling group belongs to a second format set, the second TCI state group is used to receive the first signal group.

In one embodiment, when the signaling format of the first signaling group belongs to a second format set, at least one TCI state in the second TCI state group is used to receive the first signal group.

In one embodiment, when the signaling format of the first signaling group belongs to a second format set, at least one TCI state in the second TCI state group is used to receive the first signal group, and a number of TCI state(s) used to receive the first signal group in the second TCI state group is equal to the first number.

In one embodiment, a TCI state corresponding to a given signal indicates a TCI state used to receive the given signal.

In one embodiment, a TCI state group corresponding to a given signal group indicates a TCI state group used to receive the given signal group.

In one embodiment, a first number is used to determine whether a transmission scheme of the first signal group belongs to a first transmission scheme set or belongs to a second transmission scheme set.

In one embodiment, a first parameter set is used to determine a transmission scheme of the first signal group, the first parameter set comprises more than one parameter, and the first number is a value of a parameter in the first parameter set.

In one embodiment, a first number is used to determine which of M transmission schemes a transmission scheme of the first signal group is, M being a positive integer greater than 1.

In one embodiment, a first number is used to determine M1 transmission schemes out of M transmission schemes, and a transmission scheme of the first signal group is one of the M1 transmission scheme(s), M being a positive integer greater than 1, M1 being a positive integer less than M.

Embodiment 2

Figure 2:
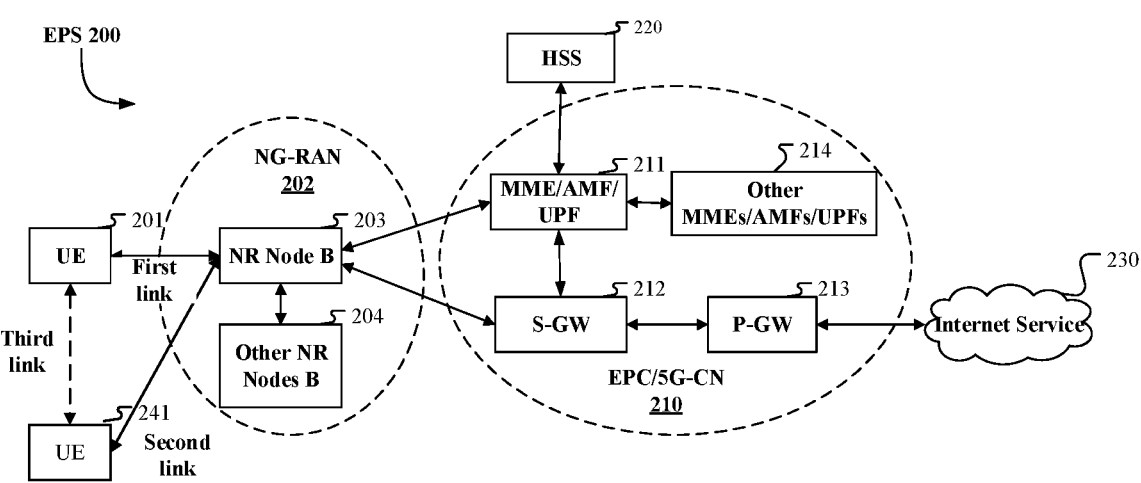
FIG. 2 illustrates a schematic diagram of a network architecture according to one embodiment of the present application.

Embodiment 2 illustrates a schematic diagram of a network architecture according to the present application, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the UE 241 corresponds to the second node in the present application.

In one embodiment, the gNB 203 corresponds to the second node in the present application.

Embodiment 3

Figure 3:
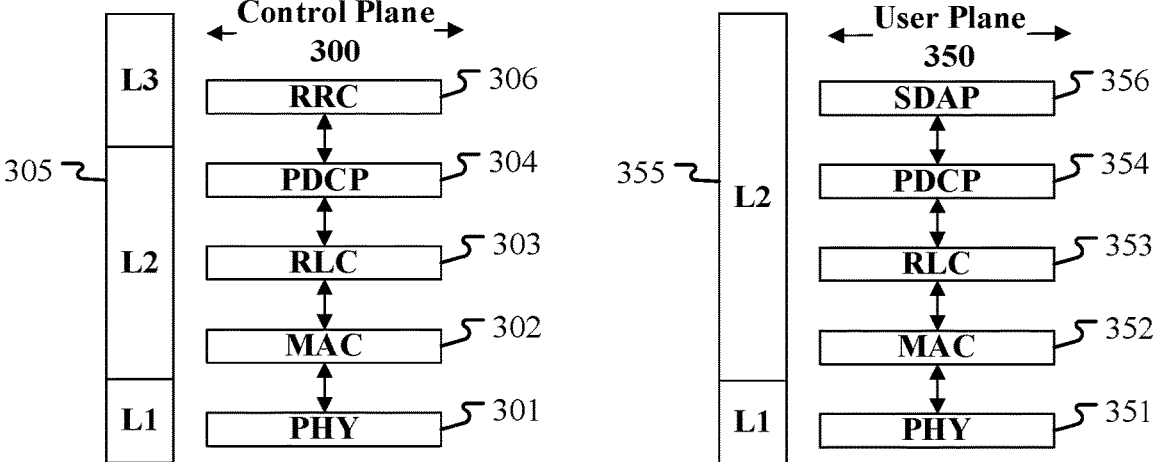
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of a link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first information block in the present application is generated by the RRC sublayer 306.

In one embodiment, the first information block in the present application is generated by the RRC sublayer 306.

In one embodiment, the first information block in the present application is generated by the MAC sublayer 302.

In one embodiment, the first information block in the present application is generated by the MAC sublayer 352.

In one embodiment, the first information block in the present application is generated by the PHY 301.

In one embodiment, the first information block in the present application is generated by the PHY 351.

In one embodiment, the second information block in the present application is generated by the RRC sublayer 306.

In one embodiment, the second information block in the present application is generated by the RRC sublayer 306.

In one embodiment, the second information block in the present application is generated by the MAC sublayer 302.

In one embodiment, the second information block in the present application is generated by the MAC sublayer 352.

In one embodiment, the second information block in the present application is generated by the PHY 301.

In one embodiment, the second information block in the present application is generated by the PHY 351.

In one embodiment, the third information block in the present application is generated by the RRC sublayer 306.

In one embodiment, the third information block in the present application is generated by the RRC sublayer 306.

In one embodiment, the third information block in the present application is generated by the MAC sublayer 302.

In one embodiment, the third information block in the present application is generated by the MAC sublayer 352.

In one embodiment, the third information block in the present application is generated by the PHY 301.

In one embodiment, the third information block in the present application is generated by the PHY 351.

In one embodiment, the third information block in the present application is generated by the PHY 301.

In one embodiment, the first signal in the present application is generated by the PHY 351.

In one embodiment, the first signal in the present application is generated by the PHY 301.

In one embodiment, the second signal in the present application is generated by the PHY 351.

In one embodiment, the second signal in the present application is generated by the PHY 301.

In one embodiment, the first information block in the present application is generated by the RRC sublayer 306.

In one embodiment, the first information block in the present application is generated by the RRC sublayer 306.

In one embodiment, the first information block in the present application is generated by the MAC sublayer 302.

In one embodiment, the first information block in the present application is generated by the MAC sublayer 352.

In one embodiment, the second information block in the present application is generated by the RRC sublayer 306.

In one embodiment, the second information block in the present application is generated by the RRC sublayer 306.

In one embodiment, the second information block in the present application is generated by the MAC sublayer 302.

In one embodiment, the second information block in the present application is generated by the MAC sublayer 352.

In one embodiment, the first signaling group in the present application is generated by the PHY 301.

In one embodiment, the first signaling group in the present application is generated by the PHY 351.

In one embodiment, the first signal group in the present application is generated by the PHY 301.

In one embodiment, the first signal group in the present application is generated by the PHY 351.

Embodiment 4

Figure 4:
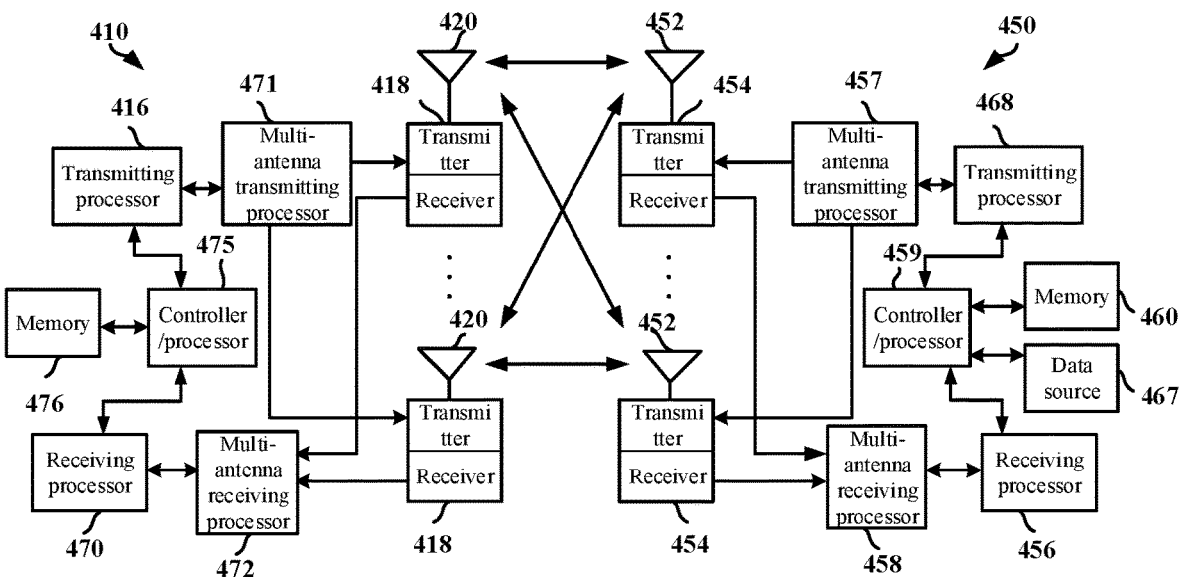
FIG. 4 illustrates a schematic diagram of a first communication device and a second communication device according to one embodiment of the present application.

Embodiment 4 illustrates a schematic diagram of a first communication device and a second communication device in the present application, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beam-forming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present application comprises the second communication device 450, and the second node in the present application comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the first node is a UE, and the second node is a base station.

In one subembodiment of the above embodiment, the first node is a relay node, and the second node is a base station.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first information block; transmits a first signal in a first time unit group; and transmits a second signal in a second time unit group; herein, a start time of the first time unit group is earlier than a start time of the second time unit group; the first information block is used to determine a first index group and a second index group, the first index group comprises an index of each time unit in the first time unit group, and the second index group comprises an index of each time unit in the second time unit group; a minimum value of the second index group minus a maximum value of the first index group is equal to a target integer; the target integer is a first integer or a second integer, a parameter value set corresponding to the first signal and a parameter value set corresponding to the second signal are used to determine the target integer out of the first integer and the second integer; when the first signal corresponds to a first parameter value set and the second signal corresponds to a second parameter value set, the target integer is equal to the second integer; when the first signal corresponds to the second parameter value set and the second signal corresponds to the first parameter value set, the target integer is equal to the first integer; the first time unit group comprises at least one time unit, the second time unit group comprises at least one time unit, any index in the first index group is a non-negative integer, any index in the second index group is a non-negative integer, the first parameter value set comprises at least one parameter value, and the second parameter value set comprises at least one parameter value.

In one subembodiment of the above embodiment, the second communication device 450 corresponds to the first node in the present application.

In one embodiment, the second communication device 450 comprises a memory that stores a computer readable instruction program. The computer readable instruction program generates an action when executed by at least one processor. The action includes: receiving a first information block; transmitting a first signal in a first time unit group; and transmitting a second signal in a second time unit group; herein, a start time of the first time unit group is earlier than a start time of the second time unit group; the first information block is used to determine a first index group and a second index group, the first index group comprises an index of each time unit in the first time unit group, and the second index group comprises an index of each time unit in the second time unit group; a minimum value of the second index group minus a maximum value of the first index group is equal to a target integer; the target integer is a first integer or a second integer, a parameter value set corresponding to the first signal and a parameter value set corresponding to the second signal are used to determine the target integer out of the first integer and the second integer; when the first signal corresponds to a first parameter value set and the second signal corresponds to a second parameter value set, the target integer is equal to the second integer; when the first signal corresponds to the second parameter value set and the second signal corresponds to the first parameter value set, the target integer is equal to the first integer; the first time unit group comprises at least one time unit, the second time unit group comprises at least one time unit, any index in the first index group is a non-negative integer, any index in the second index group is a non-negative integer, the first parameter value set comprises at least one parameter value, and the second parameter value set comprises at least one parameter value.

In one subembodiment of the above embodiment, the second communication device 450 corresponds to the first node in the present application.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first information block; receives a first signal in a first time unit group; and receives a second signal in a second time unit group; herein, a start time of the first time unit group is earlier than a start time of the second time unit group; the first information block is used to determine a first index group and a second index group, the first index group comprises an index of each time unit in the first time unit group, and the second index group comprises an index of each time unit in the second time unit group; a minimum value of the second index group minus a maximum value of the first index group is equal to a target integer; the target integer is a first integer or a second integer, a parameter value set corresponding to the first signal and a parameter value set corresponding to the second signal are used to determine the target integer out of the first integer and the second integer; when the first signal corresponds to a first parameter value set and the second signal corresponds to a second parameter value set, the target integer is equal to the second integer; when the first signal corresponds to the second parameter value set and the second signal corresponds to the first parameter value set, the target integer is equal to the first integer; the first time unit group comprises at least one time unit, the second time unit group comprises at least one time unit, any index in the first index group is a non-negative integer, any index in the second index group is a non-negative integer, the first parameter value set comprises at least one parameter value, and the second parameter value set comprises at least one parameter value.

In one subembodiment of the above embodiment, the first communication device 410 corresponds to the second node in the present application.

In one embodiment, the first communication device 410 comprises a memory that stores a computer readable instruction program. The computer readable instruction program generates an action when executed by at least one processor. The action includes: transmitting a first information block; and receiving a first signal in a first time unit group; and receiving a second signal in a second time unit group; herein, a start time of the first time unit group is earlier than a start time of the second time unit group; the first information block is used to determine a first index group and a second index group, the first index group comprises an index of each time unit in the first time unit group, and the second index group comprises an index of each time unit in the second time unit group; a minimum value of the second index group minus a maximum value of the first index group is equal to a target integer; the target integer is a first integer or a second integer, a parameter value set corresponding to the first signal and a parameter value set corresponding to the second signal are used to determine the target integer out of the first integer and the second integer; when the first signal corresponds to a first parameter value set and the second signal corresponds to a second parameter value set, the target integer is equal to the second integer; when the first signal corresponds to the second parameter value set and the second signal corresponds to the first parameter value set, the target integer is equal to the first integer; the first time unit group comprises at least one time unit, the second time unit group comprises at least one time unit, any index in the first index group is a non-negative integer, any index in the second index group is a non-negative integer, the first parameter value set comprises at least one parameter value, and the second parameter value set comprises at least one parameter value.

In one subembodiment of the above embodiment, the first communication device 410 corresponds to the second node in the present application.

In one embodiment, at least one of the antenna 452, the receiver 454, the multi-antenna receiving processor 458, the receiving processor 456, the controller/processor 459, the memory 460, or the data source 467 is used to receive the first information block in the present application.

In one embodiment, at least one of the antenna 420, the transmitter 418, the multi-antenna transmitting processor 471, the transmitting processor 416, the controller/processor 475, or the memory 476 is used to transmit the first information block in the present application.

In one embodiment, at least one of the antenna 452, the receiver 454, the multi-antenna receiving processor 458, the receiving processor 456, the controller/processor 459, the memory 460, or the data source 467 is used to receive the second information block in the present application.

In one embodiment, at least one of the antenna 420, the transmitter 418, the multi-antenna transmitting processor 471, the transmitting processor 416, the controller/processor 475, or the memory 476 is used to transmit the second information block in the present application.

In one embodiment, at least one of the antenna 452, the receiver 454, the multi-antenna receiving processor 458, the receiving processor 456, the controller/processor 459, the memory 460, or the data source 467 is used to receive the third information block in the present application.

In one embodiment, at least one of the antenna 420, the transmitter 418, the multi-antenna transmitting processor 471, the transmitting processor 416, the controller/processor 475, or the memory 476 is used to transmit the third information block in the present application.

In one embodiment, at least one of the antenna 452, the transmitter 454, the multi-antenna transmission processor 458, the transmitting processor 468, the controller/processor 459, the memory 460, or the data source 467 is used to transmit the first signal in the present application in the first time unit group in the present application.

In one embodiment, at least one of the antenna 420, the receiver 418, the multi-antenna receiving processor 472, the receiving processor 470, the controller/processor 475, or the memory 476 is used to receive the first signal in the present application in the first time unit group in the present application.

In one embodiment, at least one of the antenna 452, the transmitter 454, the multi-antenna transmission processor 458, the transmitting processor 468, the controller/processor 459, the memory 460, or the data source 467 is used to transmit the second signal in the present application in the second time unit group in the present application.

In one embodiment, at least one of the antenna 420, the receiver 418, the multi-antenna receiving processor 472, the receiving processor 470, the controller/processor 475, or the memory 476 is used to receive the second signal in the present application in the second time unit group in the present application.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first signaling group; and operates a first signal group; herein, the first signaling group is used to indicate scheduling information of the first signal group; a first number is used to determine a transmission scheme of the first signal group, a signaling format of the first signaling group is used to determine the first number, the first number being a positive integer; when the signaling format of the first signaling group belongs to a first format set, the first signaling group is used to indicate a first TCI state group out of N TCI state groups, N being a positive integer greater than 1, and the first number is equal to a number of TCI state(s) comprised in the first TCI state group; when the signaling format of the first signaling group belongs to a second format set, a number of TCI state(s) comprised in a second TCI state group is used to determine the first number, and the second TCI state group is used to receive the first signaling group; the signaling format of the first signaling group only belongs to the first format set or the second format set, the first format set is different from the second format set; the operating action is transmitting, or the operating action is receiving.

In one subembodiment of the above embodiment, the second communication device 450 corresponds to the first node in the present application.

In one embodiment, the second communication device 450 comprises a memory that stores a computer readable instruction program. The computer readable instruction program generates an action when executed by at least one processor. The action includes: receiving a first signaling group; and operating a first signal group; herein, the first signaling group is used to indicate scheduling information of the first signal group; a first number is used to determine a transmission scheme of the first signal group, a signaling format of the first signaling group is used to determine the first number, the first number being a positive integer; when the signaling format of the first signaling group belongs to a first format set, the first signaling group is used to indicate a first TCI state group out of N TCI state groups, N being a positive integer greater than 1, and the first number is equal to a number of TCI state(s) comprised in the first TCI state group; when the signaling format of the first signaling group belongs to a second format set, a number of TCI state(s) comprised in a second TCI state group is used to determine the first number, and the second TCI state group is used to receive the first signaling group; the signaling format of the first signaling group only belongs to the first format set or the second format set, the first format set is different from the second format set; the operating action is transmitting, or the operating action is receiving.

In one subembodiment of the above embodiment, the second communication device 450 corresponds to the first node in the present application.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first signaling group; and executes a first signal group; herein, the first signaling group is used to indicate scheduling information of the first signal group; a first number is used to determine a transmission scheme of the first signal group, a signaling format of the first signaling group is used to determine the first number, the first number being a positive integer; when the signaling format of the first signaling group belongs to a first format set, the first signaling group is used to indicate a first TCI state group out of N TCI state groups, N being a positive integer greater than 1, and the first number is equal to a number of TCI state(s) comprised in the first TCI state group; when the signaling format of the first signaling group belongs to a second format set, a number of TCI state(s) comprised in a second TCI state group is used to determine the first number, and the second TCI state group is used to receive the first signaling group; the signaling format of the first signaling group only belongs to the first format set or the second format set, the first format set is different from the second format set; the executing action is receiving, or, the executing action is transmitting.

In one subembodiment of the above embodiment, the first communication device 410 corresponds to the second node in the present application.

In one embodiment, the first communication device 410 comprises a memory that stores a computer readable instruction program. The computer readable instruction program generates an action when executed by at least one processor. The action includes: transmitting a first signaling group; and executing a first signal group; herein, the first signaling group is used to indicate scheduling information of the first signal group; a first number is used to determine a transmission scheme of the first signal group, a signaling format of the first signaling group is used to determine the first number, the first number being a positive integer; when the signaling format of the first signaling group belongs to a first format set, the first signaling group is used to indicate a first TCI state group out of N TCI state groups, N being a positive integer greater than 1, and the first number is equal to a number of TCI state(s) comprised in the first TCI state group; when the signaling format of the first signaling group belongs to a second format set, a number of TCI state(s) comprised in a second TCI state group is used to determine the first number, and the second TCI state group is used to receive the first signaling group; the signaling format of the first signaling group only belongs to the first format set or the second format set, the first format set is different from the second format set; the executing action is receiving, or, the executing action is transmitting.

In one subembodiment of the above embodiment, the first communication device 410 corresponds to the second node in the present application.

In one embodiment, at least one of the antenna 452, the receiver 454, the multi-antenna receiving processor 458, the receiving processor 456, the controller/processor 459, the memory 460, or the data source 467 is used to receive the first information block in the present application.

In one embodiment, at least one of the antenna 420, the transmitter 418, the multi-antenna transmitting processor 471, the transmitting processor 416, the controller/processor 475, or the memory 476 is used to transmit the first information block in the present application.

In one embodiment, at least one of the antenna 452, the receiver 454, the multi-antenna receiving processor 458, the receiving processor 456, the controller/processor 459, the memory 460, or the data source 467 is used to receive the second information block in the present application.

In one embodiment, at least one of the antenna 420, the transmitter 418, the multi-antenna transmitting processor 471, the transmitting processor 416, the controller/processor 475, or the memory 476 is used to transmit the second information block in the present application.

In one embodiment, at least one of the antenna 452, the receiver 454, the multi-antenna receiving processor 458, the receiving processor 456, the controller/processor 459, the memory 460 or the data source 467 is used to receive the first signaling group in the present application.

In one embodiment, at least one of the antenna 420, the transmitter 418, the multi-antenna transmitting processor 471, the transmitting processor 416, the controller/processor 475 or the memory 476 is used to transmit the first signaling group in the present application.

In one embodiment, at least one of the antenna 452, the transmitter/receiver 454, the multi-antenna receiving processor 458, the multi-antenna transmitting processor 457, the receiving processor 456, the transmitting processor 468, the controller/processor 459, the memory 460 or the data source 467 is used to operate the first signal group in the present application.

In one embodiment, at least one of the antenna 420, the transmitter 418, the multi-antenna transmitting processor 471, the multi-antenna receiving processor 472, the transmitting processor 416, the receiving processor 470, the controller/processor 475, or the memory 476 is used to execute the first signal group in the present application.

In one embodiment, at least one of the antenna 452, the receiver 454, the multi-antenna receiving processor 458, the receiving processor 456, the controller/processor 459, the memory 460 or the data source 467 is used to operate the first signal group in the present application, and the operating action is receiving.

In one embodiment, at least one of the antenna 420, the transmitter 418, the multi-antenna transmitting processor 471, the transmitting processor 416, the controller/processor 475 or the memory 476 is used to execute the first signal group in the present application, the executing action is transmitting.

In one embodiment, at least one of the antenna 452, the transmitter 454, the multi-antenna transmitting processor 457, the transmitting processor 468, the controller/processor 459, the memory 460 or the data source 467 is used to operate the first signal group in the present application, the operating action is transmitting.

In one embodiment, at least one of the antenna 420, the receiver 418, the multi-antenna receiving processor 472, the receiving processor 470, the controller/processor 475, or the memory 476 is used to execute the first signal group in the present application, and the executing action is receiving.

Embodiment 5A

Figure 5A:
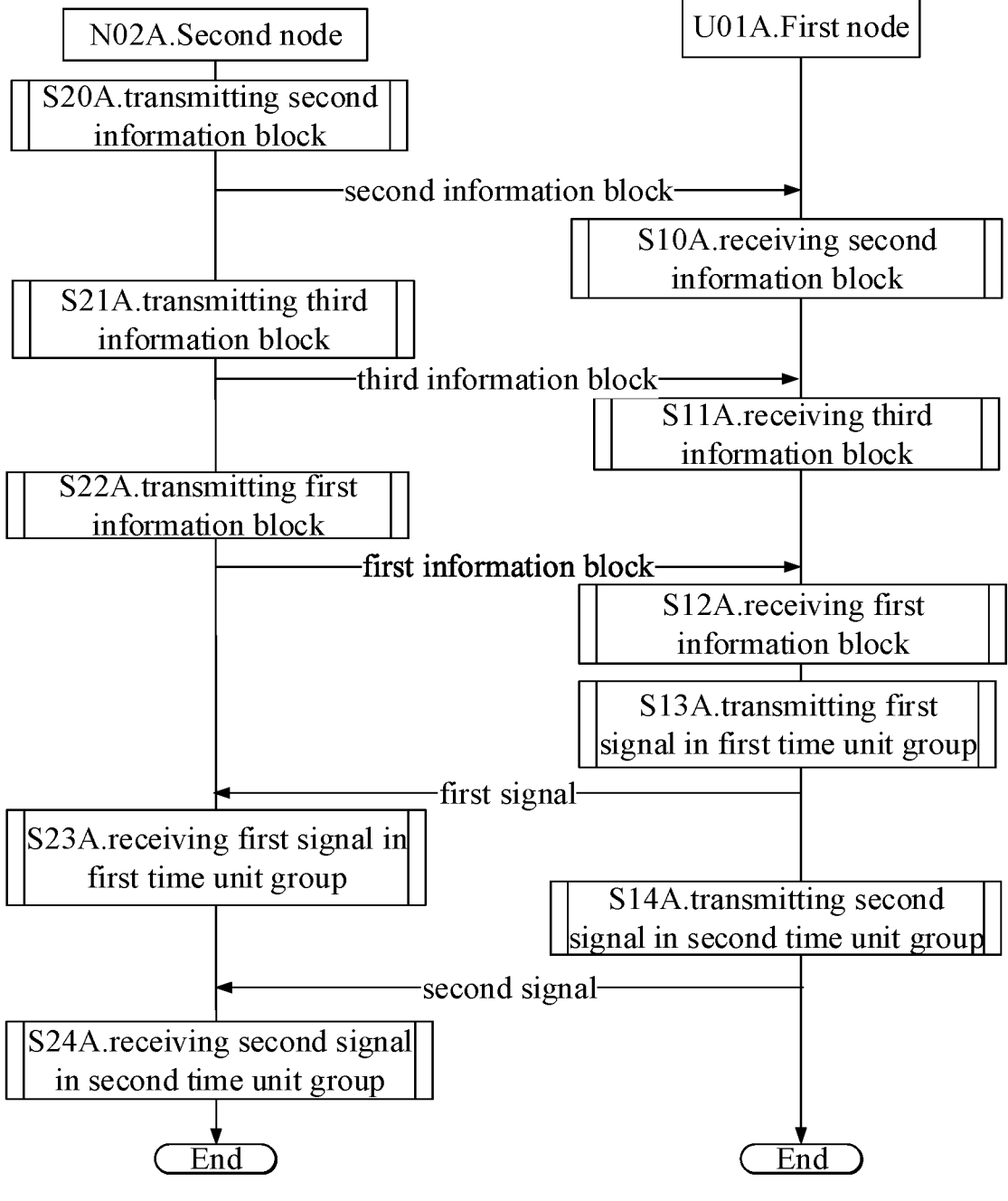
FIG. 5A illustrates a flowchart of radio signal transmission according to one embodiment of the present application.

Embodiment 5A illustrates a flowchart of radio signal transmission according to one embodiment in the present application, as shown in FIG. 5A. In FIG. 5A a first node U01A and a second node N02A are in communications via an air interface.

The first node U01A receives a second information block in step S10A; receives a third information block in step S11A; receives a first information block in step S12A; transmits a first signal in a first time unit group in step S13A; and transmits a second signal in a second time unit group in step S14A.

The second node N02A transmits a second information block in step S20A; transmits a third information block in step S21A; transmits a first information block in step S22A; receives a first signal in a first time unit group in step S23A; and receives a second signal in a second time unit group in step S24A.

In embodiment 5A, a start time of the first time unit group is earlier than a start time of the second time unit group; the first information block is used by the first node U01A to determine a first index group and a second index group, the first index group comprises an index of each time unit in the first time unit group, and the second index group comprises an index of each time unit in the second time unit group; a minimum value of the second index group minus a maximum value of the first index group is equal to a target integer; the target integer is a first integer or a second integer, a parameter value set corresponding to the first signal and a parameter value set corresponding to the second signal are used to determine the target integer out of the first integer and the second integer; when the first signal corresponds to a first parameter value set and the second signal corresponds to a second parameter value set, the target integer is equal to the second integer; when the first signal corresponds to the second parameter value set and the second signal corresponds to the first parameter value set, the target integer is equal to the first integer; the first time unit group comprises at least one time unit, the second time unit group comprises at least one time unit, any index in the first index group is a non-negative integer, any index in the second index group is a non-negative integer, the first parameter value set comprises at least one parameter value, and the second parameter value set comprises at least one parameter value. The second information block is used by the first node U01A to determine the first timing value and the second timing value. The third information block is used by the first node U01A to determine the first integer and the second integer.

In one embodiment, the second information block is semi-statically configured.

In one embodiment, the second information block is carried by a higher-layer signaling.

In one embodiment, the second information block is carried by an RRC signaling.

In one embodiment, the second information block comprises one IE of an RRC signaling.

In one embodiment, the second information block comprises multiple IEs in an RRC signaling.

In one embodiment, the second information block is carried by a MAC CE signaling.

In one embodiment, the second information block is carried by a physical-layer signaling.

In one embodiment, the second information block is carried by a DCI signaling.

In one embodiment, the second information block comprises at least one field in a DCI signaling.

In one embodiment, the second information block is used to indicate the first timing value and the second timing value.

In one embodiment, the second information block explicitly indicates the first timing value and the second timing value.

In one embodiment, the second information block implicitly indicates the first timing value and the second timing value.

In one embodiment, the second information block comprises P1 information sub-block(s) and P2 information sub-block(s), the P1 information sub-block(s) indicates (respectively indicate) P1 value(s), and the P2 information sub-block(s) indicates (respectively indicate) P2 value(s), P1 being a positive integer, P2 being a positive integer; the first timing value is linearly correlated with any of the P1 value(s), and the second timing value is linearly correlated with any of the P2 value(s).

In one subembodiment of the above embodiment, P1 is equal to 1.

In one subembodiment of the above embodiment, P1 is greater than 1.

In one subembodiment of the above embodiment, P2 is equal to 1.

In one subembodiment of the above embodiment, P2 is greater than 1.

In one subembodiment of the above embodiment, a coefficient of a linear correlation between the first timing value and any of the P1 value(s) is equal to 1, and a coefficient of a linear correlation between the second timing value and any of the P2 value(s) is equal to 1.

In one subembodiment of the above embodiment, P1 is greater than 1, and the first timing value is linearly correlated with a sum of the P1 values.

In one subembodiment of the above embodiment, P1 is greater than 1, and the first timing value is equal to a sum of the P1 values.

In one subembodiment of the above embodiment, P2 is greater than 1, and the second timing value is linearly correlated with a sum of the P2 values.

In one subembodiment of the above embodiment, P2 is greater than 1, and the second timing value is equal to a sum of the P2 values.

In one subembodiment of the above embodiment, any of the P1 information sub-block(s) and the P2 information sub-block(s) comprises a TA Command.

In one subembodiment of the above embodiment, any of the P1 information sub-block(s) and the P2 information sub-block(s) is carried by a higher-layer signaling.

In one subembodiment of the above embodiment, any of the P1 information sub-block(s) and the P2 information sub-block(s) is carried by a MAC CE signaling.

In one embodiment, a method in the first node also comprises:
  transmitting a fifth information block;
  herein, the fifth information block is used to determine the first timing value and the second timing value.

In one subembodiment of the above embodiment, a method in the second node also comprises:
  receiving a fifth information block;
  herein, the fifth information block is used to determine the first timing value and the second timing value.

In one subembodiment of the above embodiment, the first transmitter also transmits a fifth information block; herein, the fifth information block is used to determine the first timing value and the second timing value.

In one subembodiment of the above embodiment, the second receiver also receives a fifth information block; herein, the fifth information block is used to determine the first timing value and the second timing value.

In one subembodiment of the above embodiment, the fifth information block is semi-statically configured.

In one subembodiment of the above embodiment, the fifth information block is carried by a higher-layer signaling.

In one subembodiment of the above embodiment, the fifth information block is carried by an RRC signaling.

In one subembodiment of the above embodiment, the fifth information block is carried by a MAC CE signaling.

In one subembodiment of the above embodiment, the fifth information block is transmitted on a Physical Uplink Control CHannel (PUCCH).

In one subembodiment of the above embodiment, the fifth information block is transmitted on a Physical Random Access Channel (PRACH).

In one subembodiment of the above embodiment, the fifth information block is transmitted on a Physical Uplink Shared CHannel (PUSCH).

In one subembodiment of the above embodiment, the fifth information block comprises UCI.

In one subembodiment of the above embodiment, the fifth information block indicates the first timing value and the second timing value.

In one subembodiment of the above embodiment, the fifth information block indicates the first timing value and a target offset, and the target offset is a difference value of the second timing value minus the first timing value.

In one subembodiment of the above embodiment, the fifth information block indicates the first timing value and a target offset, and the target offset is a difference value of the first timing value minus the second timing value.

In one embodiment, the third information block is semi-statically configured.

In one embodiment, the third information block is carried by a higher-layer signaling.

In one embodiment, the third information block is carried by an RRC signaling.

In one embodiment, the third information block comprises one IE of an RRC signaling.

In one embodiment, the third information block comprises multiple IEs of an RRC signaling.

In one embodiment, the third information block is carried by a MAC CE signaling.

In one embodiment, the third information block is carried by a physical-layer signaling.

In one embodiment, the third information block is carried by a DCI signaling.

In one embodiment, the third information block comprises at least one field in a DCI signaling.

In one embodiment, both the first information block and the third information block belong to a same IE in an RRC signaling.

In one embodiment, the first information block and the third information block respectively belong to different IEs in an RRC signaling.

In one embodiment, the first information block and the third information block are carried by a same DCI signaling.

In one embodiment, the first information block and the third information block are carried by different DCI signalings.

In one embodiment, the third information block is used to indicate the first integer and the second integer.

In one embodiment, the third information block explicitly indicates the first integer and the second integer.

In one embodiment, the third information block implicitly indicates the first integer and the second integer.

In one embodiment, the third information block is used to indicate the first integer, and the first integer is used to determine the second integer.

In one embodiment, the third information block is used to indicate the first integer, and the first integer and a first offset is used to determine the second integer.

In one embodiment, the third information block is used to indicate the first integer, and the first integer and a first offset is used to determine the second integer.

In one embodiment, a difference value of the first integer minus the second integer is equal to a first offset, and the first offset is equal to an absolute value of a difference value of the first timing value and the second timing value.

In one embodiment, a difference value of the first integer minus the second integer is equal to a product of a first offset multiplied by 2, and the first offset is equal to an absolute value of a difference value of the first timing value and the second timing value.

In one embodiment, the third information block is used to indicate a first interval, and the first interval is used to determine the first integer and the second integer.

In one subembodiment of the above embodiment, the third information block explicitly indicates a first interval.

In one subembodiment of the above embodiment, the third information block implicitly indicates a first interval.

In one embodiment, the first integer is equal to a sum of a first offset and a first interval, the first offset is equal to an absolute value of a difference value of the first timing value and the second timing value, and the first interval is a positive integer.

In one embodiment, the first integer is equal to a sum of a first offset, 1 and a first interval, the first offset is equal to an absolute value of a difference value of the first timing value and the second timing value, and the first interval is a non-negative integer.

In one embodiment, the second integer is equal to a first interval, and the first interval is a positive integer.

In one embodiment, the second integer is equal to a sum of 1 and a first interval, and the first interval is a non-negative integer.

In one embodiment, the second integer is equal to a difference value of a first interval minus a first offset, the first offset is equal to an absolute value of a difference value of the first timing value and the second timing value, and the first interval is a positive integer.

In one embodiment, the second integer is equal to an integer obtained by 1 plus a first integer then minus a first offset, the first offset is equal to an absolute value of a difference value of the first timing value and the second timing value, and the first interval is a non-negative integer.

In one embodiment, the first timing value is not less than the second timing value, and the first offset is equal to a difference value of the first timing value minus the second timing value.

In one embodiment, the first timing value is not greater than the second timing value, and the first offset is equal to a difference value of the second timing value minus the first timing value.

In one embodiment, a method in the first node also comprises:

transmitting a fourth information block;

herein, the fourth information block is used to determine the first integer and the second integer.

In one subembodiment of the above embodiment, a method in the second node also comprises:

receiving a fourth information block;

herein, the fourth information block is used to determine the first integer and the second integer.

In one subembodiment of the above embodiment, the first transmitter also transmits a fourth information block; herein, the fourth information block is used to determine the first integer and the second integer.

In one subembodiment of the above embodiment, the second receiver also receives a fourth information block; herein, the fourth information block is used to determine the first integer and the second integer.

In one subembodiment of the above embodiment, the fourth information block is semi-statically configured.

In one subembodiment of the above embodiment, the fourth information block is carried by a higher-layer signaling.

In one subembodiment of the above embodiment, the fourth information block is carried by an RRC signaling.

In one subembodiment of the above embodiment, the fourth information block is carried by a MAC CE signaling.

In one subembodiment of the above embodiment, the fourth information block is transmitted on a PUCCH.

In one subembodiment of the above embodiment, the fourth information block is transmitted on a PRACH.

In one subembodiment of the above embodiment, the fourth information block is transmitted on a PUSCH In one subembodiment of the above embodiment, the fourth information block comprises UCI.

In one subembodiment of the above embodiment, the fourth information block belongs to capability report.

In one subembodiment of the above embodiment, a transmitter of the third information block determines the third information block according to the fourth information block.

In one subembodiment of the above embodiment, the fourth information block is used to indicate the first integer and the second integer.

In one subembodiment of the above embodiment, the fourth information block explicitly indicates the first integer and the second integer.

In one subembodiment of the above embodiment, the fourth information block implicitly indicates the first integer and the second integer.

In one subembodiment of the above embodiment, the fourth information block is used to determine the first timing value and the second timing value.

In one subembodiment of the above embodiment, the fourth information block indicates the first timing value and the second timing value.

In one subembodiment of the above embodiment, the fourth information block indicates the first timing value and a target offset, and the target offset is a difference value of the second timing value minus the first timing value.

In one subembodiment of the above embodiment, the fourth information block indicates the first timing value and a target offset, and the target offset is a difference value of the first timing value minus the second timing value.

Embodiment 5B

Figure 5B:
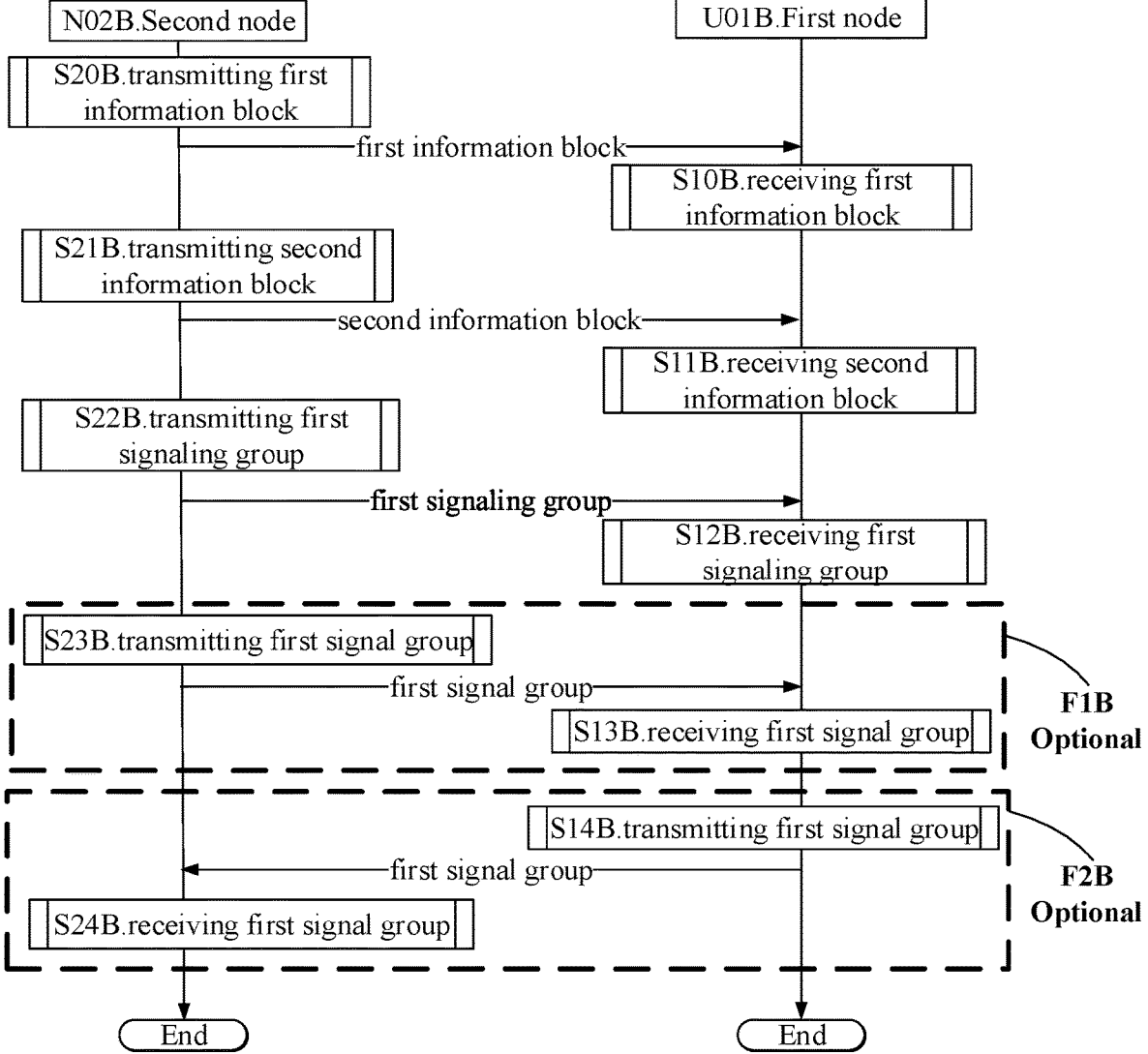
FIG. 5B illustrates a flowchart of radio signal transmission according to one embodiment of the present application.

Embodiment 5B illustrates a flowchart of radio signal transmission according to one embodiment in the present application, as shown in FIG. 5B. In FIG. 5B a first node U01B and a second node N02B are in communications via an air interface. In FIG. 5B, one and only one between the dotted box F1 and F2 exists.

The first node U01B receives a first information block in step S10B; receives a second information block in step S11B; receives a first signaling group in step S12B; receives a first signal group in step S13B; and transmits a first signal group in step S14B.

The second node N02B transmits a first information block in step S20B; transmits a second information block in step S21B; transmits a first signaling group in step S22B; transmits a first signal group in step S23B; and receives a first signal group in step S24B.

In embodiment 5B, the first signaling group is used to indicate scheduling information of the first signal group; a first number is used to determine a transmission scheme of the first signal group, a signaling format of the first signaling group is used to determine the first number, the first number being a positive integer; when the signaling format of the first signaling group belongs to a first format set, the first signaling group is used to indicate a first TCI state group out of N TCI state groups, N being a positive integer greater than 1, and the first number is equal to a number of TCI state(s) comprised in the first TCI state group; when the signaling format of the first signaling group belongs to a second format set, a number of TCI state(s) comprised in a second TCI state group is used to determine the first number, and the second TCI state group is used to receive the first signaling group; the signaling format of the first signaling group only belongs to the first format set or the second format set, the first format set is different from the second format set; the first information block is used to indicate the N TCI state groups, and the second information block is used to indicate the second TCI state group.

In one embodiment, a first number is used by the second node U01B to determine a transmission scheme of the first signal group.

In one embodiment, a signaling format of the first signaling group is used by the first node U01B to determine the first number.

In one embodiment, when the signaling format of the first signaling group belongs to a second format set, a number of TCI state(s) comprised in a second TCI state group is used by the first node U01B to determine the first number.

In one embodiment, a first number is used by the second node N02B to determine a transmission scheme of the first signal group.

In one embodiment, a signaling format of the first signaling group is used by the second node N02B to determine the first number.

In one embodiment, when the signaling format of the first signaling group belongs to a second format set, a number of TCI state(s) comprised in a second TCI state group is used by the second node N02B to determine the first number.

In one embodiment, the operating action is receiving, and the executing action is transmitting.

In one embodiment, the operating action is transmitting, and the executing action is receiving.

In one embodiment, the operating action is receiving, the executing action is transmitting, the dotted box F1 exists, and the dotted box F2 does not exist.

In one embodiment, the operating action is transmitting, the executing action is receiving, the dotted box F2 exists, and the dotted box F1 does not exist.

In one embodiment, a given TCI state group being used to receive a given signal group refers to: when the given TCI state group only comprises a TCI state, the given TCI state group is used to receive any signal in the given signal group.

In one subembodiment of the above embodiment, a given TCI state group corresponds to the first TCI state group in the present application, and the given signal group corresponds to the first signal group in the present application.

In one subembodiment of the above embodiment, a given TCI state group comprises the second TCI state group in the present application, and the given signal group corresponds to the first signal group in the present application.

In one subembodiment of the above embodiment, a given TCI state group comprises at least one TCI state in the second TCI state group in the present application, and the given signal group corresponds to the first signal group in the present application.

In one subembodiment of the above embodiment, a given TCI state group corresponds to the second TCI state group in the present application, and the given signal group corresponds to the first signaling group in the present application.

In one embodiment, a given TCI state group being used to receive a given signal group refers to: when the given TCI state group only comprises more than one TCI state and the given signal group comprises more than one signal, any TCI state in the given TCI state group is used to receive at least one signal in the given signal group.

In one subembodiment of the above embodiment, a given TCI state group corresponds to the first TCI state group in the present application, and the given signal group corresponds to the first signal group in the present application.

In one subembodiment of the above embodiment, a given TCI state group comprises the second TCI state group in the present application, and the given signal group corresponds to the first signal group in the present application.

In one subembodiment of the above embodiment, a given TCI state group comprises at least one TCI state in the second TCI state group in the present application, and the given signal group corresponds to the first signal group in the present application.

In one subembodiment of the above embodiment, a given TCI state group corresponds to the second TCI state group in the present application, and the given signal group corresponds to the first signaling group in the present application.

In one embodiment, a given TCI state group being used to receive a given signal group refers to: when the given TCI state group only comprises more than one TCI state and the given signal group only comprises one signal, any TCI state in the given TCI state group is used to receive at least one layer in the given signal group.

In one subembodiment of the above embodiment, a given TCI state group corresponds to the first TCI state group in the present application, and the given signal group corresponds to the first signal group in the present application.

In one subembodiment of the above embodiment, a given TCI state group comprises the second TCI state group in the present application, and the given signal group corresponds to the first signal group in the present application.

In one subembodiment of the above embodiment, a given TCI state group comprises at least one TCI state in the second TCI state group in the present application, and the given signal group corresponds to the first signal group in the present application.

In one subembodiment of the above embodiment, a given TCI state group corresponds to the second TCI state group in the present application, and the given signal group corresponds to the first signaling group in the present application.

In one embodiment, a given TCI state being used to receive a given signal refers to: a QCL parameter corresponding to the given TCI state is used to receive the given signal.

In one subembodiment of the above embodiment, a given TCI state corresponds to a TCI state in the first TCI state group in the present application, and the given signal corresponds to a signal in the first signal group in the present application.

In one subembodiment of the above embodiment, a given TCI state corresponds to a TCI state in the first TCI state group in the present application, and the given signal corresponds to at least one layer in the first signal group in the present application.

In one subembodiment of the above embodiment, a given TCI state corresponds to a TCI state in the second TCI state group in the present application, and the given signal corresponds to a signal in the first signal group in the present application.

In one subembodiment of the above embodiment, a given TCI state corresponds to a TCI state in the second TCI state group in the present application, and the given signal corresponds to at least one layer in the first signal group in the present application.

In one subembodiment of the above embodiment, a given TCI state corresponds to a TCI state in the second TCI state group in the present application, and the given signal group corresponds to a signaling in the first signaling group in the present application.

In one embodiment, a given TCI state being used to receive a given signal refers to: a TypeD QCL parameter corresponding to the given TCI state is used to receive the given signal.

In one subembodiment of the above embodiment, a given TCI state corresponds to a TCI state in the first TCI state group in the present application, and the given signal corresponds to a signal in the first signal group in the present application.

In one subembodiment of the above embodiment, a given TCI state corresponds to a TCI state in the first TCI state group in the present application, and the given signal corresponds to at least one layer in the first signal group in the present application.

In one subembodiment of the above embodiment, a given TCI state corresponds to a TCI state in the second TCI state group in the present application, and the given signal corresponds to a signal in the first signal group in the present application.

In one subembodiment of the above embodiment, a given TCI state corresponds to a TCI state in the second TCI state group in the present application, and the given signal corresponds to at least one layer in the first signal group in the present application.

In one subembodiment of the above embodiment, a given TCI state corresponds to a TCI state in the second TCI state group in the present application, and the given signal group corresponds to a signaling in the first signaling group in the present application.

In one embodiment, a given TCI state being used to receive a given signal refers to: a TypeD QCL parameter corresponding to the given TCI state is the same as a TypeD QCL parameter of the given signal.

In one subembodiment of the above embodiment, a given TCI state corresponds to a TCI state in the first TCI state group in the present application, and the given signal corresponds to a signal in the first signal group in the present application.

In one subembodiment of the above embodiment, a given TCI state corresponds to a TCI state in the first TCI state group in the present application, and the given signal corresponds to at least one layer in the first signal group in the present application.

In one subembodiment of the above embodiment, a given TCI state corresponds to a TCI state in the second TCI state group in the present application, and the given signal corresponds to a signal in the first signal group in the present application.

In one subembodiment of the above embodiment, a given TCI state corresponds to a TCI state in the second TCI state group in the present application, and the given signal corresponds to at least one layer in the first signal group in the present application.

In one subembodiment of the above embodiment, a given TCI state corresponds to a TCI state in the second TCI state group in the present application, and the given signal group corresponds to a signaling in the first signaling group in the present application.

In one embodiment, a given TCI state being used to receive a given signal refers to: a QCL parameter corresponding to the given TCI state is the same as a QCL parameter of the given signal.

In one subembodiment of the above embodiment, a given TCI state corresponds to a TCI state in the first TCI state group in the present application, and the given signal corresponds to a signal in the first signal group in the present application.

In one subembodiment of the above embodiment, a given TCI state corresponds to a TCI state in the first TCI state group in the present application, and the given signal corresponds to at least one layer in the first signal group in the present application.

In one subembodiment of the above embodiment, a given TCI state corresponds to a TCI state in the second TCI state group in the present application, and the given signal corresponds to a signal in the first signal group in the present application.

In one subembodiment of the above embodiment, a given TCI state corresponds to a TCI state in the second TCI state group in the present application, and the given signal corresponds to at least one layer in the first signaling group in the present application.

In one subembodiment of the above embodiment, a given TCI state corresponds to a TCI state in the second TCI state group in the present application, and the given signal group corresponds to a signaling in the first signaling group in the present application.

In one embodiment, a given TCI state being used to receive a given signal refers to: the given TCI state comprises a given reference signal, and a spatial-domain filter of the given reference signal is used to receive the given signal.

In one subembodiment of the above embodiment, a given TCI state corresponds to a TCI state in the first TCI state group in the present application, and the given signal corresponds to a signal in the first signal group in the present application.

In one subembodiment of the above embodiment, a given TCI state corresponds to a TCI state in the first TCI state group in the present application, and the given signal corresponds to at least one layer in the first signal group in the present application.

In one subembodiment of the above embodiment, a given TCI state corresponds to a TCI state in the second TCI state group in the present application, and the given signal corresponds to a signal in the first signal group in the present application.

In one subembodiment of the above embodiment, a given TCI state corresponds to a TCI state in the second TCI state group in the present application, and the given signal corresponds to at least one layer in the first signal group in the present application.

In one subembodiment of the above embodiment, a given TCI state corresponds to a TCI state in the second TCI state group in the present application, and the given signal group corresponds to a signaling in the first signaling group in the present application.

In one embodiment, a given TCI state being used to receive a given signal refers to: the given TCI state comprises a given reference signal, and a spatial-domain filter of the given reference signal is the same as a spatial-domain filter for receiving the given signal.

In one subembodiment of the above embodiment, a given TCI state corresponds to a TCI state in the first TCI state group in the present application, and the given signal corresponds to a signal in the first signal group in the present application.

In one subembodiment of the above embodiment, a given TCI state corresponds to a TCI state in the first TCI state group in the present application, and the given signal corresponds to at least one layer in the first signal group in the present application.

In one subembodiment of the above embodiment, a given TCI state corresponds to a TCI state in the second TCI state group in the present application, and the given signal corresponds to a signal in the first signal group in the present application.

In one subembodiment of the above embodiment, a given TCI state corresponds to a TCI state in the second TCI state group in the present application, and the given signal corresponds to at least one layer in the first signal group in the present application.

In one subembodiment of the above embodiment, a given TCI state corresponds to a TCI state in the second TCI state group in the present application, and the given signal group corresponds to a signaling in the first signaling group in the present application.

In one embodiment, a given TCI state being used to receive a given signal refers to: the given TCI state comprises a given reference signal, the given reference signal is an uplink signal, and a spatial Tx filter of the given reference signal is the same as a spatial Rx filter of the given signal.

In one subembodiment of the above embodiment, a given TCI state corresponds to a TCI state in the first TCI state group in the present application, and the given signal corresponds to a signal in the first signal group in the present application.

In one subembodiment of the above embodiment, a given TCI state corresponds to a TCI state in the first TCI state group in the present application, and the given signal corresponds to at least one layer in the first signal group in the present application.

In one subembodiment of the above embodiment, a given TCI state corresponds to a TCI state in the second TCI state group in the present application, and the given signal corresponds to a signal in the first signal group in the present application.

In one subembodiment of the above embodiment, a given TCI state corresponds to a TCI state in the second TCI state group in the present application, and the given signal corresponds to at least one layer in the first signal group in the present application.

In one subembodiment of the above embodiment, a given TCI state corresponds to a TCI state in the second TCI state group in the present application, and the given signal group corresponds to a signaling in the first signaling group in the present application.

In one embodiment, a given TCI state being used to receive a given signal refers to: the given TCI state comprises a given reference signal, the given reference signal is a downlink signal, and a spatial Rx filter of the given reference signal is the same as a spatial Rx filter of the given signal.

In one subembodiment of the above embodiment, a given TCI state corresponds to a TCI state in the first TCI state group in the present application, and the given signal corresponds to a signal in the first signal group in the present application.

In one subembodiment of the above embodiment, a given TCI state corresponds to a TCI state in the first TCI state group in the present application, and the given signal corresponds to at least one layer in the first signal group in the present application.

In one subembodiment of the above embodiment, a given TCI state corresponds to a TCI state in the second TCI state group in the present application, and the given signal corresponds to a signal in the first signal group in the present application.

In one subembodiment of the above embodiment, a given TCI state corresponds to a TCI state in the second TCI state group in the present application, and the given signal corresponds to at least one layer in the first signal group in the present application.

In one subembodiment of the above embodiment, a given TCI state corresponds to a TCI state in the second TCI state group in the present application, and the given signal group corresponds to a signaling in the first signaling group in the present application.

In one embodiment, a given TCI state being used to receive a given signal refers to: the given TCI state comprises a given reference signal, and a spatial parameter of the given reference signal is used to receive the given signal.

In one subembodiment of the above embodiment, a given TCI state corresponds to a TCI state in the first TCI state group in the present application, and the given signal corresponds to a signal in the first signal group in the present application.

In one subembodiment of the above embodiment, a given TCI state corresponds to a TCI state in the first TCI state group in the present application, and the given signal corresponds to at least one layer in the first signal group in the present application.

In one subembodiment of the above embodiment, a given TCI state corresponds to a TCI state in the second TCI state group in the present application, and the given signal corresponds to a signal in the first signal group in the present application.

In one subembodiment of the above embodiment, a given TCI state corresponds to a TCI state in the second TCI state group in the present application, and the given signal corresponds to at least one layer in the first signal group in the present application.

In one subembodiment of the above embodiment, a given TCI state corresponds to a TCI state in the second TCI state group in the present application, and the given signal group corresponds to a signaling in the first signaling group in the present application.

In one embodiment, a given TCI state being used to receive a given signal refers to: the given TCI state comprises a given reference signal, and a spatial parameter of the given reference signal is the same as a spatial parameter for receiving the given signal.

In one subembodiment of the above embodiment, a given TCI state corresponds to a TCI state in the first TCI state group in the present application, and the given signal corresponds to a signal in the first signal group in the present application.

In one subembodiment of the above embodiment, a given TCI state corresponds to a TCI state in the first TCI state group in the present application, and the given signal corresponds to at least one layer in the first signal group in the present application.

In one subembodiment of the above embodiment, a given TCI state corresponds to a TCI state in the second TCI state group in the present application, and the given signal corresponds to a signal in the first signal group in the present application.

In one subembodiment of the above embodiment, a given TCI state corresponds to a TCI state in the second TCI state group in the present application, and the given signal corresponds to at least one layer in the first signal group in the present application.

In one subembodiment of the above embodiment, a given TCI state corresponds to a TCI state in the second TCI state group in the present application, and the given signal group corresponds to a signaling in the first signaling group in the present application.

In one embodiment, a given TCI state being used to receive a given signal refers to: the given TCI state comprises a given reference signal, the given reference signal is an uplink signal, and a spatial Tx parameter of the given reference signal is used to receive the given signal.

In one subembodiment of the above embodiment, a given TCI state corresponds to a TCI state in the first TCI state group in the present application, and the given signal corresponds to a signal in the first signal group in the present application.

In one subembodiment of the above embodiment, a given TCI state corresponds to a TCI state in the first TCI state group in the present application, and the given signal corresponds to at least one layer in the first signal group in the present application.

In one subembodiment of the above embodiment, a given TCI state corresponds to a TCI state in the second TCI state group in the present application, and the given signal corresponds to a signal in the first signal group in the present application.

In one subembodiment of the above embodiment, a given TCI state corresponds to a TCI state in the second TCI state group in the present application, and the given signal corresponds to at least one layer in the first signal group in the present application.

In one subembodiment of the above embodiment, a given TCI state corresponds to a TCI state in the second TCI state group in the present application, and the given signal group corresponds to a signaling in the first signaling group in the present application.

In one embodiment, a given TCI state being used to receive a given signal refers to: the given TCI state comprises a given reference signal, the given reference signal is an uplink signal, and a spatial Tx parameter of the given reference signal is the same as a spatial Rx parameter of the given signal.

In one subembodiment of the above embodiment, a given TCI state corresponds to a TCI state in the first TCI state group in the present application, and the given signal corresponds to a signal in the first signal group in the present application.

In one subembodiment of the above embodiment, a given TCI state corresponds to a TCI state in the first TCI state group in the present application, and the given signal corresponds to at least one layer in the first signal group in the present application.

In one subembodiment of the above embodiment, a given TCI state corresponds to a TCI state in the second TCI state group in the present application, and the given signal corresponds to a signal in the first signal group in the present application.

In one subembodiment of the above embodiment, a given TCI state corresponds to a TCI state in the second TCI state group in the present application, and the given signal corresponds to at least one layer in the first signal group in the present application.

In one subembodiment of the above embodiment, a given TCI state corresponds to a TCI state in the second TCI state group in the present application, and the given signal group corresponds to a signaling in the first signaling group in the present application.

In one embodiment, a given TCI state being used to receive a given signal refers to: the given TCI state comprises a given reference signal, the given reference signal is a downlink signal, and a spatial Rx parameter of the given reference signal is used to receive the given signal.

In one subembodiment of the above embodiment, a given TCI state corresponds to a TCI state in the first TCI state group in the present application, and the given signal corresponds to a signal in the first signal group in the present application.

In one subembodiment of the above embodiment, a given TCI state corresponds to a TCI state in the first TCI state group in the present application, and the given signal corresponds to at least one layer in the first signal group in the present application.

In one subembodiment of the above embodiment, a given TCI state corresponds to a TCI state in the second TCI state group in the present application, and the given signal corresponds to a signal in the first signal group in the present application.

In one subembodiment of the above embodiment, a given TCI state corresponds to a TCI state in the second TCI state group in the present application, and the given signal corresponds to at least one layer in the first signal group in the present application.

In one subembodiment of the above embodiment, a given TCI state corresponds to a TCI state in the second TCI state group in the present application, and the given signal group corresponds to a signaling in the first signaling group in the present application.

In one embodiment, a given TCI state being used to receive a given signal refers to: the given TCI state comprises a given reference signal, the given reference signal is a downlink signal, and a spatial Rx parameter of the given reference signal is the same as a spatial Rx parameter of the given signal.

In one subembodiment of the above embodiment, a given TCI state corresponds to a TCI state in the first TCI state group in the present application, and the given signal corresponds to a signal in the first signal group in the present application.

In one subembodiment of the above embodiment, a given TCI state corresponds to a TCI state in the first TCI state group in the present application, and the given signal corresponds to at least one layer in the first signal group in the present application.

In one subembodiment of the above embodiment, a given TCI state corresponds to a TCI state in the second TCI state group in the present application, and the given signal corresponds to a signal in the first signal group in the present application.

In one subembodiment of the above embodiment, a given TCI state corresponds to a TCI state in the second TCI state group in the present application, and the given signal corresponds to at least one layer in the first signal group in the present application.

In one subembodiment of the above embodiment, a given TCI state corresponds to a TCI state in the second TCI state group in the present application, and the given signal group corresponds to a signaling in the first signaling group in the present application.

In one embodiment, the Spatial Tx parameters comprise one or more of a transmitting antenna port, a transmitting antenna port group, a transmitting beam, a transmitting analog beamforming matrix, a transmitting analog beamforming vector, a transmitting beamforming matrix, a transmitting beamforming vector or a spatial-domain transmitting filter.

In one embodiment, the Spatial Rx parameters comprise one or more of a receiving beam, a receiving analog beamforming matrix, a receiving analog beamforming vector, a receiving beamforming matrix, a receiving beamforming vector or a spatial-domain receiving filter.

In one embodiment, the first information block is semi-statically configured.

In one embodiment, the first information block is configured by a higher-layer signaling.

In one embodiment, the first information block is configured by an RRC signaling.

In one embodiment, the first information block is configured by a MAC CE signaling.

In one embodiment, the first information block comprises an IE in an RRC signaling.

In one embodiment, the first information block comprises multiple IEs in an RRC signaling.

In one embodiment, the first information block comprises partial fields of an IE in an RRC signaling.

In one embodiment, the first information block comprises a PDSCH-Config IE.

In one embodiment, the first information block comprises a tci-StatesToAddModList and a tci-StatesToReleaseList.

In one embodiment, the first information block comprises a PDSCH-Config IE and a TCI-State IE.

In one embodiment, the first information block comprises a TCI States Activation/Deactivation for UE-specific PDSCH MAC CE.

In one embodiment, the second information block is semi-statically configured.

In one embodiment, the second information block is configured by a higher-layer signaling.

In one embodiment, the second information block is configured by an RRC signaling.

In one embodiment, the second information block is configured by a MAC CE signaling.

In one embodiment, the second information block comprises an IE in an RRC signaling.

In one embodiment, the second information block comprises multiple IEs in an RRC signaling.

In one embodiment, the second information block comprises partial fields of an IE in an RRC signaling.

In one embodiment, the second information block comprises a ControlResourceSet IE.

In one embodiment, the second information block comprises a ControlResourceSet IE and a PDCCH-Config IE.

In one embodiment, the second information block comprises a ControlResourceSet IE, a PDCCH-Config IE and a TCI-State IE.

In one embodiment, the second information block comprises a tci-StatesPDCCH-ToAddList and a tci-StatesPDCCH-ToReleaseList.

In one embodiment, the second information block comprises a ControlResourceSet IE and a TCI-State IE.

In one embodiment, the second information block comprises a TCI State Indication for UE-specific PDCCH MAC CE.

In one embodiment, a first information explicitly indicates the N TCI state groups.

In one embodiment, a first information implicitly indicates the N TCI state groups.

In one embodiment, a first information block indicates TCI states respectively comprised in the N TCI state groups.

In one embodiment, a first information block indicates identities of TCI states respectively comprised in the N TCI state groups.

In one embodiment, a first information block indicates indexes of TCI states respectively comprised in the N TCI state groups.

In one embodiment, a second information block explicitly indicates the second TCI state group.

In one embodiment, a second information block implicitly indicates the second TCI state group.

In one embodiment, a second information block indicates a TCI state comprised in the second TCI state group.

In one embodiment, a second information indicates that a first time-frequency resource set corresponds to the second TCI state group, and time-frequency resources occupied by the first signaling group belong to the first time-frequency resource set.

In one subembodiment of the above embodiment, the second TCI state group is used to receive a signal transmitted on the first time-frequency resource set.

In one subembodiment of the above embodiment, the first time-frequency resource set comprises at least one time-frequency resource group, and the second TCI state group is used to receive any time-frequency resource group in the first time-frequency resource set.

In one subembodiment of the above embodiment, the first time-frequency resource set comprises at least one time-frequency resource group, and only one TCI state in the second TCI state group is used to receive a time-frequency resource group in the first time-frequency resource set.

In one subembodiment of the above embodiment, the first time-frequency resource set comprises at least one time-frequency resource group, and at least one TCI state in the second TCI state group is used to receive a time-frequency resource group in the first time-frequency resource set.

In one subembodiment of the above embodiment, the first time-frequency resource set comprises at least one time-frequency resource group, and time-frequency resources occupied by the first signaling group belong to a time-frequency resource group in the first time-frequency resource set.

In one subembodiment of the above embodiment, the first time-frequency resource set comprises at least one time-frequency resource group, and time-frequency resources occupied by one signaling in the first signaling group belong to only one time-frequency resource group in the first time-frequency resource set.

In one subembodiment of the above embodiment, the first time-frequency resource set comprises a CORESET.

In one subembodiment of the above embodiment, the first time-frequency resource set comprises at least one CORESET.

In one subembodiment of the above embodiment, the first time-frequency resource set comprises at least one search space set.

In one subembodiment of the above embodiment, the first time-frequency resource set comprises one search space set.

In one subembodiment of the above embodiment, the first time-frequency resource set comprises at least one search space.

In one subembodiment of the above embodiment, any time-frequency resource group in the first time-frequency resource set comprises one CORESET.

In one subembodiment of the above embodiment, any time-frequency resource group in the first time-frequency resource set comprises one search space set.

In one subembodiment of the above embodiment, any time-frequency resource group in the first time-frequency resource set comprises one search space.

In one subembodiment of the above embodiment, any time-frequency resource group in the first time-frequency resource set comprises at least one PDCCH candidate.

In one subembodiment of the above embodiment, any time-frequency resource group in the first time-frequency resource set comprises one PDCCH candidate.

Embodiment 6A

Figure 6A:
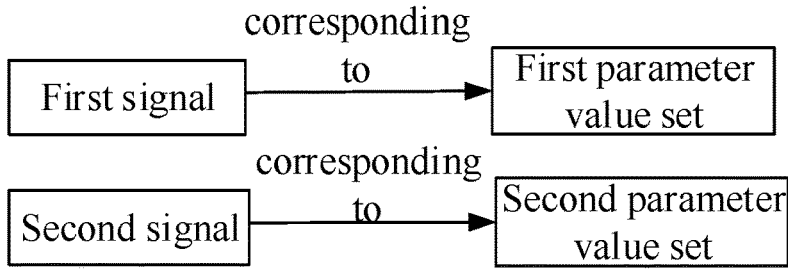
FIG. 6A illustrates a schematic diagram of determining a target integer according to one embodiment of the present application.
Figure 6A:
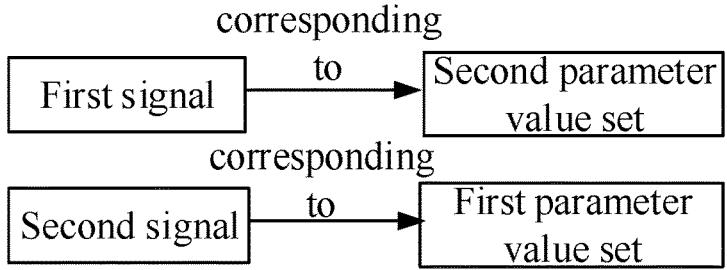

Embodiment 6A illustrates a schematic diagram of determining a target integer, as shown in FIG. 6A.

In embodiment 6A, the target integer is a first integer or a second integer, a parameter value set corresponding to the first signal in the present application and a parameter value set corresponding to the second signal in the present application are used to determine the target integer out of the first integer and the second integer; when the first signal corresponds to a first parameter value set and the second signal corresponds to a second parameter value set, the target integer is equal to the second integer; when the first signal corresponds to the second parameter value set and the second signal corresponds to the first parameter value set, the target integer is equal to the first integer.

In one embodiment, the first parameter value set only comprises a parameter value, and the second parameter value set only comprises a parameter value.

In one embodiment, the first parameter value set comprises multiple parameter values, and the second parameter value set comprises multiple parameter values.

In one embodiment, the parameter value set corresponding to the first signal is used to transmit the first signal, and the parameter value set corresponding to the second signal is used to transmit the second signal.

In one embodiment, the parameter value set corresponding to the first signal is used to determine a transmitting parameter of the first signal, and the parameter value set corresponding to the second signal is used to determine a transmitting parameter of the second signal.

In one embodiment, the parameter value set corresponding to the first signal is used to determine a start time for transmitting the first signal, and the parameter value set corresponding to the second signal is used to determine a start time for transmitting the second signal.

In one embodiment, the parameter value set corresponding to the first signal is used to determine a TAG corresponding the first signal, and the parameter value set corresponding to the second signal is used to determine a TAG corresponding the second signal.

In one embodiment, the parameter value set corresponding to the first signal is used to determine a TA of the first signal, and the parameter value set corresponding to the second signal is used to determine a TA of the second signal.

In one embodiment, the parameter value set corresponding to the first signal is used to determine a transmitting antenna panel of the first signal, and the parameter value set corresponding to the second signal is used to determine a transmitting antenna panel of the second signal.

In one embodiment, the parameter value set corresponding to the first signal is used to determine a Transmission Configuration Indicator (TCI) state of the first signal, and the parameter value set corresponding to the second signal is used to determine a TCI state of the second signal.

In one embodiment, the parameter value set corresponding to the first signal is used to determine a Quasi Co-Location (QCL) parameter of the first signal, and the parameter value set corresponding to the second signal is used to determine a QCL parameter of the second signal.

In one embodiment, the parameter value set corresponding to the first signal is used to determine a spatial-domain filter of the first signal, and the parameter value set corresponding to the second signal is used to determine a spatial-domain filter of the second signal.

In one embodiment, the parameter value set corresponding to the first signal is used to determine a spatial Tx parameter of the first signal, and the parameter value set corresponding to the second signal is used to determine a spatial Tx parameter of the second signal.

In one embodiment, the Spatial Tx parameter comprise one or more of a transmitting antenna port, a transmitting antenna port group, a transmitting beam, a transmitting analog beamforming matrix, a transmitting analog beamforming vector, a transmitting beamforming matrix, a transmitting beamforming vector and a spatial-domain transmitting filter.

In one embodiment, the parameter value set corresponding to the first signal is the first parameter value set, and the parameter value set corresponding to the second signal is the second parameter value set.

In one embodiment, the parameter value set corresponding to the first signal is the second parameter value set, and the parameter value set corresponding to the second signal is the first parameter value set.

Embodiment 6B

Figure 6B:
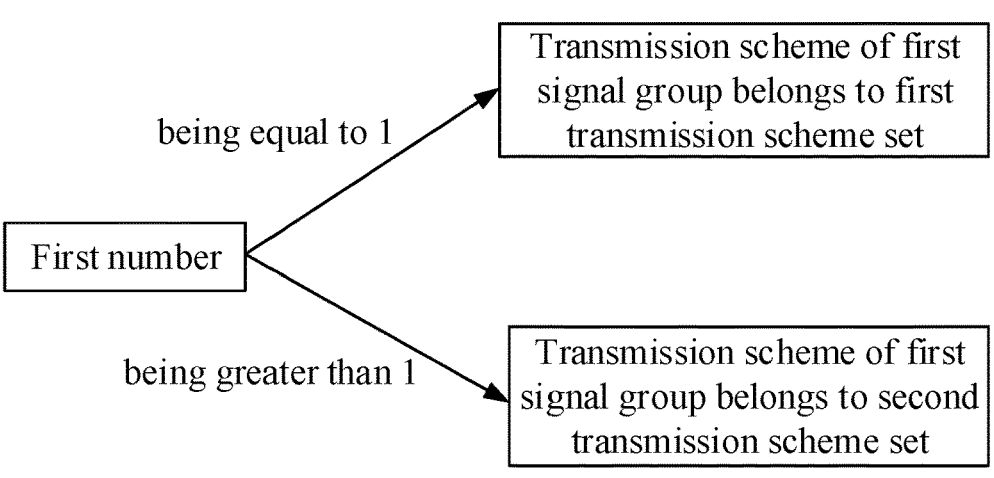
FIG. 6B illustrates a schematic diagram of a first number being used to determine a transmission scheme of a first signal group according to one embodiment of the present application.

Embodiment 6B illustrates a schematic diagram of determining a transmission scheme of a first signal group according to one embodiment of the present application, as shown in FIG. 6B.

In embodiment 6B, when the first number is equal to 1, the transmission scheme of the first signal group belongs to a first transmission scheme set; when the first number is greater than 1, the transmission scheme of the first signal group belongs to a second transmission scheme set; the second transmission scheme set is different from the first transmission scheme set.

In one embodiment, the transmission scheme of the first signal group only belongs to the first transmission scheme or the second transmission scheme set.

In one embodiment, at least one transmission scheme in the second transmission scheme set does not belong to the first transmission scheme set.

In one embodiment, any transmission scheme in the second transmission scheme set does not belong to the first transmission scheme set.

In one embodiment, the transmission scheme of the first signal group is a transmission scheme in the first transmission scheme set, or, the transmission scheme of the first signal group is a transmission scheme in the second transmission scheme set.

In one embodiment, the first transmission scheme set comprises at least one transmission scheme, and the second transmission scheme set comprises at least one transmission scheme.

In one embodiment, the first transmission scheme set comprises one transmission scheme, and the second transmission scheme set comprises one transmission scheme.

In one embodiment, the first transmission scheme set comprises one transmission scheme, and the second transmission scheme set comprises more than one transmission scheme.

In one embodiment, when the first number is equal to 1, the transmission scheme of the first signal group belongs to a first transmission scheme set; and when the first number is greater than 1, the transmission scheme of the first signal group belongs to a second transmission scheme set.

In one embodiment, when the first number is equal to 1, the transmission scheme of the first signal group belongs to a first transmission scheme set; when the first number is equal to 2, the transmission scheme of the first signal group belongs to a second transmission scheme set.

In one embodiment, a number of TCI state(s) corresponding to any transmission scheme in the first transmission scheme set is equal to 1, and a number of TCI states corresponding to any transmission scheme in the second transmission scheme set is greater than 1.

In one embodiment, a number of TCI state(s) corresponding to any transmission scheme in the first transmission scheme set is equal to 1, and a number of TCI states corresponding to any transmission scheme in the second transmission scheme set is equal to 2.

In one embodiment, a number of DMRS CDM group(s) corresponding to any transmission scheme in the first transmission scheme set is equal to 1 or greater than 1, and a number of DMRS CDM group(s) corresponding to any transmission scheme in the second transmission scheme is equal to 1.

In one embodiment, a number of DMRS CDM group(s) corresponding to any transmission scheme in the first transmission scheme set is equal to 1 or greater than 1, and a number of DMRS CDM groups corresponding to any transmission scheme in the second transmission scheme is greater than 1.

In one embodiment, a number of DMRS CDM group(s) corresponding to any transmission scheme in the first transmission scheme set is equal to 1 or greater than 1, and a number of DMRS CDM groups corresponding to any transmission scheme in the second transmission scheme is equal to 2.

In one embodiment, a number of DMRS CDM group(s) corresponding to any transmission scheme in the first transmission scheme set is equal to or greater than a number of corresponding TCI state(s), and a number of DMS CDM group(s) corresponding to any transmission scheme in the second transmission scheme set is equal to or less than a number of corresponding TCI state(s).

In one embodiment, a number of DMRS CDM group(s) corresponding to any transmission scheme in the first transmission scheme set is equal to or greater than a number of corresponding TCI state(s), and a number of DMS CDM group(s) corresponding to any transmission scheme in the second transmission scheme set is equal to a number of corresponding TCI state(s).

In one embodiment, a number of DMRS CDM group(s) corresponding to any transmission scheme in the first transmission scheme set is equal to or greater than a number of corresponding TCI state(s), and a number of DMS CDM group(s) corresponding to any transmission scheme in the second transmission scheme set is less than a number of corresponding TCI state(s).

In one embodiment, a number of DMRS CDM group(s) corresponding to any transmission scheme in the first transmission scheme set is the same or different from a number of corresponding TCI state(s), and a number of DMRS CDM group(s) corresponding to any transmission scheme in the second transmission scheme set is the same as a number of corresponding TCI state(s).

In one embodiment, any transmission scheme in the first transmission scheme set does not comprise a repetition, and any transmission scheme in the second transmission scheme set comprises a repetition.

In one embodiment, a transmission scheme in the first transmission scheme set does not comprise a repetition, and any transmission scheme in the second transmission scheme set comprises a repetition.

In one embodiment, a number of repetition(s) corresponding to any transmission scheme in the first transmission scheme set is equal to 1, and a number of repetitions corresponding to any transmission scheme in the second transmission scheme set is greater than 1.

In one embodiment, a number of repetition(s) corresponding to any transmission scheme in the first transmission scheme set is equal to 1, and a number of repetitions corresponding to any transmission scheme in the second transmission scheme set is equal to 2.

In one embodiment, a number of repetition(s) corresponding to one transmission scheme in the first transmission scheme set is equal to 1, and a number of repetitions corresponding to any transmission scheme in the second transmission scheme set is greater than 1.

In one embodiment, a number of repetition(s) corresponding to any transmission scheme in the first transmission scheme set is equal to 1, and a number of repetitions corresponding to any transmission scheme in the second transmission scheme set is equal to 2.

In one embodiment, a number of repetition(s) corresponding to any transmission scheme in the first transmission scheme set is configurable, and a number of repetition(s) corresponding to any transmission scheme in the second transmission scheme set is predefined.

In one embodiment, a number of repetition(s) corresponding to any transmission scheme in the first transmission scheme set is configured by an RRC signaling, and a number of repetitions corresponding to any transmission scheme in the second transmission scheme set is 2.

In one embodiment, a number of repetition(s) corresponding to any transmission scheme in the first transmission scheme set is explicitly indicated, and a number of repetition(s) corresponding to any transmission scheme in the second transmission scheme set is implicitly determined.

In one embodiment, any transmission scheme in the first transmission scheme set is a slot-level repetition, and any transmission scheme in the second transmission scheme set is a mini-slot-level repetition.

In one embodiment, any transmission scheme in the first transmission scheme set is an inter-slot repetition, and any transmission scheme in the second transmission scheme set is an intra-slot repetition.

In one embodiment, any transmission scheme in the first transmission scheme set is NR Rel-15 transmission scheme, and any transmission scheme in the second transmission scheme set is NR Rel-16 transmission scheme.

In one embodiment, any transmission scheme in the first transmission scheme set is Single-Point transmission, and any transmission scheme in the second transmission scheme set is Multi-Point transmission.

In one embodiment, any transmission scheme in the first transmission scheme set is single-point transmission, and the second transmission scheme set comprises multi-point SDM, multi-point TDM repetition and multi-point FDM repetition.

In one embodiment, the first transmission scheme set comprises an NR Rel-15 transmission scheme, and the second transmission scheme set comprises an NCJT.

In one embodiment, the first transmission scheme set comprises an NR Rel-15 transmission scheme, and the second transmission scheme set comprises at least one of FDMSchemeA, FDMSchemeB or TDMSchemeA.

In one embodiment, the first transmission scheme set comprises an NR Rel-15 transmission scheme, and the second transmission scheme set comprises at least one of an NCJT, FDMSchemeA, FDMSchemeB or TDMSchemeA.

In one embodiment, a number of TCI state(s) corresponding to any transmission scheme in the first transmission scheme set is equal to 1 and a number of its corresponding DMRS CDM group(s) is not less than the number of its corresponding TCI state(s), and a number of TCI states corresponding to any transmission scheme in the second transmission scheme set is equal to 2 and a number of its corresponding DMRS CDM group(s) is not greater than the number of its corresponding TCI state(s).

In one embodiment, a number of TCI state(s) corresponding to any transmission scheme in the first transmission scheme set is equal to 1 and a number of its corresponding DMRS CDM group(s) is not less than the number of its corresponding TCI state(s), and a number of TCI states corresponding to any transmission scheme in the second transmission scheme set is equal to 2 and a number of its corresponding DMRS CDM group(s) is less than the number of its corresponding TCI state(s).

In one embodiment, a number of TCI state(s) corresponding to any transmission scheme in the first transmission scheme set is equal to 1 and a number of its corresponding DMRS CDM group(s) is not less than the number of its corresponding TCI state(s), and a number of TCI states corresponding to any transmission scheme in the second transmission scheme set is equal to 2 and a number of its corresponding DMRS CDM group(s) is equal to the number of its corresponding TCI state(s).

Embodiment 7A

Figure 7A:
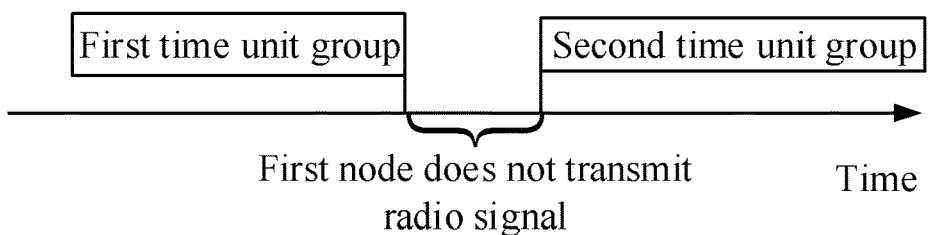
FIG. 7A illustrates a schematic diagram of a behavior of a first node at any time between a first time unit group and a second time unit group according to one embodiment of the present application.

Embodiment 7A illustrates a schematic diagram of a behavior of a first node at any time between a first time unit group and a second time unit group, as shown in FIG. 7A.

In embodiment 7A, the first node in the present application does not transmit a radio signal at any time between an end time of the first time unit group and a start time of the second time unit group.

In one embodiment, the first node performs an antenna switching between an end time of the first time unit group and a start time of the second time unit group.

In one embodiment, the first node performs a panel switching between an end time of the first time unit group and a start time of the second time unit group.

Embodiment 7B

Figure 7B:
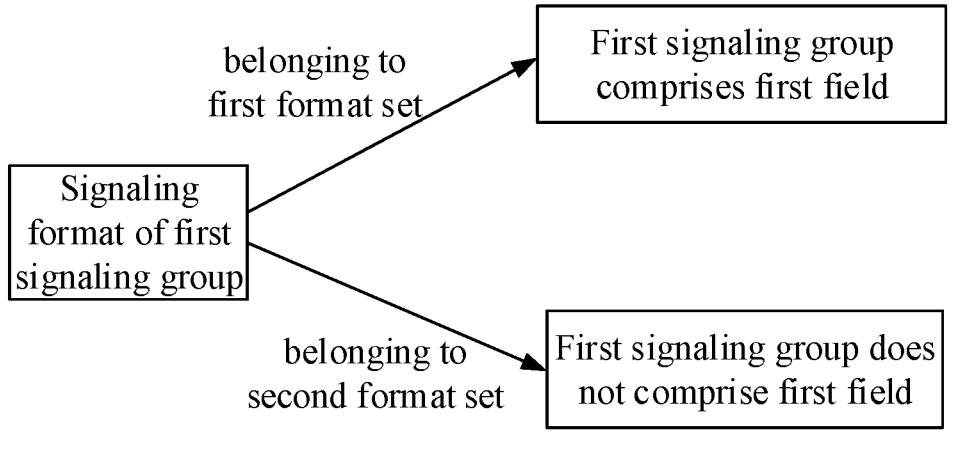
FIG. 7B illustrates a schematic diagram of a first format set and a second format set according to one embodiment of the present application.

Embodiment 7B illustrates a schematic diagram of a first format set and a second format set, as shown in FIG. 7B.

In Embodiment 7B, when the signaling format of the first signaling group in the present application belongs to the first format set, the first signaling group comprises a first field, and the first field comprised in the first signaling group is used to indicate the first TCI state group in the present application out of the N TCI state groups in the present application; when the signaling format of the first signaling group belongs to the second format set, the first signaling group does not comprise the first field.

In one embodiment, the first field is a Transmission Configuration Indicator field.

In one embodiment, for the specific meaning of the Transmission Configuration Indicator field, refer to section 7.3 in 3GPP TS38. 212.

In one embodiment, the first field is used to indicate a TCI state group corresponding to a PDSCH.

In one embodiment, the first field comprises at least one bit.

In one embodiment, the first field comprises 3 bits.

In one embodiment, a value of the first field is equal to an index of the first TCI state group in the N TCI state groups, and a value of the first field is a non-negative integer.

In one embodiment, when the signaling format of the first signaling group belongs to a first format set, the first signaling group comprises a first field, and the first field comprised in the first signaling group is used to indicate the first TCI state group out of the N TCI state groups; and when the signaling format of the first signaling group belongs to the second format set, the first signaling group does not comprise the first field.

In one embodiment, when the signaling format of the first signaling group belongs to the first format set, any signaling in the first signaling group comprises a first field.

In one embodiment, when the signaling format of the first signaling group belongs to the second format set, any signaling in the first signaling group does not comprise a first field.

In one embodiment, a signaling corresponding to any signaling format in the first format set comprises the first field, and a signaling corresponding to any signaling format in the second format set does not comprise the first field.

Embodiment 8A

Figure 8A:
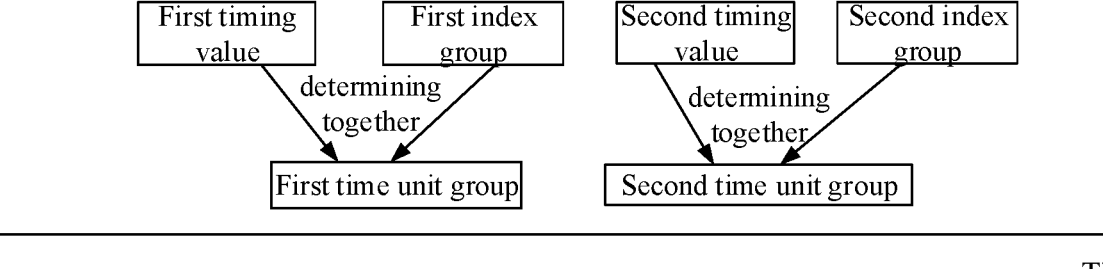
FIG. 8A illustrates a schematic diagram of determining a first time unit group and a second time unit group according to one embodiment of the present application.

Embodiment 8A illustrates a schematic diagram of determining a first time unit group and a second time unit group, as shown in FIG. 8A.

In embodiment 8A, a first timing value is a TA value for transmitting the first signal in the present application, and a second timing value is a TA value for transmitting the second signal in the present application; the first timing value and the first index group in the present application are used together to determine the first time unit group, and the second timing value and the second index group in the present application are used together to determine the second time unit group.

In one embodiment, the first timing value and the second timing value are two TA values relative to a same downlink timing.

In one embodiment, the first timing value and the second timing value are two TA values for different Time-Alignment Groups (TAGs).

In one embodiment, the first timing value and the second timing value are two TA values for a same TAG.

In one embodiment, when the first signal is transmitted, a start time of an i-th uplink frame is earlier than a start time of an i-th downlink frame by the first timing value; when the second signal is transmitted, a start time of an i-th uplink frame is earlier than a start time of an i-th downlink frame by the second timing value; i is a non-negative integer.

In one embodiment, the TA value is a time offset of an uplink timing earlier than the downlink timing.

In one embodiment, the downlink timing is a start time of an i-th downlink frame, and the uplink timing is a start time of an i-th uplink frame, i being a non-negative integer.

In one embodiment, the downlink timing is a start time of an i-th downlink sub-frame, and the uplink timing is a start time of an i-th uplink sub-frame, i being a non-negative integer.

In one embodiment, the downlink timing is a start time of an i-th downlink slot, and the uplink timing is a start time of an i-th uplink slot, i being a non-negative integer.

In one embodiment, a TA value is a time offset of a start time of an i-th uplink frame being earlier than a start time of an i-th downlink frame, i being a non-negative integer In one embodiment, the TA value is $T_{TA}$, and for the specific meaning of the $T_{TA}$, refer to section 4.3.1 in 3GPP TS38. 211.

In one embodiment, at a downlink timing, a reference time unit group is a time unit group corresponding to a given index group, the first time unit group comprises time-domain resources whose the reference time unit group is offset by the first timing value in advance, and the second time unit group comprises time-domain resources whose the reference time unit group is offset by the second timing value in advance.

In one embodiment, at a given timing value, a given time unit group comprises all time units corresponding to each index in the given index group.

In one subembodiment of the above embodiment, the given timing value is the first timing value, the given index group is the first index group, and the given time unit group is the first time unit group.

In one subembodiment of the above embodiment, the given timing value is the second timing value, the given index group is the second index group, and the given time unit group is the second time unit group.

Embodiment 8B

Figure 8B:
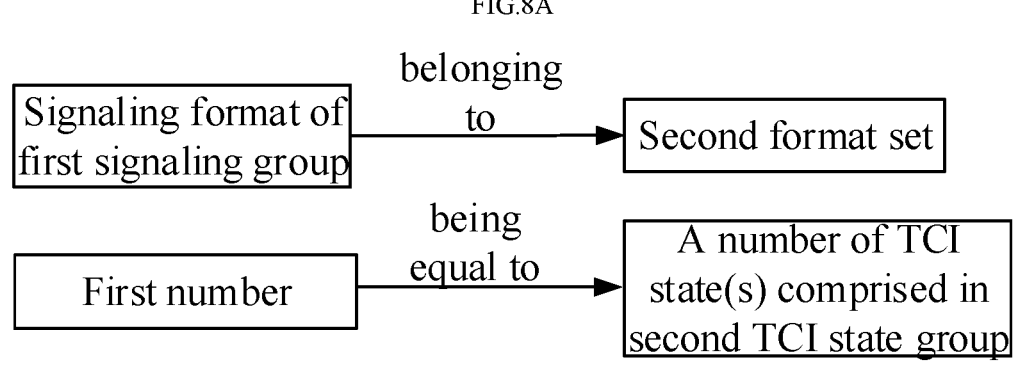
FIG. 8B illustrates a schematic diagram of a number of TCI state(s) comprised in a second TCI state group being used to determine a first number according to one embodiment of the present application.

Embodiment 8B illustrates a schematic diagram of a number of TCI state(s) comprised in a second TCI state group being used to determine a first number, as shown in FIG. 8B.

In embodiment 8B, when the signaling format of the first signaling group in the present application belongs to the second format set, the first number is equal to a number of TCI state(s) comprised in the second TCI state group.

Embodiment 9A

Figure 9A:
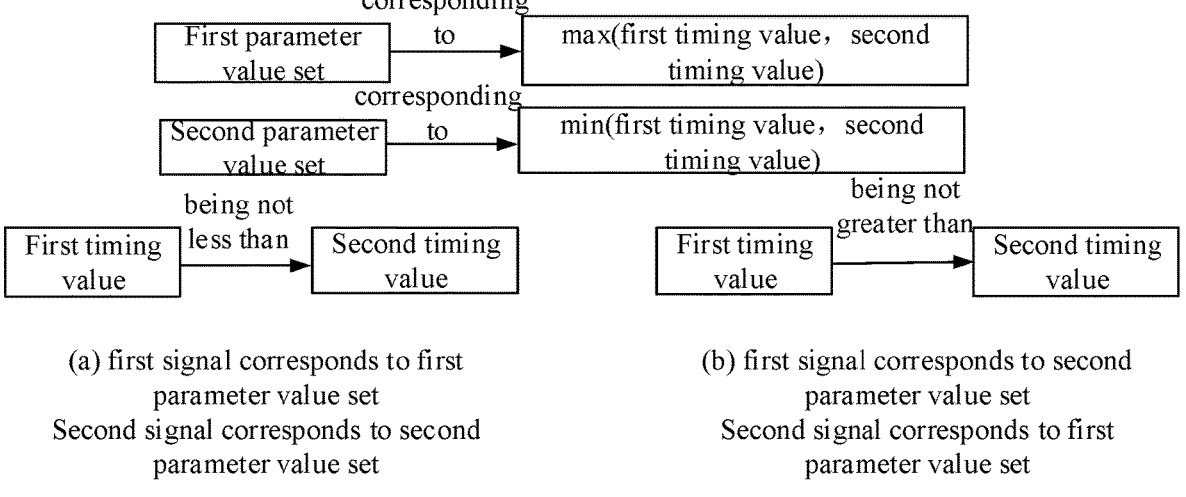
FIG. 9A illustrates a schematic diagram of a first parameter value set and a second parameter value set according to one embodiment of the present application.

Embodiment 9A illustrates a schematic diagram of a first parameter value set and a second parameter value set, as shown in FIG. 9A.

In embodiment 9A, the first parameter value corresponds to a greater one of the first timing value and the second timing value in the present application, and the second parameter value set corresponds to a smaller one of the first timing value and the second timing value; the meaning of the phrase in the present application of the first signal corresponding to the first parameter value set and the second signal corresponding to the second parameter value set comprises: the first timing value not being less than the second timing value; the meaning of the phrase in the present application of the first signal corresponding to the second parameter value set and the second signal corresponding to the first parameter value set comprises: the first timing value not being greater than the second timing value.

In one embodiment, the parameter value set corresponding to the first signal comprises the first timing value, and the parameter value set corresponding to the second signal comprises the second timing value.

In one embodiment, the first parameter value comprises a greater one of the first timing value and the second timing value, and the second parameter value set comprises a smaller one of the first timing value and the second timing value.

In one embodiment, when the first timing value and the second timing value are the same, a larger one of the first timing value and the second timing value is the first timing value or the second timing value, and a smaller one of the first timing value and the second timing value is the first timing value or the second timing value.

In one embodiment, the first timing value and the second timing value are different; when the first signal corresponds to the first parameter value set and the second signal corresponds to the second parameter value set, the first timing value is greater than the second timing value; when the first signal corresponds to the second parameter value set and the second signal corresponds to the first parameter value set, the first timing value is smaller than the second timing value.

In one embodiment, the first parameter value set comprises a first index, the second parameter value set comprises a second index, the first index corresponds to a larger one of the first timing value and the second timing value, and the second index corresponds to a smaller one of the first timing value and the second timing value.

In one embodiment, the first index and the second index are respectively used to indicate two different TAGs.

In one embodiment, the first index and the second index are respectively indexes of two TAGs.

In one embodiment, the first index and the second index are respectively used to indicate two antenna panels, and a TA of an antenna panel indicated by the first index is not less than a TA of an antenna panel indicated by the second index.

In one embodiment, the first index and the second index are respectively used to indicate two groups of serving cells, and a TA of a serving cell indicated by the first index is not less than a TA of a serving cell indicated by the second index.

In one embodiment, the first index and the second index are respectively used to indicate two groups of serving cells, and the first index and the second index are also respectively used to indicate two antenna panels.

In one embodiment, the first index is used to indicate the first signal group set and the second index is used to indicate the second signal group set.

In one embodiment, the first parameter value set is used to determine a first signal group set, and the second parameter value set is used to determine a second signal group set; the first signal group set corresponds to a greater one of the first timing value and the second timing value, and the second signal group set corresponds to a smaller one of the first timing value and the second timing value.

Embodiment 9B

Figure 9B:
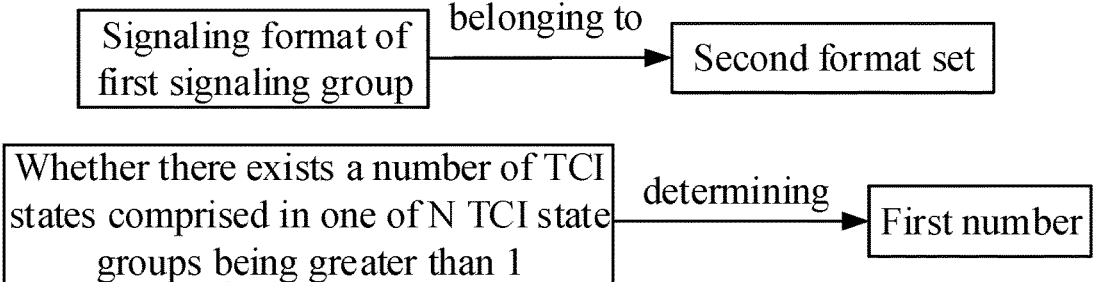
FIG. 9B illustrates a schematic diagram of a number of TCI state(s) comprised in a second TCI state group being used to determine a first number according to another embodiment of the present application.

Embodiment 9B illustrates another schematic diagram of a number of TCI state(s) comprised in a second TCI state group being used to determine a first number, as shown in FIG. 9B.

In Embodiment 9B, when the signaling format of the first signaling group in the present application belongs to the second format set in the present application and the number of TCI states comprised in the second TCI state group is greater than 1, whether there exists a number of TCIs comprised in one of the N TCI state groups in the present application being greater than 1 is used to determine the first number.

In one embodiment, when the signaling format of the first signaling group belongs to a second format set, the first number is not greater than a number of TCI state(s) comprised in the second TCI state group.

In one embodiment, when the signaling format of the first signaling group belongs to the second format set and the number of TCI state(s) comprised in the second TCI state group is equal to 1, the first number is equal to 1.

Embodiment 10A

Figures 10A, 10B, 11A:
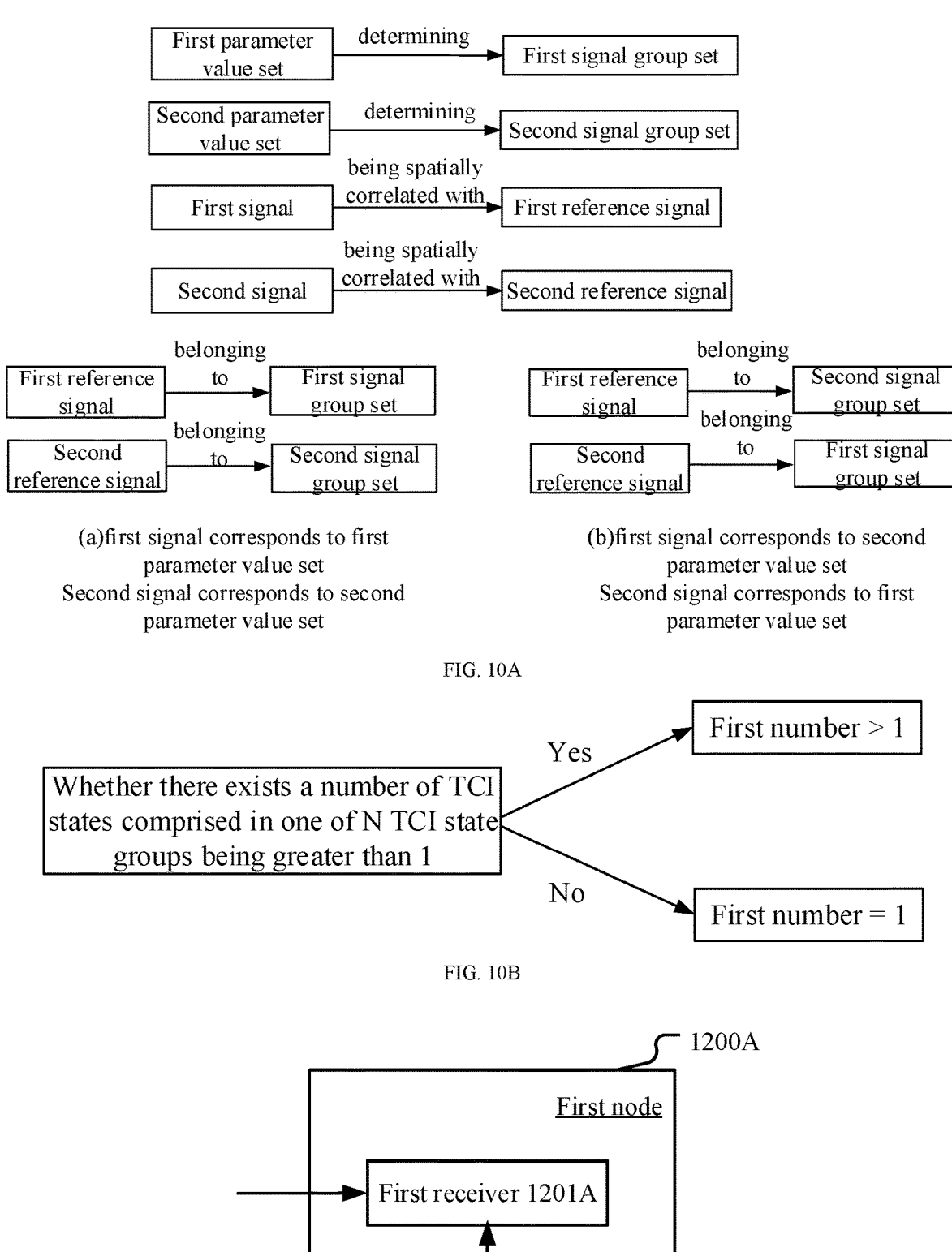
FIG. 10A illustrates a schematic diagram of a first parameter value set and a second parameter value set according to another embodiment of the present application.
FIG. 10B illustrates a schematic diagram of N TCI state groups being used to determine a first number according to one embodiment of the present application.
FIG. 11A illustrates a structure block diagram of a processor in a first node according to one embodiment of the present application.

Embodiment 10A illustrates another schematic diagram of a first parameter value set and a second parameter value set, as shown in FIG. 10A.

In embodiment 10A, the first parameter value set is used to determine a first signal group set, the second parameter value set is used to determine a second signal group set, the first signal group set comprises at least one reference signal group, and the second signal group set comprises at least one reference signal group; the first signal in the present application and a first reference signal are spatially correlated, and the second signal in the present application and the second parameter signal are spatially correlated; the meaning of the phrase in the present application of the first signal corresponding to the first parameter value set and the second signal corresponding to the second parameter value set comprises: the first reference signal belonging to the first signal group set, and the second reference signal belonging to the second signal group set; the meaning of the phrase in the present application of the first signal corresponding to the second parameter value set and the second signal corresponding to the first parameter value set comprises: the first reference signal belonging to the second signal group set, and the second reference signal belonging to the first signal group set.

In one embodiment, the first information block is used to indicate the first reference signal group and the second reference signal group.

In one embodiment, a higher-layer signaling configures that the first signal and the first reference signal are spatially correlated and that the second signal and the second reference signal are spatially correlated.

In one embodiment, the first parameter value set comprises a first index, the second parameter value set comprises a second index, the first index is used to indicate a first signal group set, and the second index is used to indicate a second signal group set.

In one embodiment, the first parameter value set comprises a first TCI state set, the second parameter value set comprises a second TCI state set, the first TCI state set indicates a first signal group set, and the second TCI state set indicates a second signal group set; the first TCI state set comprises at least one TCI state, and the second TCI state set comprises at least one TCI state.

In one embodiment, the first signal group set comprises at least one of a Channel State Information-Reference Signal (CSI-RS), a Sounding Reference Signal (SRS) or a Synchronization Signal/Physical Broadcast CHannel (SS/PBCH) Block.

In one embodiment, the second signal group set comprises at least one of a CSI-RS, an SRS or an SS/PBCH block.

In one embodiment, the first reference signal comprises one of a CSI-RS, an SRS or an SS/PBCH block.

In one embodiment, the second reference signal comprises one of a CSI-RS, an SRS or an SS/PBCH block.

In one embodiment, the meaning of a given signal and a given reference signal being spatially correlated comprises: a TCI state of the given reference signal being used to determine a TCI state of the given signal.

In one subembodiment of the above embodiment, the given signal is the first signal, and the given reference signal is the first reference signal.

In one subembodiment of the above embodiment, the given signal is the second signal, and the given reference signal is the second reference signal.

In one subembodiment of the above embodiment, the TCI state of the given reference signal is the same as the TCI state of the given signal.

In one subembodiment of the above embodiment, the TCI state of the given reference signal can be used to infer the TCI state of the given signal.

In one embodiment, the meaning of a given signal and a given reference signal being spatially correlated comprises: a QCL parameter of the given reference signal being used to determine a QCL parameter of the given signal.

In one subembodiment of the above embodiment, the given signal is the first signal, and the given reference signal is the first reference signal.

In one subembodiment of the above embodiment, the given signal is the second signal, and the given reference signal is the second reference signal.

In one subembodiment of the above embodiment, the QCL parameter of the given reference signal is the same as the QCL parameter of the given signal.

In one subembodiment of the above embodiment, the QCL parameter of the given reference signal can be used to infer the QCL parameter of the given signal.

In one embodiment, the meaning of a given signal and a given reference signal being spatially correlated comprises: a transmitting antenna port of the given reference signal and a transmitting antenna port of the given signal being QCL.

In one subembodiment of the above embodiment, the given signal is the first signal, and the given reference signal is the first reference signal.

In one subembodiment of the above embodiment, the given signal is the second signal, and the given reference signal is the second reference signal.

In one embodiment, the meaning of a given signal and a given reference signal being spatially correlated comprises: a spatial-domain filter of the given reference signal being used to determine a spatial-domain filter of the given signal.

In one subembodiment of the above embodiment, the given signal is the first signal, and the given reference signal is the first reference signal.

In one subembodiment of the above embodiment, the given signal is the second signal, and the given reference signal is the second reference signal.

In one subembodiment of the above embodiment, the spatial-domain filter of the given reference signal is the same as the spatial-domain filter of the given signal.

In one subembodiment of the above embodiment, the spatial-domain filter of the given reference signal can be used to infer the spatial-domain filter of the given signal.

In one embodiment, the meaning of a given signal and a given reference signal being spatially correlated comprises: the given reference signal being an uplink signal, and a spatial-domain filter used to transmit the given reference signal being used to determine a spatial-domain filter for transmitting the given signal.

In one subembodiment of the above embodiment, the given signal is the first signal, and the given reference signal is the first reference signal.

In one subembodiment of the above embodiment, the given signal is the second signal, and the given reference signal is the second reference signal.

In one subembodiment of the above embodiment, the spatial-domain filter used to transmit the given reference signal is the same as a spatial-domain filter of the given signal.

In one subembodiment of the above embodiment, the spatial-domain filter used to transmit the given reference signal can be used to infer the spatial-domain filter of the given signal.

In one embodiment, the meaning of a given signal and a given reference signal being spatially correlated comprises: the given reference signal being a downlink signal, and a spatial-domain filter used to receive the given reference signal being used to determine a spatial-domain filter for transmitting the given signal.

In one subembodiment of the above embodiment, the given signal is the first signal, and the given reference signal is the first reference signal.

In one subembodiment of the above embodiment, the given signal is the second signal, and the given reference signal is the second reference signal.

In one subembodiment of the above embodiment, the spatial-domain filter used to receive the given reference signal is the same as a spatial-domain filter of the given signal.

In one subembodiment of the above embodiment, the spatial-domain filter used to receive the given reference signal can be used to infer the spatial-domain filter of the given signal.

In one embodiment, the meaning of a given signal and a given reference signal being spatially correlated comprises: the given reference signal being an uplink signal, and a spatial transmitting parameter of the given reference signal being used to determine a spatial transmitting parameter of the given signal.

In one subembodiment of the above embodiment, the given signal is the first signal, and the given reference signal is the first reference signal.

In one subembodiment of the above embodiment, the given signal is the second signal, and the given reference signal is the second reference signal.

In one subembodiment of the above embodiment, the spatial transmitting parameter of the given reference signal is the same as the spatial transmitting parameter of the given signal.

In one subembodiment of the above embodiment, the spatial transmitting parameter of the given reference signal can be used to infer the spatial transmitting parameter of the given signal.

In one embodiment, the meaning of a given signal and a given reference signal being spatially correlated comprises: the given reference signal being a downlink signal, and a spatial receiving parameter of the given reference signal being used to determine a spatial transmitting parameter of the given signal.

In one subembodiment of the above embodiment, the given signal is the first signal, and the given reference signal is the first reference signal.

In one subembodiment of the above embodiment, the given signal is the second signal, and the given reference signal is the second reference signal.

In one subembodiment of the above embodiment, the spatial receiving parameter of the given reference signal is the same as the spatial transmitting parameter of the given signal.

In one subembodiment of the above embodiment, the spatial receiving parameter of the given reference signal can be used to infer the spatial transmitting parameter of the given signal.

In one embodiment, for specific meaning of two antenna ports being QCL, refer to section 5.1.5 in 3GPP TS38. 214.

In one embodiment, the Spatial Rx parameters comprise one or more of a receiving beam, a receiving analog beamforming matrix, a receiving analog beamforming vector, a receiving beamforming matrix, a receiving beamforming vector and a spatial-domain receiving filter.

Embodiment 10B

Embodiment 10B illustrates a schematic diagram of N TCI state groups being used to determine a first number, as shown in FIG. 10B.

In embodiment 10B, when there exists a number of TCI states comprised in one of the N TCI state groups being greater than 1, the first number is greater than 1; when a number of TCI state(s) comprised in any of the N TCI state groups is equal to 1, the first number is equal to 1.

In one embodiment, when there exists a number of TCI states comprised in one of the N TCI state groups being equal to 2, the first number is equal to 2; when a number of TCI state(s) comprised in any of the N TCI state groups is equal to 1, the first number is equal to 1.

Embodiment 11A

Embodiment 11A illustrates a structure block diagram of a processor in a first node, as shown in FIG. 11A. In FIG. 11A, a processor 1200A in a first node comprises a first receiver 1201A and a first transmitter 1202A.

In one embodiment, the first node 1200A is a UE.

In one embodiment, the first node 1200A is a relay node.

In one embodiment, the first node 1200A is a vehicle-mounted communication device.

In one embodiment, the first node 1200A is a UE supporting V2X communications.

In one embodiment, the first node 1200A is a relay node supporting V2X communications.

In one embodiment, the first receiver 1201A comprises at least one of the antenna 452, the receiver 454, the multi-antenna receiving processor 458, the receiving processor 456, the controller/processor 459, the memory 460 or the data source 467 in FIG. 4 of the present application.

In one embodiment, the first receiver 1201A comprises at least the first five of the antenna 452, the receiver 454, the multi-antenna receiving processor 458, the receiving processor 456, the controller/processor 459, the memory 460 and the data source 467 in FIG. 4 of the present application.

In one embodiment, the first receiver 1201A comprises at least the first four of the antenna 452, the receiver 454, the multi-antenna receiving processor 458, the receiving processor 456, the controller/processor 459, the memory 460 and the data source 467 in FIG. 4 of the present application.

In one embodiment, the first receiver 1201A comprises at least the first three of the antenna 452, the receiver 454, the multi-antenna receiving processor 458, the receiving processor 456, the controller/processor 459, the memory 460 and the data source 467 in FIG. 4 of the present application.

In one embodiment, the first receiver 1201A comprises at least the first two of the antenna 452, the receiver 454, the multi-antenna receiving processor 458, the receiving processor 456, the controller/processor 459, the memory 460 and the data source 467 in FIG. 4 of the present application.

In one embodiment, the first transmitter 1202A comprises at least one of the antenna 452, the transmitter 454, the multi-antenna transmitting processor 457, the transmitting processor 468, the controller/processor 459, the memory 460, or the data source 467 in FIG. 4 of the present application.

In one embodiment, the first transmitter 1202A comprises at least first five of the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1202A comprises at least first four of the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1202A comprises at least first three of the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1202A comprises at least first two the antenna 452, the transmitter 454, the multi-antenna transmitting processor 457, the transmitting processor 468, the controller/processor 459, the memory 460, and the data source 467 in FIG. 4 of the present application.

The first receiver 1201A receives a first information block; and the first transmitter 1202A transmits a first signal in a first time unit group; and transmits a second signal in a second time unit group;

in embodiment 11A, a start time of the first time unit group is earlier than a start time of the second time unit group; the first information block is used to determine a first index group and a second index group, the first index group comprises an index of each time unit in the first time unit group, and the second index group comprises an index of each time unit in the second time unit group; a minimum value of the second index group minus a maximum value of the first index group is equal to a target integer; the target integer is a first integer or a second integer, a parameter value set corresponding to the first signal and a parameter value set corresponding to the second signal are used to determine the target integer out of the first integer and the second integer; when the first signal corresponds to a first parameter value set and the second signal corresponds to a second parameter value set, the target integer is equal to the second integer; when the first signal corresponds to the second parameter value set and the second signal corresponds to the first parameter value set, the target integer is equal to the first integer; the first time unit group comprises at least one time unit, the second time unit group comprises at least one time unit, any index in the first index group is a non-negative integer, any index in the second index group is a non-negative integer, the first parameter value set comprises at least one parameter value, and the second parameter value set comprises at least one parameter value.

In one embodiment, the first node does not transmit a radio signal at any time between an end time of the first time unit group and a start time of the second time unit group.

In one embodiment, a first timing value is a TA value for transmitting the first signal, and a second timing value is a TA value for transmitting the second signal; the first timing value and the first index group are used together to determine the first time unit group, and the second timing value and the second index group are used together to determine the second time unit group.

In one embodiment, the first receiver 1201A also receives a second information block; herein, the second information block is used to determine the first timing value and the second timing value.

In one embodiment, the first parameter value corresponds to a greater one of the first timing value and the second timing value, and the second parameter value set corresponds to a smaller one of the first timing value and the second timing value; the meaning of the phrase of the first signal corresponding to the first parameter value set and the second signal corresponding to the second parameter value set comprises: the first timing value not being less than the second timing value; the meaning of the phrase of the first signal corresponding to the second parameter value set and the second signal corresponding to the first parameter value set comprises: the first timing value not being greater than the second timing value.

In one embodiment, the first parameter value set is used to determine a first signal group set, the second parameter value set is used to determine a second signal group set, the first signal group set comprises at least one reference signal group, and the second signal group set comprises at least one reference signal group; the first signal and a first reference signal are spatially correlated, and the second signal and the second parameter signal are spatially correlated; the meaning of the phrase of the first signal corresponding to the first parameter value set and the second signal corresponding to the second parameter value set comprises: the first reference signal belonging to the first signal group set, and the second reference signal belonging to the second signal group set; the meaning of the phrase of the first signal corresponding to the second parameter value set and the second signal corresponding to the first parameter value set comprises: the first reference signal belonging to the second signal group set, and the second reference signal belonging to the first signal group set.

In one embodiment, the first receiver 1201A also receives a third information block; herein, the third information block is used to determine the first integer and the second integer.

Embodiment 11B

Figure 11B:
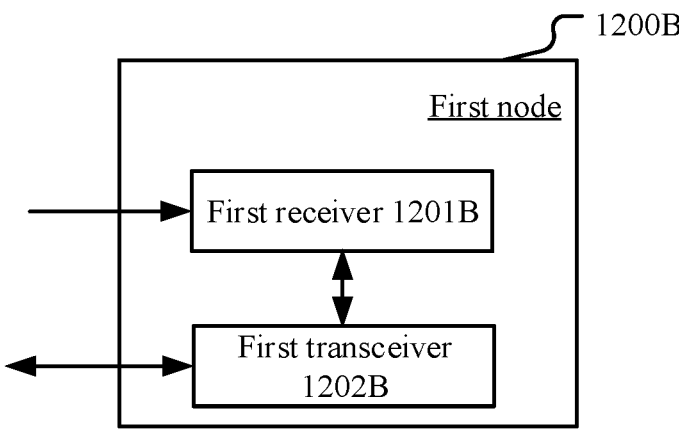
FIG. 11B illustrates a structure block diagram of a processor in a first node according to one embodiment of the present application.

Embodiment 11B illustrates a structure block diagram of a processor in a first node, as shown in FIG. 11B. In FIG. 11B, a processor 1200B in a first node comprises a first receiver 1201B and a first transceiver 1202B.

In one embodiment, the first node 1200B is a UE.

In one embodiment, the first node 1200B is a relay node.

In one embodiment, the first node 1200B is a vehicle-mounted communication device.

In one embodiment, the first node 1200B is a UE supporting V2X communications.

In one embodiment, the first node 1200B is a relay node supporting V2X communications.

In one embodiment, the first receiver 1201B comprises at least one of the antenna 452, the receiver 454, the multi-antenna receiving processor 458, the receiving processor 456, the controller/processor 459, the memory 460 or the data source 467 in FIG. 4 of the present application.

In one embodiment, the first receiver 1201B comprises at least first five of the antenna 452, the receiver 454, the multi-antenna receiving processor 458, the receiving processor 456, the controller/processor 459, the memory 460 and the data source 467 in FIG. 4 of the present application.

In one embodiment, the first receiver 1201B comprises at least first four of the antenna 452, the receiver 454, the multi-antenna receiving processor 458, the receiving processor 456, the controller/processor 459, the memory 460 and the data source 467 in FIG. 4 of the present application.

In one embodiment, the first receiver 1201B comprises at least first three of the antenna 452, the receiver 454, the multi-antenna receiving processor 458, the receiving processor 456, the controller/processor 459, the memory 460 and the data source 467 in FIG. 4 of the present application.

In one embodiment, the first receiver 1201B comprises at least first two of the antenna 452, the receiver 454, the multi-antenna receiving processor 458, the receiving processor 456, the controller/processor 459, the memory 460 and the data source 467 in FIG. 4 of the present application.

In one embodiment, the first transceiver 1202B comprises at least one of the antenna 452, the transmitter/receiver 454, the multi-antenna transmitting processor 457, the multi-antenna receiving processor 458, the transmitting processor 468, the receiving processor 456, the controller/processor 459, the memory 460 or the data source 467 in FIG. 4 of the present application.

In one embodiment, the first transceiver 1202B comprises at least one of the antenna 452, the receiver 454, the multi-antenna receiving processor 458, the receiving processor 456, the controller/processor 459, the memory 460 or the data source 467 in FIG. 4 of the present application, and the operating action in the present application is receiving.

In one embodiment, the first transceiver 1202B comprises at least first five of the antenna 452, the receiver 454, the multi-antenna receiving processor 458, the receiving processor 456, the controller/processor 459, the memory 460 and the data source 467 in FIG. 4 of the present application, and the operating action in the present application is receiving.

In one embodiment, the first transceiver 1202B comprises at least first four of the antenna 452, the receiver 454, the multi-antenna receiving processor 458, the receiving processor 456, the controller/processor 459, the memory 460 and the data source 467 in FIG. 4 of the present application, and the operating action in the present application is receiving.

In one embodiment, the first transceiver 1202B comprises at least first three of the antenna 452, the receiver 454, the multi-antenna receiving processor 458, the receiving processor 456, the controller/processor 459, the memory 460 and the data source 467 in FIG. 4 of the present application, and the operating action in the present application is receiving.

In one embodiment, the first transceiver 1202B comprises at least first two of the antenna 452, the receiver 454, the multi-antenna receiving processor 458, the receiving processor 456, the controller/processor 459, the memory 460 and the data source 467 in FIG. 4 of the present application, and the operating action in the present application is receiving.

In one embodiment, the first transceiver 1202B comprises at least one of the antenna 452, the transmitter 454, the multi-antenna transmitting processor 457, the transmitting processor 468, the controller/processor 459, the memory 460 or the data source 467 in FIG. 4 of the present application, and the operating action in the present application is transmitting.

In one embodiment, the first transceiver 1202B comprises at least first five of the antenna 452, the transmitter 454, the multi-antenna transmitting processor 457, the transmitting processor 468, the controller/processor 459, the memory 460 and the data source 467 in FIG. 4 of the present application, and the operating action in the present application is transmitting.

In one embodiment, the first transceiver 1202B comprises at least first four of the antenna 452, the transmitter 454, the multi-antenna transmitting processor 457, the transmitting processor 468, the controller/processor 459, the memory 460 and the data source 467 in FIG. 4 of the present application, and the operating action in the present application is transmitting.

In one embodiment, the first transceiver 1202B comprises at least first three of the antenna 452, the transmitter 454, the multi-antenna transmitting processor 457, the transmitting processor 468, the controller/processor 459, the memory 460 and the data source 467 in FIG. 4 of the present application, and the operating action in the present application is transmitting.

In one embodiment, the first transceiver 1202B comprises at least first two of the antenna 452, the transmitter 454, the multi-antenna transmitting processor 457, the transmitting processor 468, the controller/processor 459, the memory 460 and the data source 467 in FIG. 4 of the present application, and the operating action in the present application is transmitting.

The first receiver 1201B receives a first signaling group; and the first transceiver 1202B operates a first signal group;

In embodiment 11B, the first signaling group is used to indicate scheduling information of the first signal group; a first number is used to determine a transmission scheme of the first signal group, a signaling format of the first signaling group is used to determine the first number, the first number being a positive integer; when the signaling format of the first signaling group belongs to a first format set, the first signaling group is used to indicate a first TCI state group out of N TCI state groups, N being a positive integer greater than 1, and the first number is equal to a number of TCI state(s) comprised in the first TCI state group; when the signaling format of the first signaling group belongs to a second format set, a number of TCI state(s) comprised in a second TCI state group is used to determine the first number, and the second TCI state group is used to receive the first signaling group; the signaling format of the first signaling group only belongs to the first format set or the second format set, the first format set is different from the second format set; the operating action is transmitting, or, the operating action is receiving.

In one embodiment, when the first number is equal to 1, the transmission scheme of the first signal group belongs to a first transmission scheme set; when the first number is greater than 1, the transmission scheme of the first signal group belongs to a second transmission scheme set; the second transmission scheme set is different from the first transmission scheme set.

In one embodiment, when the signaling format of the first signaling group belongs to the first format set, the first signaling group comprises a first field, and the first field comprised in the first signaling group is used to indicate the first TCI state group out of the N TCI state groups; when the signaling format of the first signaling group belongs to the second format set, the first signaling group does not comprise the first field.

In one embodiment, when the signaling format of the first signaling group belongs to the second format set, the first number is equal to a number of TCI state(s) comprised in the second TCI state group.

In one embodiment, when the signaling format of the first signaling group belongs to the second format set and the number of TCI states comprised in the second TCI state group is greater than 1, whether there exists a number of TCI states comprised in one of the N TCI state groups being greater than 1 is used to determine the first number.

In one embodiment, when there exists a number of TCI states comprised in one of the N TCI state groups being greater than 1, the first number is greater than 1; when a number of TCI state(s) comprised in any of the N TCI state groups is equal to 1, the first number is equal to 1.

In one embodiment, the first receiver 1201B also receives a first information block; the first receiver 1201B also receives a second information block; herein, the first information block is used to indicate the N TCI state groups, and the second information block is used to indicate the second TCI state group.

Embodiment 12A

Figure 12A:
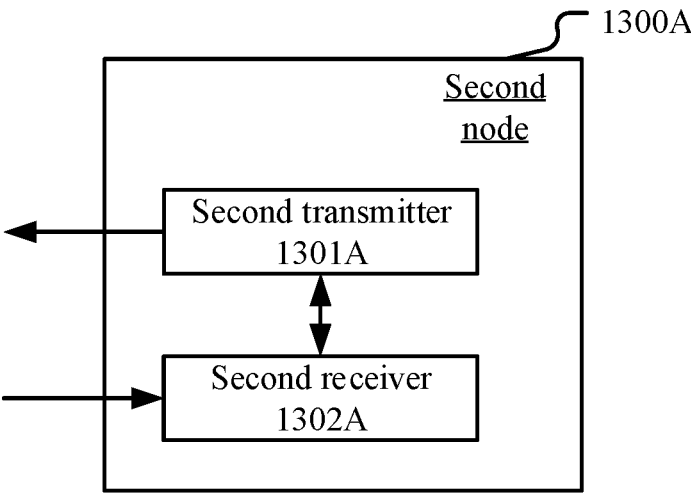
FIG. 12A illustrates a structure block diagram of a processor in second node according to one embodiment of the present application.

Embodiment 12A illustrates a structure block diagram of a processor in a second node, as shown in FIG. 12A. In FIG. 12A, a processor 1300A of a second node comprises a second transmitter 1301A and a second receiver 1302A.

In one embodiment, the second node 1300A is a UE.

In one embodiment, the second node 1300A is a base station.

In one embodiment, the second node 1300A is a relay node.

In one embodiment, the second transmitter 1301A comprises at least one of the antenna 420, the transmitter 418, the multi-antenna transmitting processor 471, the transmitting processor 416, the controller/processor 475 or the memory 476 in FIG. 4 of the present application.

In one embodiment, the second transmitter 1301A comprises at least first five of the antenna 420, the transmitter 418, the multi-antenna transmitting processor 471, the transmitting processor 416, the controller/processor 475 and the memory 476 in FIG. 4 of the present application.

In one embodiment, the second transmitter 1301A comprises at least first four of the antenna 420, the transmitter 418, the multi-antenna transmitting processor 471, the transmitting processor 416, the controller/processor 475 and the memory 476 in FIG. 4 of the present application.

In one embodiment, the second transmitter 1301A comprises at least first three of the antenna 420, the transmitter 418, the multi-antenna transmitting processor 471, the transmitting processor 416, the controller/processor 475 and the memory 476 in FIG. 4 of the present application.

In one embodiment, the second transmitter 1301A comprises at least first two of the antenna 420, the transmitter 418, the multi-antenna transmitting processor 471, the transmitting processor 416, the controller/processor 475 and the memory 476 in FIG. 4 of the present application.

In one embodiment, the second receiver 1302A comprises at least one of the antenna 420, the receiver 418, the multi-antenna receiving processor 472, the receiving processor 470, the controller/processor 475 or the memory 476 in FIG. 4 of the present application.

In one embodiment, the second receiver 1302A comprises at least first five of the antenna 420, the receiver 418, the multi-antenna receiving processor 472, the receiving processor 470, the controller/processor 475 and the memory 476 in FIG. 4 of the present application.

In one embodiment, the second receiver 1302A comprises at least first four of the antenna 420, the receiver 418, the multi-antenna receiving processor 472, the receiving processor 470, the controller/processor 475 and the memory 476 in FIG. 4 of the present application.

In one embodiment, the second receiver 1302A comprises at least first three of the antenna 420, the receiver 418, the multi-antenna receiving processor 472, the receiving processor 470, the controller/processor 475 and the memory 476 in FIG. 4 of the present application.

In one embodiment, the second receiver 1302A comprises at least first two of the antenna 420, the receiver 418, the multi-antenna receiving processor 472, the receiving processor 470, the controller/processor 475 and the memory 476 in FIG. 4 of the present application.

The second transmitter 1301A transmits a first information block; and the second receiver 1302A receives a first signal in a first time unit group; and receives a second signal in a second time unit group;

in embodiment 12A, a start time of the first time unit group is earlier than a start time of the second time unit group; the first information block is used to determine a first index group and a second index group, the first index group comprises an index of each time unit in the first time unit group, and the second index group comprises an index of each time unit in the second time unit group; a minimum value of the second index group minus a maximum value of the first index group is equal to a target integer; the target integer is a first integer or a second integer, a parameter value set corresponding to the first signal and a parameter value set corresponding to the second signal are used to determine the target integer out of the first integer and the second integer; when the first signal corresponds to a first parameter value set and the second signal corresponds to a second parameter value set, the target integer is equal to the second integer; when the first signal corresponds to the second parameter value set and the second signal corresponds to the first parameter value set, the target integer is equal to the first integer; the first time unit group comprises at least one time unit, the second time unit group comprises at least one time unit, any index in the first index group is a non-negative integer, any index in the second index group is a non-negative integer, the first parameter value set comprises at least one parameter value, and the second parameter value set comprises at least one parameter value.

In one embodiment, a transmitter of the first signal does not transmit a radio signal at any time between an end time of the first time unit group and a start time of the second time unit group.

In one embodiment, a first timing value is a TA value for transmitting the first signal, and a second timing value is a TA value for transmitting the second signal; the first timing value and the first index group are used together to determine the first time unit group, and the second timing value and the second index group are used together to determine the second time unit group.

In one embodiment, the second transmitter 1301A also transmits a second information block; herein, the second information block is used to determine the first timing value and the second timing value.

In one embodiment, the first parameter value corresponds to a greater one of the first timing value and the second timing value, and the second parameter value set corresponds to a smaller one of the first timing value and the second timing value; the meaning of the phrase of the first signal corresponding to the first parameter value set and the second signal corresponding to the second parameter value set comprises: the first timing value not being less than the second timing value; the meaning of the phrase of the first signal corresponding to the second parameter value set and the second signal corresponding to the first parameter value set comprises: the first timing value not being greater than the second timing value.

In one embodiment, the first parameter value set is used to determine a first signal group set, the second parameter value set is used to determine a second signal group set, the first signal group set comprises at least one reference signal group, and the second signal group set comprises at least one reference signal group; the first signal and a first reference signal are spatially correlated, and the second signal and the second parameter signal are spatially correlated; the meaning of the phrase of the first signal corresponding to the first parameter value set and the second signal corresponding to the second parameter value set comprises: the first reference signal belonging to the first signal group set, and the second reference signal belonging to the second signal group set; the meaning of the phrase of the first signal corresponding to the second parameter value set and the second signal corresponding to the first parameter value set comprises: the first reference signal belonging to the second signal group set, and the second reference signal belonging to the first signal group set.

In one embodiment, the second transmitter 1301A also transmits a third information block; herein, the third information block is used to determine the first integer and the second integer.

Embodiment 12B

Figure 12B:
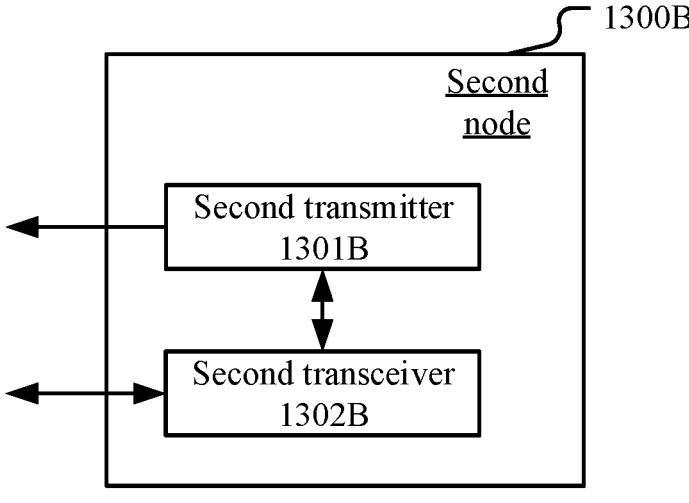
FIG. 12B illustrates a structure block diagram of a processor in second node according to one embodiment of the present application.

Embodiment 12B illustrates a structure block diagram of a processor in a second node, as shown in FIG. 12B. In FIG. 12B, a processor 1300B of a second node comprises a second transmitter 1301B and a second transceiver 1302B.

In one embodiment, the second node 1300B is a UE.

In one embodiment, the second node 1300B is a base station.

In one embodiment, the second node 1300B is a relay node.

In one embodiment, the second transmitter 1301B comprises at least one of the antenna 420, the transmitter 418, the multi-antenna transmitting processor 471, the transmitting processor 416, the controller/processor 475 or the memory 476 in FIG. 4 of the present application.

In one embodiment, the second transmitter 1301B comprises at least first five of the antenna 420, the transmitter 418, the multi-antenna transmitting processor 471, the transmitting processor 416, the controller/processor 475 and the memory 476 in FIG. 4 of the present application.

In one embodiment, the second transmitter 1301B comprises at least first four of the antenna 420, the transmitter 418, the multi-antenna transmitting processor 471, the transmitting processor 416, the controller/processor 475 and the memory 476 in FIG. 4 of the present application.

In one embodiment, the second transmitter 1301B comprises at least first three of the antenna 420, the transmitter 418, the multi-antenna transmitting processor 471, the transmitting processor 416, the controller/processor 475 and the memory 476 in FIG. 4 of the present application.

In one embodiment, the second transmitter 1301B comprises at least first two of the antenna 420, the transmitter 418, the multi-antenna transmitting processor 471, the transmitting processor 416, the controller/processor 475 and the memory 476 in FIG. 4 of the present application.

In one embodiment, the second transceiver 1302B comprises at least one of the antenna 420, the transmitter/receiver 418, the multi-antenna transmitting processor 471, the multi-antenna receiving processor 472, the transmitting processor 416, the receiving processor 470, the controller/processor 475 or the memory 476 in FIG. 4 of the present application.

In one embodiment, the second transceiver 1302B comprises at least one of the antenna 420, the receiver 418, the multi-antenna receiving processor 472, the receiving processor 470, the controller/processor 475 or the memory 476, and the executing action in the present application is receiving.

In one embodiment, the second transceiver 1302B comprises at least first five of the antenna 420, the receiver 418, the multi-antenna receiving processor 472, the receiving processor 470, the controller/processor 475 and the memory 476, and the executing action in the present application is receiving.

In one embodiment, the second transceiver 1302B comprises at least first four of the antenna 420, the receiver 418, the multi-antenna receiving processor 472, the receiving processor 470, the controller/processor 475 and the memory 476, and the executing action in the present application is receiving.

In one embodiment, the second transceiver 1302B comprises at least first three of the antenna 420, the receiver 418, the multi-antenna receiving processor 472, the receiving processor 470, the controller/processor 475 and the memory 476, and the executing action in the present application is receiving.

In one embodiment, the second transceiver 1302B comprises at least first two of the antenna 420, the receiver 418, the multi-antenna receiving processor 472, the receiving processor 470, the controller/processor 475 and the memory 476, and the executing action in the present application is receiving.

In one embodiment, the second transceiver 1302B comprises at least one of the antenna 420, the transmitter 418, the multi-antenna transmitting processor 471, the transmitting processor 416, the controller/processor 475 or the memory 476 in FIG. 4 of the present application, and the executing action in the present application is transmitting.

In one embodiment, the second transceiver 1302B comprises at least first five of the antenna 420, the transmitter 418, the multi-antenna transmitting processor 471, the transmitting processor 416, the controller/processor 475 and the memory 476 in FIG. 4 of the present application, and the executing action in the present application is transmitting.

In one embodiment, the second transceiver 1302B comprises at least first four of the antenna 420, the transmitter 418, the multi-antenna transmitting processor 471, the transmitting processor 416, the controller/processor 475 and the memory 476 in FIG. 4 of the present application, and the executing action in the present application is transmitting.

In one embodiment, the second transceiver 1302B comprises at least first three of the antenna 420, the transmitter 418, the multi-antenna transmitting processor 471, the transmitting processor 416, the controller/processor 475 and the memory 476 in FIG. 4 of the present application, and the executing action in the present application is transmitting.

In one embodiment, the second transceiver 1302B comprises at least first two of the antenna 420, the transmitter 418, the multi-antenna transmitting processor 471, the transmitting processor 416, the controller/processor 475 and the memory 476 in FIG. 4 of the present application, and the executing action in the present application is transmitting.

The second transmitter 1301B transmits a first signaling group; and the second transceiver 1302B executes a first signal group;

In embodiment 12B, the first signaling group is used to indicate scheduling information of the first signal group; a first number is used to determine a transmission scheme of the first signal group, a signaling format of the first signaling group is used to determine the first number, the first number being a positive integer; when the signaling format of the first signaling group belongs to a first format set, the first signaling group is used to indicate a first TCI state group out of N TCI state groups, N being a positive integer greater than 1, and the first number is equal to a number of TCI state(s) comprised in the first TCI state group; when the signaling format of the first signaling group belongs to a second format set, a number of TCI state(s) comprised in a second TCI state group is used to determine the first number, and the second TCI state group is used to receive the first signaling group; the signaling format of the first signaling group only belongs to the first format set or the second format set, the first format set is different from the second format set; the executing action is receiving, or, the executing action is transmitting.

In one embodiment, when the first number is equal to 1, the transmission scheme of the first signal group belongs to a first transmission scheme set; when the first number is greater than 1, the transmission scheme of the first signal group belongs to a second transmission scheme set; the second transmission scheme set is different from the first transmission scheme set.

In one embodiment, when the signaling format of the first signaling group belongs to the first format set, the first signaling group comprises a first field, and the first field comprised in the first signaling group is used to indicate the first TCI state group out of the N TCI state groups; when the signaling format of the first signaling group belongs to the second format set, the first signaling group does not comprise the first field.

In one embodiment, when the signaling format of the first signaling group belongs to the second format set, the first number is equal to a number of TCI state(s) comprised in the second TCI state group.

In one embodiment, when the signaling format of the first signaling group belongs to the second format set and the number of TCI states comprised in the second TCI state group is greater than 1, whether there exists a number of TCI states comprised in one of the N TCI state groups being greater than 1 is used to determine the first number.

In one embodiment, when there exists a number of TCI states comprised in one of the N TCI state groups being greater than 1, the first number is greater than 1; when a number of TCI state(s) comprised in any of the N TCI state groups is equal to 1, the first number is equal to 1.

In one embodiment, the second transmitter 1301B also transmits a first information block; the second transmitter 1301B also transmits a second information block; herein, the first information block is used to indicate the N TCI state groups, and the second information block is used to indicate the second TCI state group.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present application includes but is not limited to mobile phones, tablet computers, notebooks, network cards, low-consumption equipment, eMTC terminals, NB-IOT terminals, vehicle-mounted communication equipment, aircrafts, diminutive airplanes, unmanned aerial vehicles, telecontrolled aircrafts and other wireless communication devices. The UE or terminal in the present application includes but is not limited to mobile phones, tablet computers, notebooks, network cards, low-consumption equipment, eMTC terminals, NB-IOT terminals, vehicle-mounted communication equipment, aircrafts, diminutive airplanes, unmanned aerial vehicles, telecontrolled aircrafts, etc. The base station or network side equipment in the present application includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A User Equipment (UE), the UE comprising:
a processor configured to process data; and
a receiver configured to:
   receive, using a first Transmission Configuration Indicator (TCI) state group, a Downlink Control Information (DCI) having a DCI format, the DCI including scheduling information for a first signal group, wherein the first signal group includes a Physical Downlink Shared Channel (PDSCH) transmission or PDSCH repetitions, and wherein the DCI format belongs to either a first DCI format set or a second DCI format set that is different than the first DCI format set; and
   receive, using the DCI, the first signal group having a transmission scheme that is based on a number of TCI states in a TCI state group corresponding to the first signal group;
wherein, on a condition that the DCI format belongs to the first DCI format set, the TCI state group is the first TCI state group used to receive the DCI; and
on a condition that the DCI format belongs to the second DCI format set, the DCI indicates a second TCI state group that is different than the first TCI state group, and the TCI state group is the second TCI state group indicated by the DCI.

2. The UE of claim 1, wherein:
on a condition that the number of TCI states in the TCI state group is 1, the transmission scheme is belongs to a first transmission scheme set; and
on a condition that the number of TCI states in the TCI state group is greater than one, the transmission scheme belongs to a second transmission scheme set that is different than the first transmission scheme set.

3. The UE of claim 1, wherein:
on a condition that the DCI format belongs to the second DCI format set, the DCI includes a field that indicates the second TCI state group; and on a condition that the DCI format belongs to the first DCI format set, the DCI does not include the field.

4. The UE of claim 1, wherein the transmission scheme is based on a positive integer that is determined at least in part by the number of TCI states in the TCI state group.

5. The UE of claim 1, wherein:
the TCI state group is one TCI state group of a plurality of TCI state groups.

6. The UE of claim 1, wherein the receiver is further configured to:
receive a first information block that indicates a plurality of TCI state groups; and
receive a second information block that includes the first TCI state group, wherein the first TCI state group is selected from the plurality of TCI state groups.

7. A base station, the base station comprising:
a processor configured to process data; and
a transmitter configured to:
   transmit, using a first Transmission Configuration Indicator (TCI) state group, a Downlink Control Information (DCI) having a DCI format, the DCI including scheduling information for a first signal group, wherein the first signal group includes a Physical Downlink Shared Channel (PDSCH) transmission or PDSCH repetitions, and wherein the DCI format belongs to either a first DCI format set or a second DCI format set that is different than the first DCI format set; and
   transmit, based on the DCI, the first signal group having a transmission scheme that is based on a number of TCI states in a TCI state group corresponding to the first signal group;
wherein, on a condition that the DCI format belongs to the first DCI format set, the TCI state group is the first TCI state group used to transmit the DCI; and
on a condition that the DCI format belongs to the second DCI format set, the DCI indicates a second TCI state group that is different than the first TCI state group, and the TCI state group is the second TCI state group indicated by the DCI.

8. The base station of claim 7, wherein:
on a condition that the number of TCI states in the TCI state group is 1, the transmission scheme is belongs to a first transmission scheme set; and
on a condition that the number of TCI states in the TCI state group is greater than one, the transmission scheme belongs to a second transmission scheme set that is different than the first transmission scheme set.

9. The base station of claim 7, wherein:
on a condition that the DCI format belongs to the second DCI format set, the DCI includes a field that indicates the second TCI state group; and
on a condition that the DCI format belongs to the first DCI format set, the DCI does not include the field.

10. The base station of claim 7, wherein the transmitter is further configured to:
transmit a first information block that indicates a plurality of TCI state groups; and
transmit a second information block that includes the first TCI state group, wherein the first TCI state group is selected from the plurality of TCI state groups.

11. A method performed by a User Equipment (UE), the method comprising:
receiving, using a first Transmission Configuration Indicator (TCI) state group, a Downlink Control Information (DCI) having a DCI format, the DCI including scheduling information for a first signal group, wherein the first signal group includes a Physical Downlink Shared Channel (PDSCH) transmission or PDSCH repetitions, and wherein the DCI format belongs to either a first DCI format set or a second DCI format set that is different than the first DCI format set; and receiving, using the DCI, the first signal group having a transmission scheme that is based on a number of TCI states in a TCI state group corresponding to the first signal group;

wherein, on a condition that the DCI format belongs to the first DCI format set, the TCI state group is the first TCI state group used to receive the DCI; and on a condition that the DCI format belongs to the second DCI format set, the DCI indicates a second TCI state group that is different than the first TCI state group, and the TCI state group is the second TCI state group indicated by the DCI.

12. The method of claim 11, wherein:

on a condition that the number of TCI states in the TCI state group is 1, the transmission scheme is belongs to a first transmission scheme set; and on a condition that the number of TCI states in the TCI state group is greater than one, the transmission scheme belongs to a second transmission scheme set that is different than the first transmission scheme set.

13. The method of claim 11, wherein:

on a condition that the DCI format belongs to the second DCI format set, the DCI includes a field that indicates the second TCI state group; and on a condition that the DCI format belongs to the first DCI format set, the DCI does not include the field.

14. The method of claim 11, wherein the transmission scheme is based on a positive integer that is determined at least in part by the number of TCI states in the TCI state group.

15. The method of claim 11, wherein:

the TCI state group is one TCI state group of a plurality of TCI state groups.

16. The method of claim 11, further comprising:

receiving a first information block that indicates a plurality of TCI state groups; and receiving a second information block that includes the first TCI state group, wherein the first TCI state group is selected from the plurality of TCI state groups.

17. A method performed by a base station, the base station comprising:

transmitting, using a first Transmission Configuration Indicator (TCI) state group, a Downlink Control Information (DCI) having a DCI format, the DCI including scheduling information for a first signal group, wherein the first signal group includes a Physical Downlink Shared Channel (PDSCH) transmission or PDSCH repetitions, and wherein the DCI format belongs to either a first DCI format set or a second DCI format set that is different than the first DCI format set; and transmitting, based on the DCI, the first signal group having a transmission scheme that is based on a number of TCI states in a TCI state group corresponding to the first signal group;

wherein, on a condition that the DCI format belongs to the first DCI format set, the TCI state group is the first TCI state group used to transmit the DCI; and on a condition that the DCI format belongs to the second DCI format set, the DCI indicates a second TCI state group that is different than the first TCI state group, and the TCI state group is the second TCI state group indicated by the DCI.

18. The method of claim 17, wherein:

on a condition that the number of TCI states in the TCI state group is 1, the transmission scheme is belongs to a first transmission scheme set; and on a condition that the number of TCI states in the TCI state group is greater than one, the transmission scheme belongs to a second transmission scheme set that is different than the first transmission scheme set.

19. The method of claim 17, wherein:

on a condition that the DCI format belongs to the second DCI format set, the DCI includes a field that indicates the second TCI state group; and on a condition that the DCI format belongs to the first DCI format set, the DCI does not include the field.

20. The method of claim 17, further comprising:

transmitting a first information block that indicates a plurality of TCI state groups; and transmitting a second information block that includes the first TCI state group, wherein the first TCI state group is selected from the plurality of TCI state groups.

* * * * *